United States Patent
Yamanaka

(10) Patent No.: US 10,506,378 B2
(45) Date of Patent: Dec. 10, 2019

(54) APPARATUS AND METHOD FOR NOTIFYING THE APPARATUS IN BOTH FIRST STATE AND SECOND STATE BASED ON DETECTING CONDITIONS

(71) Applicant: FUJITSU LIMITED, Kawasaki-shi, Kanagawa (JP)

(72) Inventor: Ryosuke Yamanaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 522 days.

(21) Appl. No.: 15/180,862

(22) Filed: Jun. 13, 2016

(65) Prior Publication Data

US 2017/0003729 A1    Jan. 5, 2017

(30) Foreign Application Priority Data

Jul. 2, 2015    (JP) .................................. 2015-133526

(51) Int. Cl.
*G06F 1/26*    (2006.01)
*G06F 1/32*    (2019.01)
(Continued)

(52) U.S. Cl.
CPC .......... *H04W 4/027* (2013.01); *G06F 1/1684* (2013.01); *G06F 1/1694* (2013.01);
(Continued)

(58) Field of Classification Search
CPC ....... H04W 4/80; H04W 4/027; H04W 64/00; H04W 76/15; G06F 1/32; G06F 1/26
See application file for complete search history.

(56) References Cited

U.S. PATENT DOCUMENTS

| 8,255,354 B2 * | 8/2012 | Bell ....................... G06N 7/005 |
| | | 706/45 |
| 2005/0237347 A1 | 10/2005 | Yamaji et al. |

(Continued)

FOREIGN PATENT DOCUMENTS

| JP | 2005-284596 A | 10/2005 |
| JP | 2010-054284 A | 3/2010 |

(Continued)

OTHER PUBLICATIONS

Japanese Office Action of corresponding Japanese Patent Application No. JP2015-133526 dated Apr. 2, 2019.

*Primary Examiner* — Phil K Nguyen
(74) *Attorney, Agent, or Firm* — Arent Fox LLP

(57) ABSTRACT

An apparatus includes a first sensor device, a second sensor device and a first processor coupled to the first sensor device and the second sensor device and configured to calculate a probability that the apparatus is in a first state, based on a measurement of the first sensor device, initiate an operation of the second sensor device when the probability exceeds a first value, execute, based on a measurement of the second sensor device, a first detection that detects the apparatus is in a second state, execute, based on the measurement of the first sensor, a second detection that detects the probability exceeds a second value greater than the first value and that the apparatus is in the first state, and based on the first detection and the second detection, output a notification that indicates the apparatus is in both the first state and the second state.

10 Claims, 58 Drawing Sheets

(51) Int. Cl.
*H04W 4/02* (2018.01)
*G06F 1/16* (2006.01)
*G06F 1/3215* (2019.01)
*G06F 1/3231* (2019.01)
*G06F 1/3234* (2019.01)
*G06F 1/3287* (2019.01)
*G06F 3/01* (2006.01)

(52) U.S. Cl.
CPC ............ *G06F 1/1698* (2013.01); *G06F 1/325* (2013.01); *G06F 1/3215* (2013.01); *G06F 1/3231* (2013.01); *G06F 1/3287* (2013.01); *G06F 3/011* (2013.01); *G06F 3/015* (2013.01); *G06F 1/26* (2013.01)

(56) References Cited

U.S. PATENT DOCUMENTS

| | | | | |
|---|---|---|---|---|
| 2011/0294429 | A1* | 12/2011 | Shirakata | A61B 5/0002 455/41.2 |
| 2014/0059365 | A1 | 2/2014 | Heo et al. | |
| 2016/0116960 | A1* | 4/2016 | Kwak | G06F 1/3206 713/323 |

FOREIGN PATENT DOCUMENTS

| | | |
|---|---|---|
| JP | 2011-185686 A | 9/2011 |
| JP | 2012-048536 A | 3/2012 |
| JP | 2014-093002 A | 5/2014 |

\* cited by examiner

APPARATUS AND METHOD FOR NOTIFYING THE APPARATUS IN BOTH FIRST STATE AND SECOND STATE BASED ON DETECTING CONDITIONS

CROSS-REFERENCE TO RELATED APPLICATION

This application is based upon and claims the benefit of priority of the prior Japanese Patent Application No. 2015-133526, filed on Jul. 2, 2015, the entire contents of which are incorporated herein by reference.

FIELD

The embodiments discussed herein are related to an apparatus and a method.

BACKGROUND

As the related art, there is known a technology that is related to a compound sensor device utilizing a passive sensor and an active sensor and that is used for scheduling measurement utilizing the active sensor to be performed in a case where a result of continuous measurement based on the passive sensor satisfies a predetermined condition.

If, in this way, one of the two sensors, which has stopped, is caused to operate later based on a measurement result in the other sensor, electric power consumed by the one sensor is suppressed.

In this regard, however, if the two sensors do not operate, determination related to a condition in which states detected by using the respective sensors are combined is not correctly performed.

As examples of the related art, Japanese Laid-open Patent Publication No. 2010-54284, Japanese Laid-open Patent Publication No. 2012-48536, and Japanese Laid-open Patent Publication No. 2011-185686 are known.

SUMMARY

According to an aspect of the invention, an apparatus includes a first sensor device, a second sensor device and a first processor coupled to the first sensor device and the second sensor device and configured to calculate a probability that the apparatus is in a first state, based on a measurement of the first sensor device, initiate an operation of the second sensor device when the probability exceeds a first value, execute, based on a measurement of the second sensor device, a first detection that detects the apparatus is in a second state, execute, based on the measurement of the first sensor, a second detection that detects the probability exceeds a second value greater than the first value and that the apparatus is in the first state, and based on the first detection and the second detection, output a notification that indicates the apparatus is in both the first state and the second state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

First Embodiment

Figure 1:
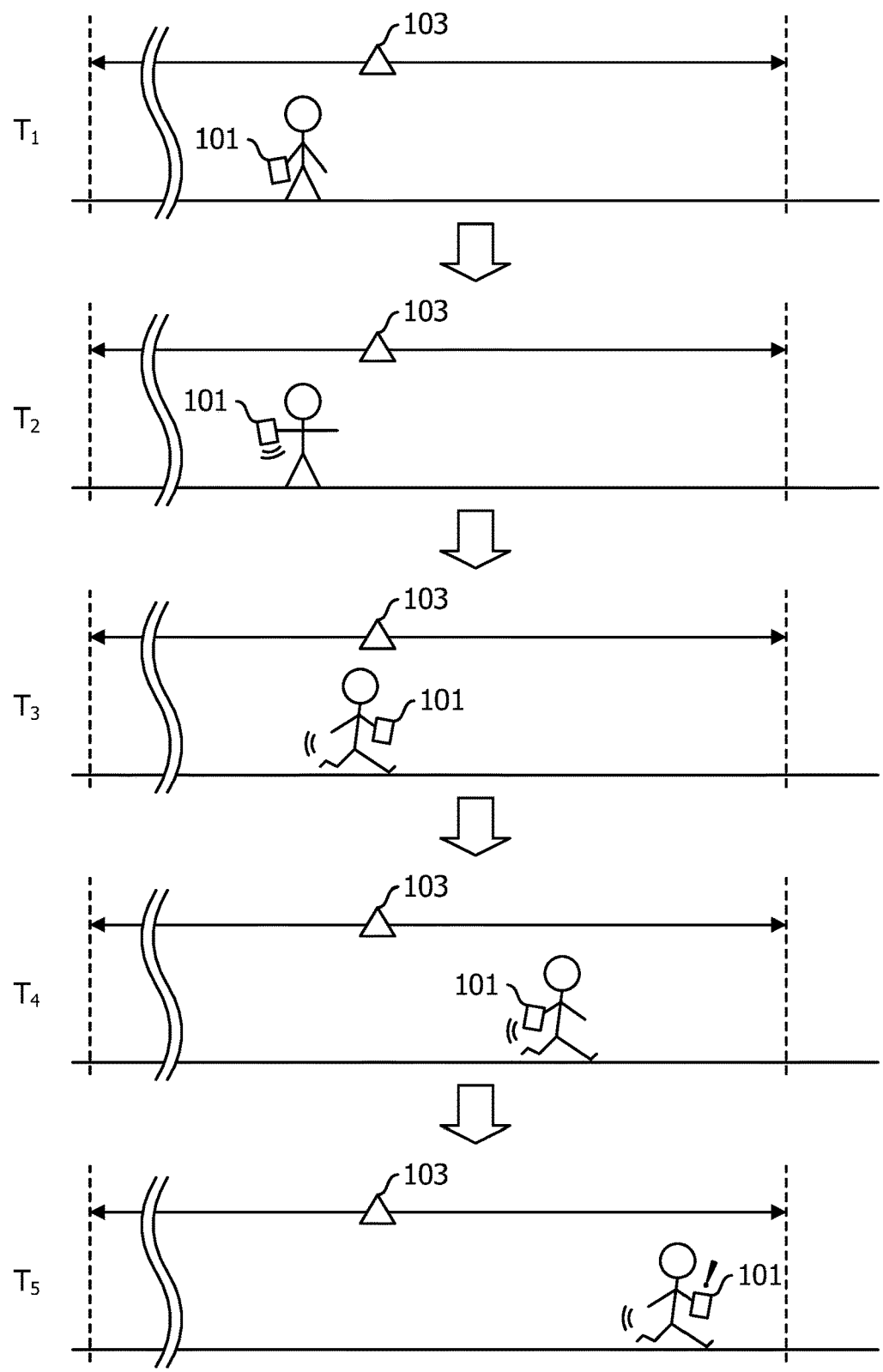
FIG. 1 illustrates a usage mode of a mobile terminal in a first example.

FIG. 1 illustrates a usage mode of a mobile terminal 101 in a first example. An application in this example announces that a wireless tag 103 exists in the vicinity of a user who is walking. The mobile terminal 101 in which the application operates includes a function of detecting, by using an acceleration sensor, a walking state of the user who holds the mobile terminal 101, a function of sensing the wireless tag 103 by using a wireless sensor, and a function of monitoring a situation of the user.

It is assumed that, during a normal period, the acceleration sensor operates and the wireless sensor does not operate. In addition, at the time of detecting the walking state of the user, the wireless sensor initiates an operation. By doing so, power consumption in the wireless sensor is suppressed.

At a time $T_1$, the user starts the application in the mobile terminal 101. At this time, the user remains stationary on a road. Dashed lines indicate a range in which the wireless tag 103 is sensed by the mobile terminal 101 by using short distance wireless communication.

While the user starts moving at a time $T_2$, a change in acceleration is small. Accordingly, the walking state is not yet sensed.

Usually, detection processing of the walking state is performed by identifying periodicity related to a change in acceleration. If not walking some distance, the walking state is not sensed. Therefore, at a time $T_3$ before which the user moved a few steps, the walking state is not yet sensed.

At a time $T_4$ before which the user further moved a few steps, the walking state is sensed. In addition, at this timing, the wireless sensor is activated. However, it is difficult for the wireless sensor to immediately initiate measurement. The reason is that the wireless sensor takes preparation for initiating the measurement.

At a time $T_5$ before which the user further moved a few steps, the preparation of the wireless sensor is completed. At this time, the mobile terminal 101 senses the wireless tag 103 by using the short distance wireless communication. In addition, a condition that the user is walking and a condition that the wireless tag 103 exists at a short distance are satisfied. As a result, at the time $T_5$, the application announces to the user. Note that, in the present embodiment, based on a monitoring condition in which the two conditions are combined as described above, the situation of the user is monitored.

Figure 2:
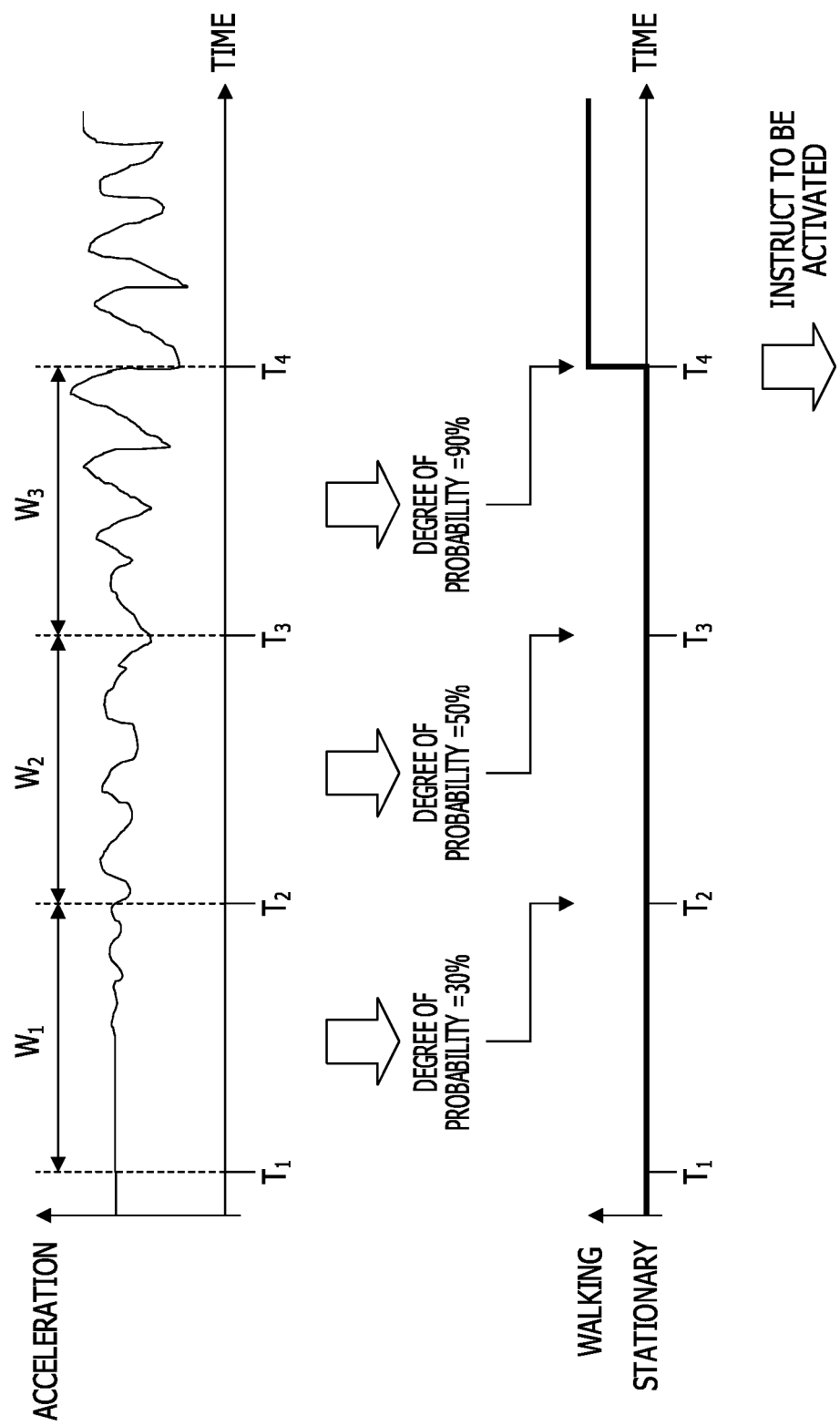
FIG. 2 illustrates a transition of a first status in the first example.

FIG. 2 illustrates a transition of a status (hereinafter, called a first status) related to the walking state in the first example. A graph in an upper stage schematically illustrates a change in acceleration, which serves as a basis for determining the first status. A horizontal axis indicates a time. Note that actual acceleration has 3-dimensional values.

In processing for sensing the walking state of the user, at the time $T_2$, a window $W_1$ is set for time series data of the acceleration. The window $W_1$ identifies the time series data of the acceleration, measured after the time $T_1$ and before the time $T_2$. Based on this time series data of the acceleration, the degree of probability that the user is walking is calculated. At this stage, the degree of probability that the user is walking is 30 percent. In this example, in a case where the degree of probability that the user is walking exceeds a threshold value, 85 percent, the walking state is sensed. Accordingly, at the time $T_2$, the walking state is not sensed.

A graph in a lower stage illustrates the first status. At the time $T_2$, the first status is "stationary".

At the time $T_3$, a window $W_2$ is set for time series data of the acceleration. The window $W_2$ identifies the time series data of the acceleration, measured after the time $T_2$ and before the time $T_3$. Based on this time series data of the acceleration, the degree of probability that the user is walking is calculated. At this stage, the degree of probability that the user is walking is 50 percent. In the same way as in the case of the time $T_2$, since the degree of probability that the user is walking does not exceed the threshold value, 85 percent, the walking state is not sensed.

As illustrated in the graph in the lower stage, at the time $T_3$, the first status does not make a transition and remains "stationary".

At the time $T_4$, a window $W_3$ is set for time series data of the acceleration. The window $W_3$ identifies the time series data of the acceleration, measured after the time $T_3$ and before the time $T_4$. Based on this time series data of the acceleration, the degree of probability that the user is walking is calculated. At this stage, the degree of probability that the user is walking is 90 percent. Since, in this stage, the degree of probability that the user is walking exceeds the threshold value, 85 percent, the walking state is sensed.

As illustrated in the graph in the lower stage, at the time $T_4$, the first status makes a transition to "walking". In addition, at this timing, the wireless sensor is instructed to be activated.

Figure 3:
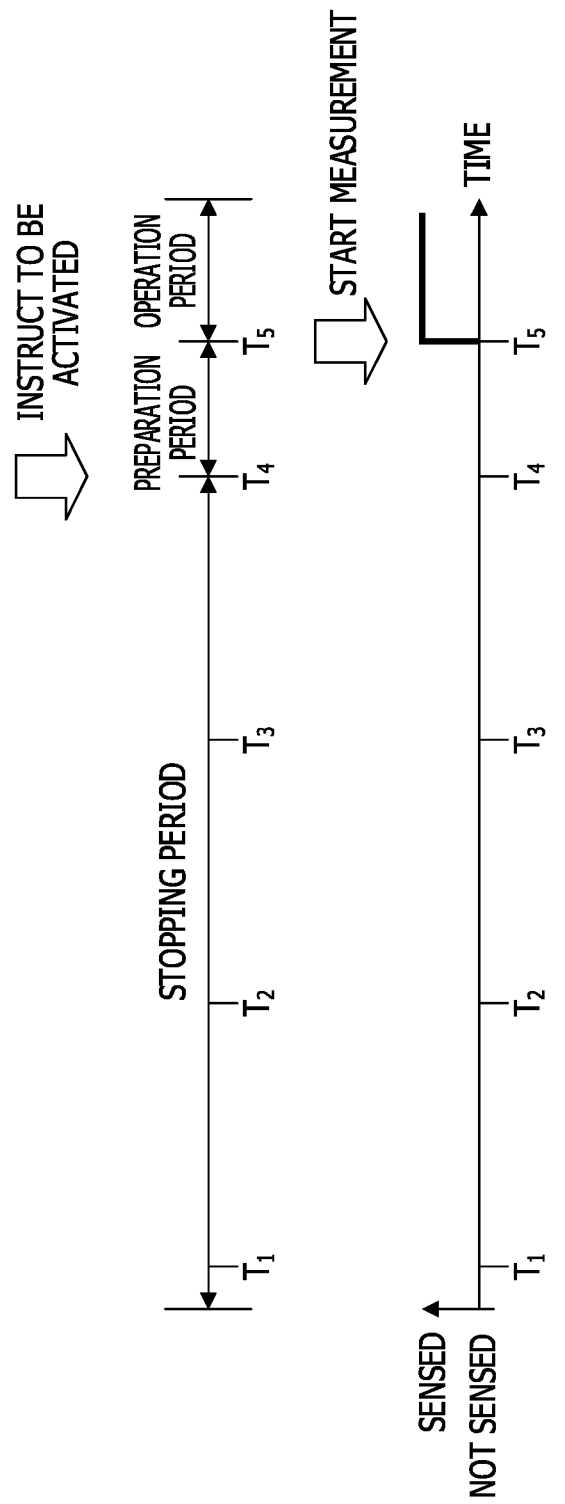
FIG. 3 illustrates a transition of a second status in the first example.

FIG. 3 illustrates a transition of a status (hereinafter, called a second status) related to sensing of the wireless tag 103. Before the wireless sensor is instructed to be activated, the wireless sensor is in a stopping state. Accordingly, during a time period to the time $T_4$, detection of the wireless tag 103 is not performed, and the second status is "invalid". It is assumed that in a case where the second status is "invalid", neither of states of "sensed" and "not sensed" appears in the graph in the lower stage.

In addition, during a preparation period between the time $T_4$ and the time $T_5$, detection of the wireless tag 103 is not performed, and the second status is "invalid".

At the time $T_5$ at which the wireless sensor is switched from a preparation state to an operation state, the wireless sensor initiates measurement. In addition, the initial second status is "sensed".

Figure 4:
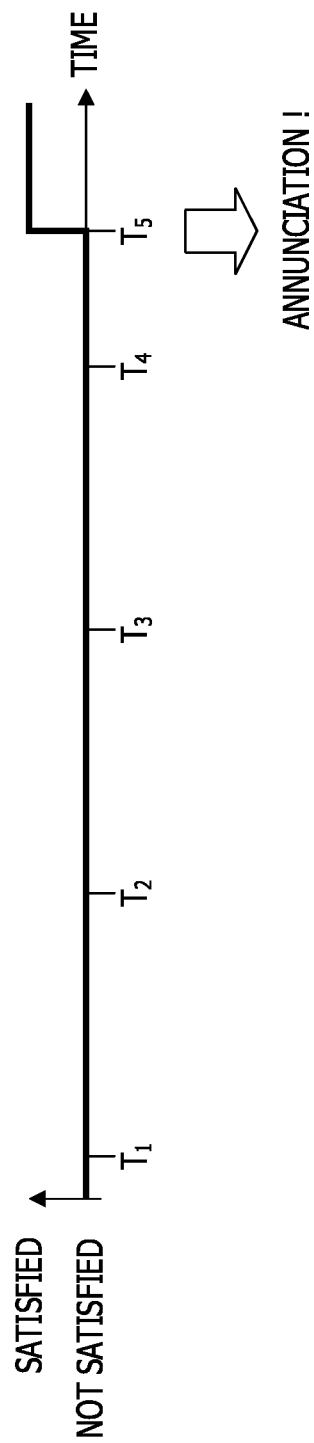
FIG. 4 illustrates a monitoring result in the first example.

FIG. 4 illustrates a monitoring result in the first example. During a time period to the time $T_5$, during which the second status is "invalid", the monitoring condition is not satisfied.

At the time $T_5$, the monitoring condition is satisfied. In addition, along with the satisfying of the monitoring condition, annunciation is performed on the user.

On the condition of a mode in which the wireless sensor continuously operates, the second status is supposed to be put into "sensed" at the time $T_4$, and the monitoring condition is supposed to be satisfied. In the first example, the monitoring condition is satisfied behind the time $T_4$ at which the monitoring condition may be satisfied under ordinary circumstances. In other words, in the first example, a delay in monitoring of a situation is caused.

Figure 5:
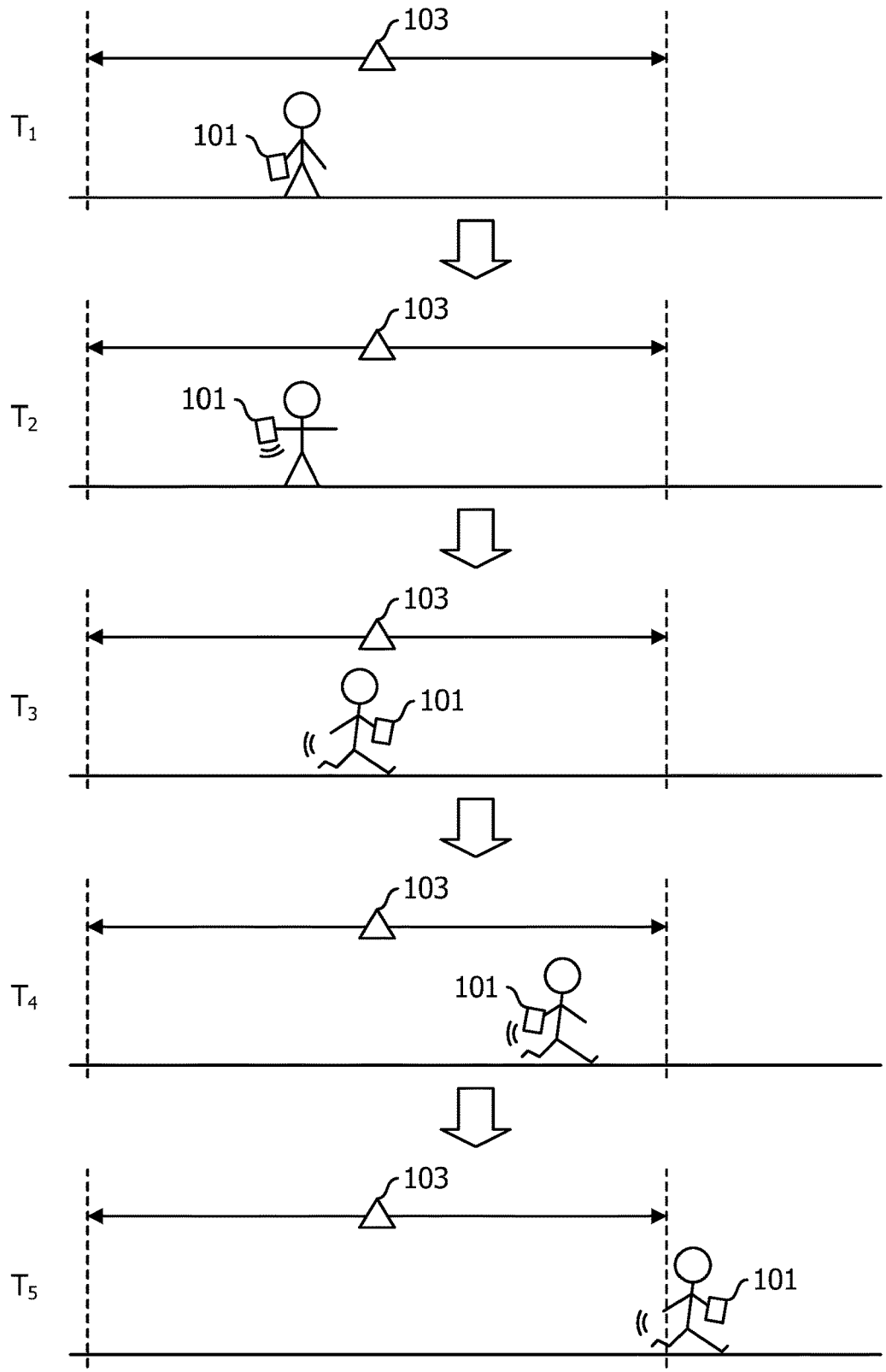
FIG. 5 illustrates a usage mode of the mobile terminal in a second example.

Subsequently, a second example in which a miss in monitoring of a situation is caused will be described. FIG. 5 illustrates a usage mode of the mobile terminal 101 in the second example. In this example, an interval between dashed lines is narrower than that in the first example. In other words, a range in which the wireless tag 103 is sensed by the mobile terminal 101 by using the short distance wireless communication is narrower than that in the case of the first example.

The movement of the user after the time $T_1$ and before the time $T_4$ is the same as that in the case of the first example. The operation of the mobile terminal 101 after the time $T_1$ and before the time $T_4$ is the same as that in the case of the first example.

In this regard, however, in the case of the second example, at the time $T_5$ at which the preparation of the wireless sensor is completed, the user already moved outside the range indicated by the dashed lines. Accordingly, it is difficult for the mobile terminal 101 to sense the wireless tag 103 by using the short distance wireless communication. Accordingly, while the condition that the user is walking is satisfied, the condition that the wireless tag 103 exists at a short distance is not satisfied. As a result, at the time $T_5$, the application does not announce. Furthermore, after the time $T_5$, the application does not announce.

The transition of the first status in the second example is the same as that of the case of the first example (FIG. 2).

Figure 6:
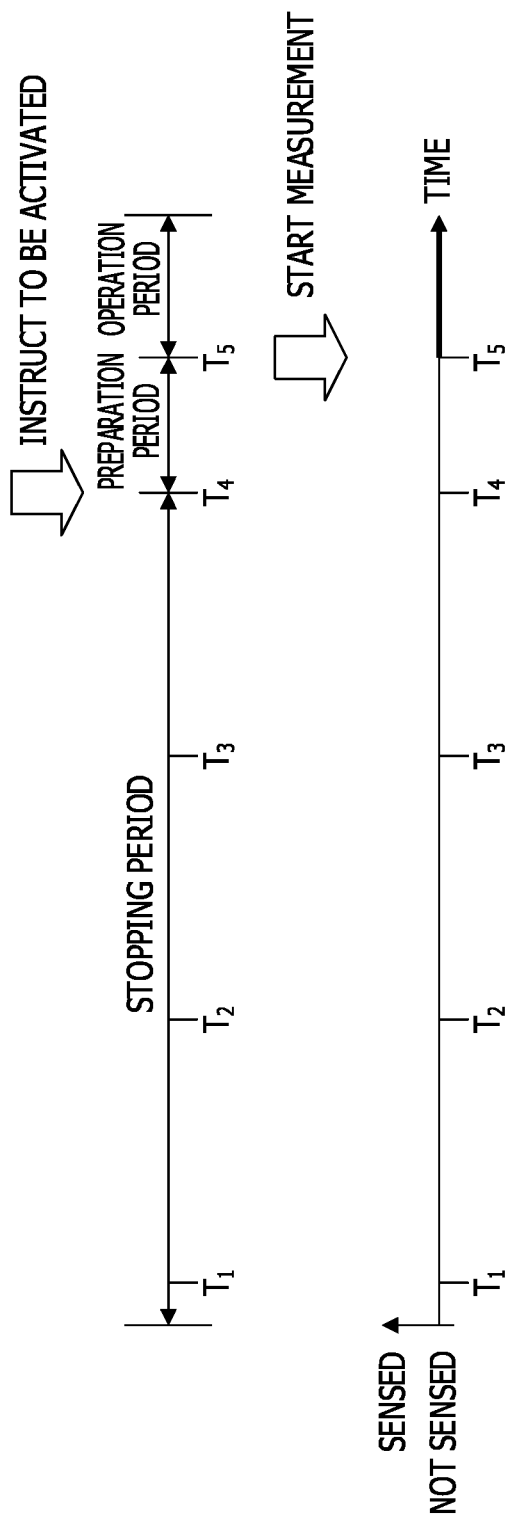
FIG. 6 illustrates a transition of the second status in the second example.

FIG. 6 illustrates a transition of the second status in the second example. In the same way as in the case of the first example (FIG. 3), the second status during a stopping time period between the time $T_1$ and the time $T_4$ and the preparation period between the time $T_4$ and the time $T_5$ is "invalid".

In the same way as in the case of the first example (FIG. 3), the wireless sensor initiates measurement at the time $T_5$ at which the wireless sensor is switched from the preparation state to the operation state. In this regard, however, the initial second status is "not sensed". In addition, after that, the second status remains "not sensed".

Figure 7:
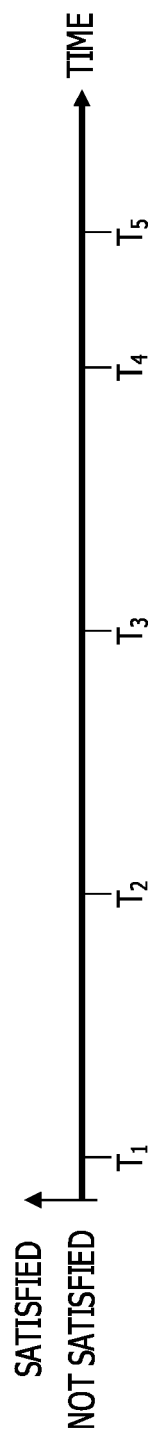
FIG. 7 illustrates a monitoring result in the second example.

FIG. 7 illustrates a monitoring result in the second example. During a time period to the time $T_5$, during which the second status is "invalid", the monitoring condition is not satisfied. At the time $T_5$, the monitoring condition is not satisfied. Furthermore, after the time $T_5$, the monitoring condition is not satisfied. Accordingly, annunciation is not performed on the user.

As described above, on the condition of a mode in which the wireless sensor continuously operates, the second status is supposed to be put into "sensed" at the time $T_4$, and the monitoring condition is supposed to be satisfied. Accordingly, in the second example, the monitoring condition expected to be satisfied under ordinary circumstances is not satisfied. In other words, a miss in monitoring of a situation is caused.

Next, a mode for solving problems in the first example and the second example will be described. In this example, the wireless sensor is caused to operate early. From this, a delay in the first example and a miss in the second example are avoided.

Figure 8:
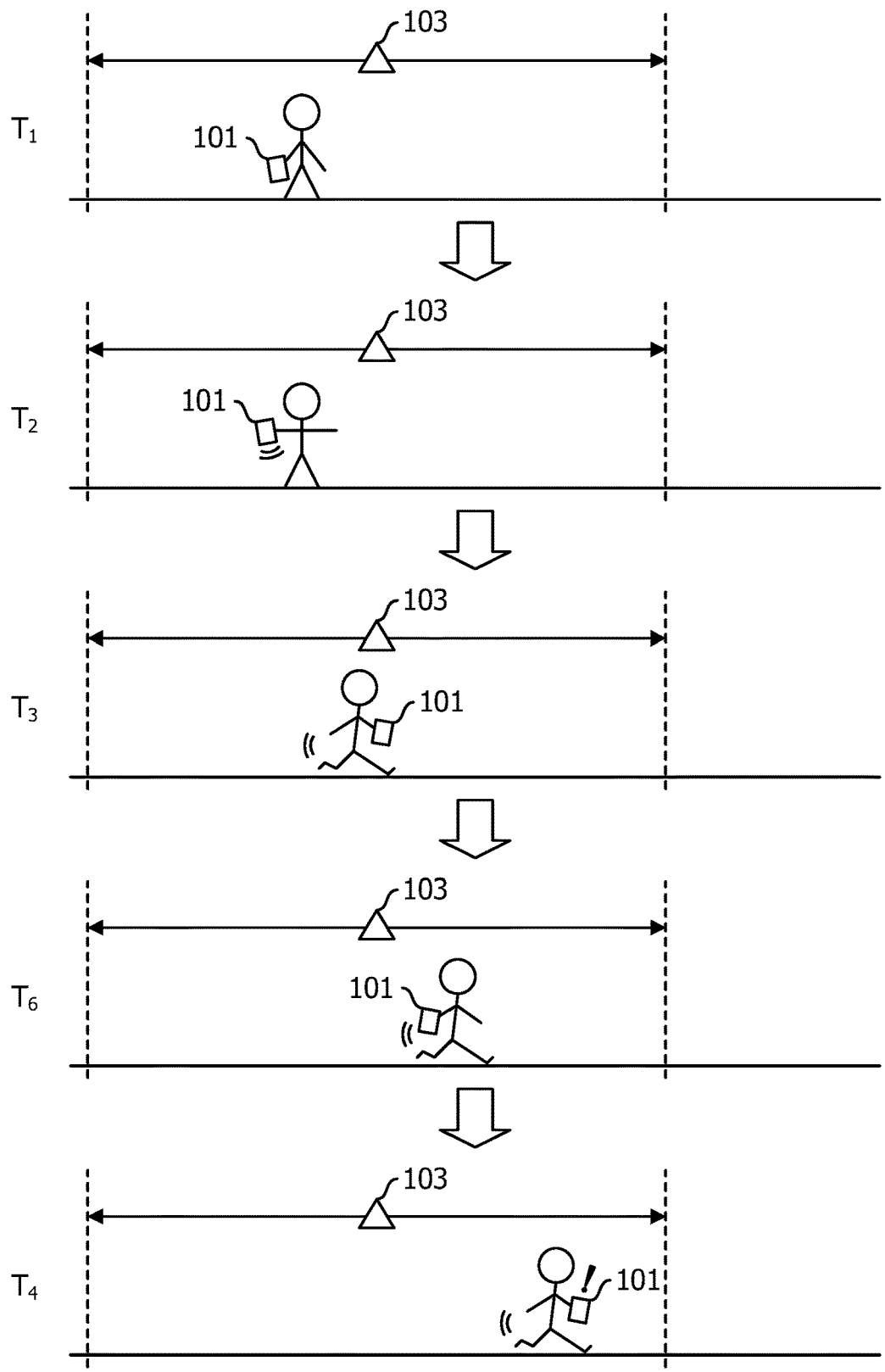
FIG. 8 illustrates a usage mode of the mobile terminal in a first embodiment.

FIG. 8 illustrates a usage mode of the mobile terminal 101 in a first embodiment. A sensing range indicated by dashed lines is the same as that in the case of the second example (FIG. 5).

In the same way as in the case of the first example or the second example, at the time $T_1$, the user starts the application in the mobile terminal 101. At this time, the user remains stationary on a road.

While, in the same way as in the case of the first example or the second example, the user starts moving at the time $T_2$, a change in acceleration is small. Accordingly, the walking state is not yet sensed.

In the same way as in the case of the first example or the second example, at the time $T_3$ before which the user moved a few steps, the walking state is not yet sensed. In this regard, however, in this mode, it is predicted that the possibility of being put into the walking state is high, and the wireless sensor is activated in advance.

At a time $T_6$ before the time $T_4$ comes, the preparation of the wireless sensor is completed. At this time, the mobile terminal 101 senses the wireless tag 103 by using the short distance wireless communication. In this regard, however, since the condition that the user is walking is not satisfied, annunciation is not performed on the user.

After that, if the time $T_4$ comes, the condition that the user is walking is satisfied. In other words, since the monitoring condition is satisfied, the application announces to the user.

Since, in this way, a timing at which the monitoring condition is satisfied becomes earlier than the time $T_5$ in the case of the first example, a delay in the first example or a miss in the second example is not caused, as described above.

Figure 9:
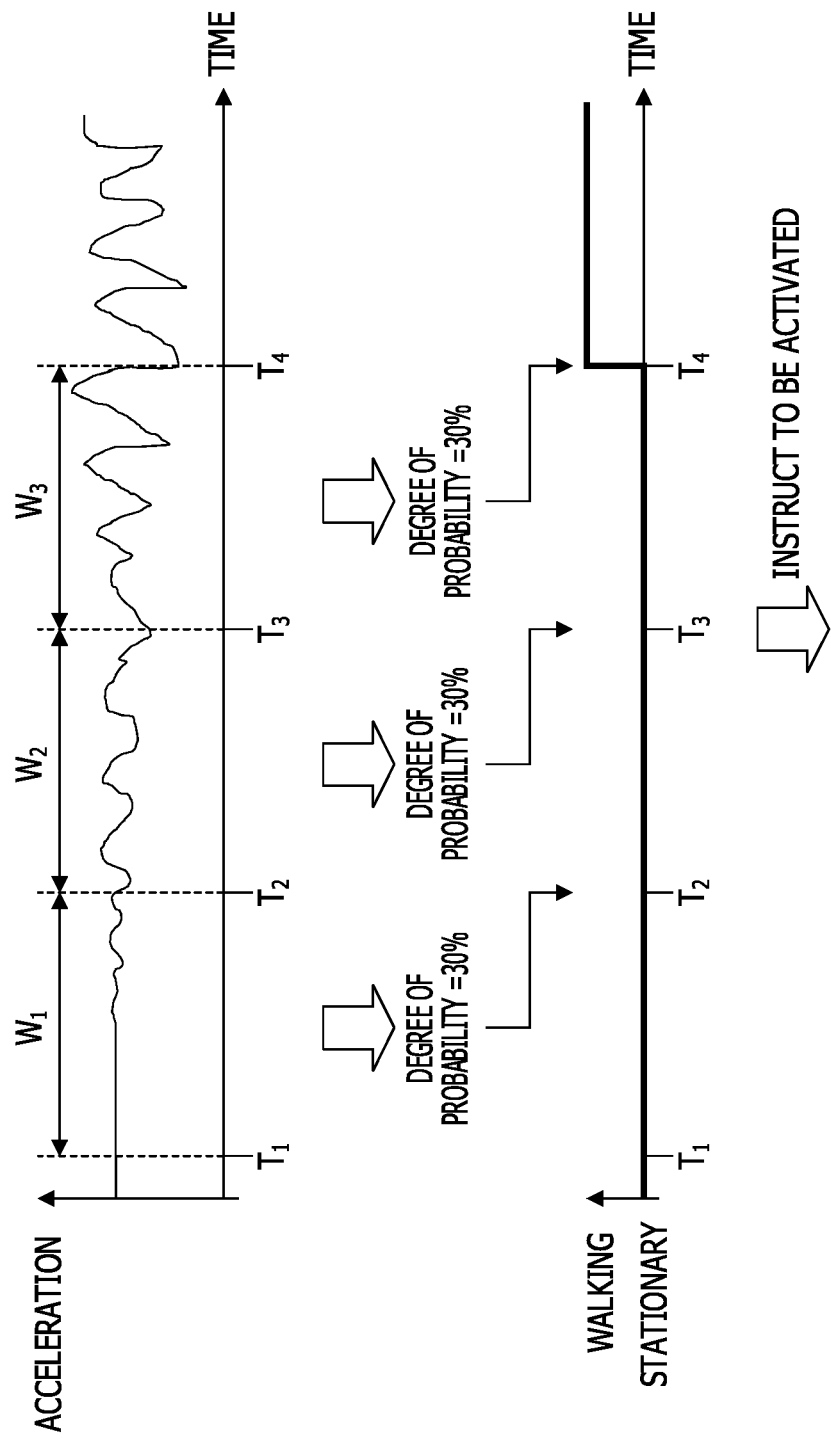
FIG. 9 illustrates an example of a transition of the first status in the first embodiment.

FIG. 9 illustrates an example of a transition of the first status in the first embodiment. As illustrated in a graph in an upper stage, the time series data of acceleration is the same as that in the case of the first example or the second example (FIG. 2). In addition, the calculated degree of probability is the same as that in the case of the first example or the second example.

Furthermore, the transition of the first status is the same as that in the case of the first example or the second example.

In this example, in a case where the degree of probability that the user is walking exceeds a threshold value, 45 percent, the wireless sensor is instructed to be activated. Accordingly, at the time $T_3$ at which the degree of probability, 50 percent, is calculated, the wireless sensor is instructed to be activated. In other words, at a timing earlier than those in the cases of the first example and the second example, the wireless sensor is instructed to be activated.

Figure 10:
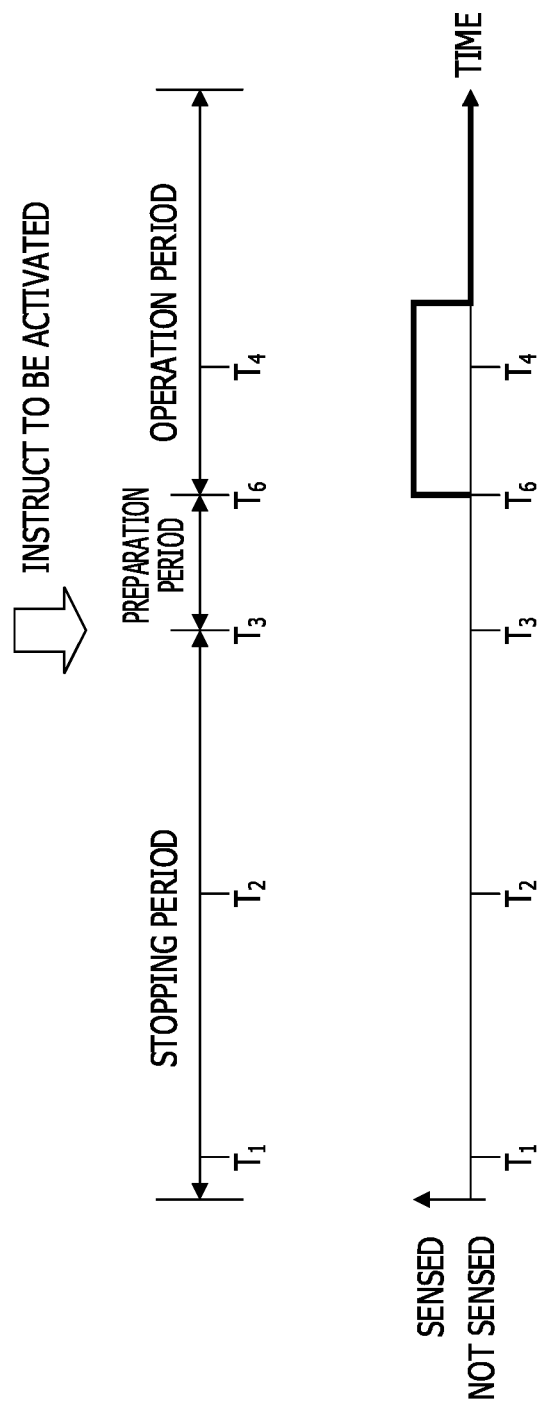
FIG. 10 illustrates an example of a transition of the second status in the first embodiment.

FIG. 10 illustrates an example of a transition of the second status in the first embodiment. The second status during a stopping time period between the time $T_1$ and the time $T_3$ is "invalid". The second status during a preparation time period between the time $T_3$ and the time $T_6$ is "invalid".

In addition, at the time $T_6$ at which the wireless sensor is switched from the preparation state to the operation state, the wireless sensor initiates measurement. The initial second status is "sensed". In addition, after the time $T_4$, the user moves outside the sensing range, and the second status shifts to "not sensed".

Figure 11:
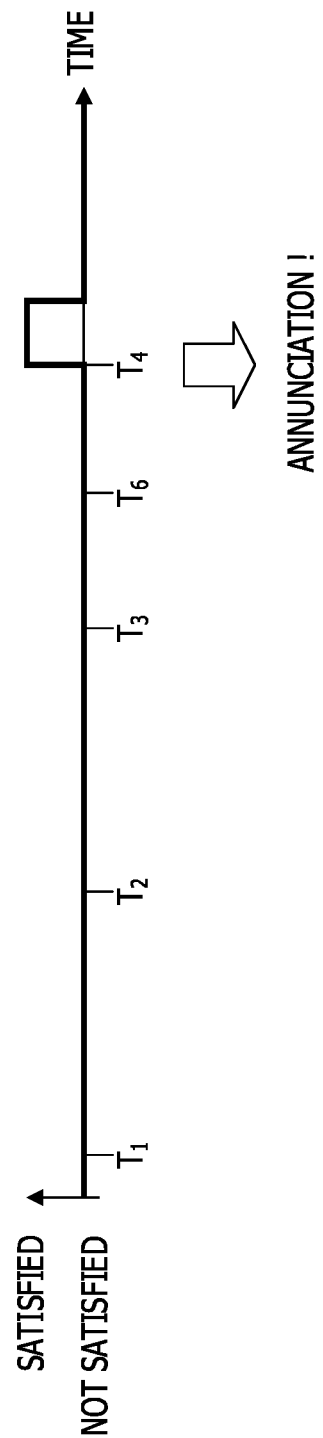
FIG. 11 illustrates an example of a monitoring result in the first embodiment.

FIG. 11 illustrates an example of a monitoring result in the first embodiment. During a time period to the time $T_6$, during which the second status is "invalid", the monitoring condition is not satisfied. In addition, at the time $T_4$, the monitoring condition is satisfied, and annunciation is performed on the user. This is the end of description of an outline of the present embodiment.

Figure 12:
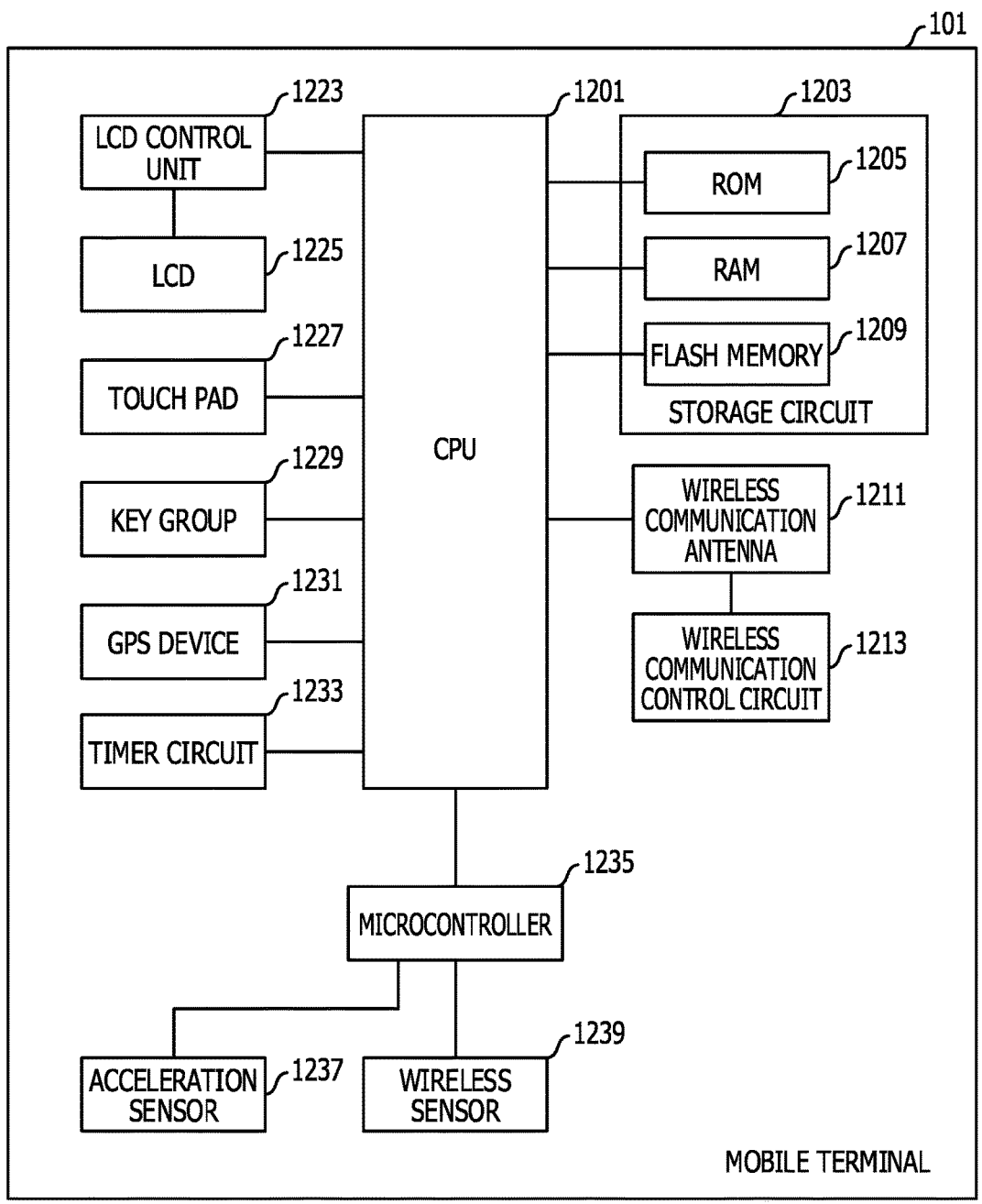
FIG. 12 illustrates an example of a hardware configuration of the mobile terminal in the first embodiment.

Hereinafter, an operation of the mobile terminal 101 will be described. First, a hardware configuration of the mobile terminal 101 in the present embodiment will be described. FIG. 12 illustrates an example of the hardware configuration of the mobile terminal 101 in the first embodiment. The mobile terminal 101 includes a central processing unit (CPU) 1201, a storage circuit 1203, a wireless communication antenna 1211, a wireless communication control circuit 1213, a liquid crystal display (LCD) control circuit 1223, a LCD 1225, a touch pad 1227, a key group 1229, a Global Positioning System (GPS) device 1231, a timer circuit 1233, a microcontroller 1235, an acceleration sensor 1237, and a wireless sensor 1239.

The CPU 1201 executes programs stored in the storage circuit 1203. The storage circuit 1203 includes, for example, a read only memory (ROM) 1205, a random access memory (RAM) 1207, and a flash memory 1209. The ROM 1205 stores therein, for example, basic programs and initial data. The RAM 1207 includes an area in which a program is deployed. The RAM 1207 includes an area for storing therein temporary data. The flash memory 1209 stores therein, for example, programs, such as applications, and user data.

The LCD control circuit 1223 causes a clock circuit to operate with a predetermined operating frequency and causes the LCD 1225 to be driven. The LCD 1225 displays various kinds of screen. The touch pad 1227 is, for example, a panel-like sensor arranged on the display surface of the LCD 1225 and receives instructions based on touch operations. Specifically, a touch panel in which the LCD 1225 and the touch pad 1227 are integrated is used. Individual hard keys in the key group 1229 are provided in a portion of an enclosure.

The wireless communication antenna 1211 receives wireless radio waves based on, for example, a cellular communication system, a wireless local area network (LAN) system, or a short distance communication system (for example, Bluetooth (registered trademark) Low Energy). The wireless communication control circuit 1213 controls wireless communication in accordance with usable frequencies in the respective systems. By using the wireless communication control circuit 1213 in place of the wireless sensor 1239 described later, the wireless tag 103 that outputs a wireless signal (a beacon in this example) may be detected.

The microcontroller 1235 is coupled to the CPU 1201. The acceleration sensor 1237 and the wireless sensor 1239 are coupled to the microcontroller 1235. In addition, the microcontroller 1235 controls the acceleration sensor 1237 and the wireless sensor 1239. The CPU 1201 may acquire, via the microcontroller 1235, a measurement result of the acceleration sensor 1237 and a measurement result of the wireless sensor 1239.

The acceleration sensor 1237 measures acceleration. Specifically, the acceleration sensor 1237 measures acceleration in each of the directions of three axes orthogonal to one another. The wireless sensor 1239 includes, for example, an antenna and a circuit for controlling communication based on short distance wireless and detects the wireless tag 103, which is located adjacent thereto and which outputs the wireless signal (the beacon in this example).

Note that the mobile terminal 101 illustrated in FIG. 12 is a mobile phone (examples of which include a feature phone and a smartphone) and is an example of a portable electronic device. In this regard, however, the present embodiment may be applied to another portable electronic device. In a portable electronic device such as, for example, a wearable terminal of a wristwatch-type, a spectacle-type, or the like, a tablet terminal, a game machine, a pedometer, a sound recorder, a music player, a camera, an image reproducer, a television broadcast receiver, a radio broadcast receiver, a controller, an electronic clock, an electronic dictionary, an electronic translator, a transceiver, a GPS transmitter, a measuring equipment, a health support equipment, or a medical equipment, the same modules as those in the mobile terminal 101 may be provided, and processing operations described later may be performed.

Figure 13:
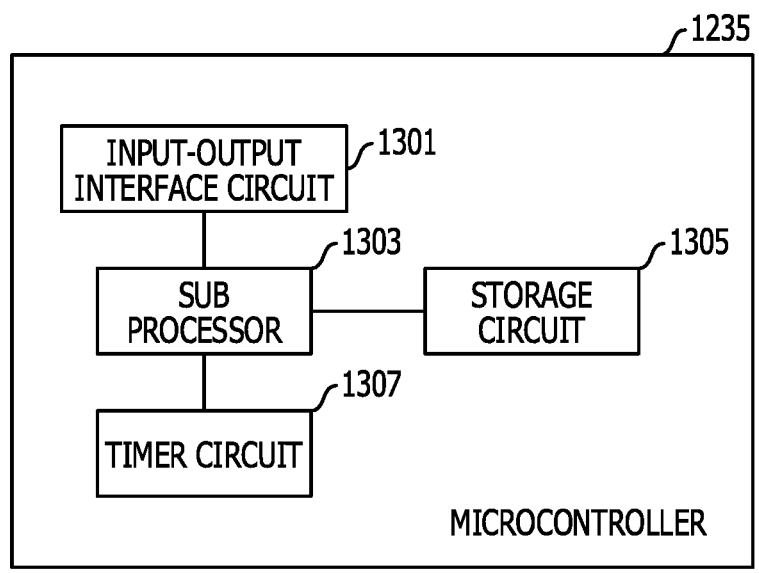
FIG. 13 illustrates an example of a hardware configuration of a microcontroller.

FIG. 13 illustrates an example of a hardware configuration of the microcontroller 1235. The microcontroller 1235 includes an input-output interface circuit 1301, a sub-processor 1303, a storage circuit 1305, and a timer circuit 1307.

The input-output interface circuit 1301 outputs a measurement command to the acceleration sensor 1237. In addition, the input-output interface circuit 1301 receives acceleration data measured by the acceleration sensor 1237. Furthermore, the input-output interface circuit 1301 outputs a measurement command to the wireless sensor 1239. In addition, the input-output interface circuit 1301 receives data measured by the wireless sensor 1239.

In addition to this, in some cases, the input-output interface circuit 1301 sends, to the CPU 1201, data (for example, a command or an event) and receives, from the CPU 1201, data (for example, a command or an event).

The input-output interface circuit 1301 is coupled to the sub-processor 1303. The sub-processor 1303 is coupled to the storage circuit 1305 and the timer circuit 1307. The sub-processor 1303 performs arithmetic processing. The storage circuit 1305 stores therein data. The storage circuit 1305 includes, for example, a volatile memory and a non-volatile memory. The timer circuit 1307 measures a time and an elapsed time.

Figure 14:
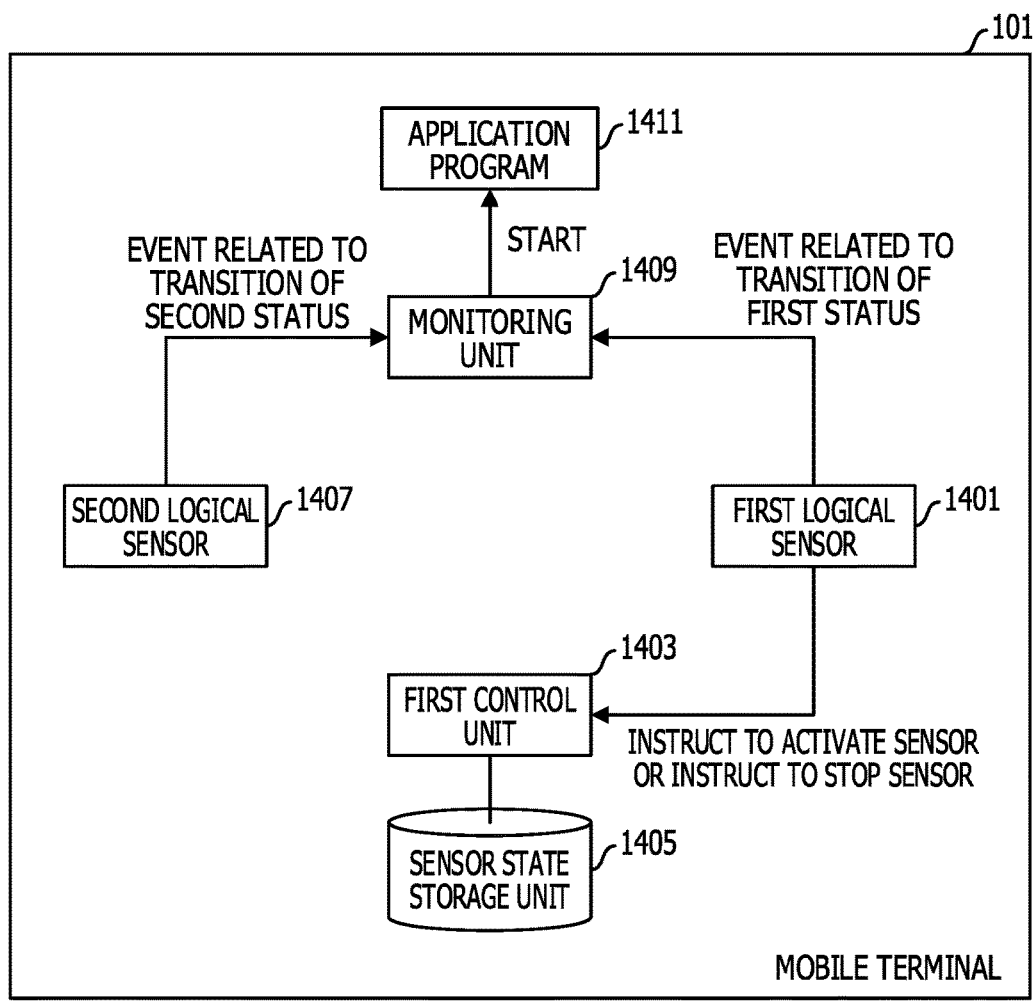
FIG. 14 illustrates an example of a module configuration of the mobile terminal in the first embodiment.

Next, modules in the mobile terminal 101 will be described. FIG. 14 illustrates an example of a module configuration of the mobile terminal 101 in the first embodiment. The mobile terminal 101 includes a first logical sensor 1401, a first control unit 1403, a sensor state storage unit 1405, a second logical sensor 1407, a monitoring unit 1409, and an application program 1411.

The first logical sensor 1401 performs processing for measuring acceleration and first detection processing for detecting the first status. In the first detection processing, at a timing at which a state transition of the first status occurs, the first logical sensor 1401 generates an event related to the transition of the first status. The generated event related to the transition of the first status is delivered to the monitoring unit 1409. In addition, in the first detection processing, the first logical sensor 1401 instructs to activate and stop the wireless sensor 1239. These instructions are delivered to the first control unit 1403.

The first control unit 1403 controls the wireless sensor 1239. The sensor state storage unit 1405 stores therein a state of the wireless sensor 1239.

The second logical sensor 1407 performs second detection processing for detecting the second status. The monitoring unit 1409 monitors a situation of the user. Specifically, determination of the monitoring condition in which the condition of the first status and the condition of the second status are combined is performed.

By using the first logical sensor 1401, the second logical sensor 1407, and the monitoring unit 1409, the application program 1411 performs predetermined processing (annunciation processing in this example) corresponding to a determination result in the monitoring unit 1409.

Figure 15:
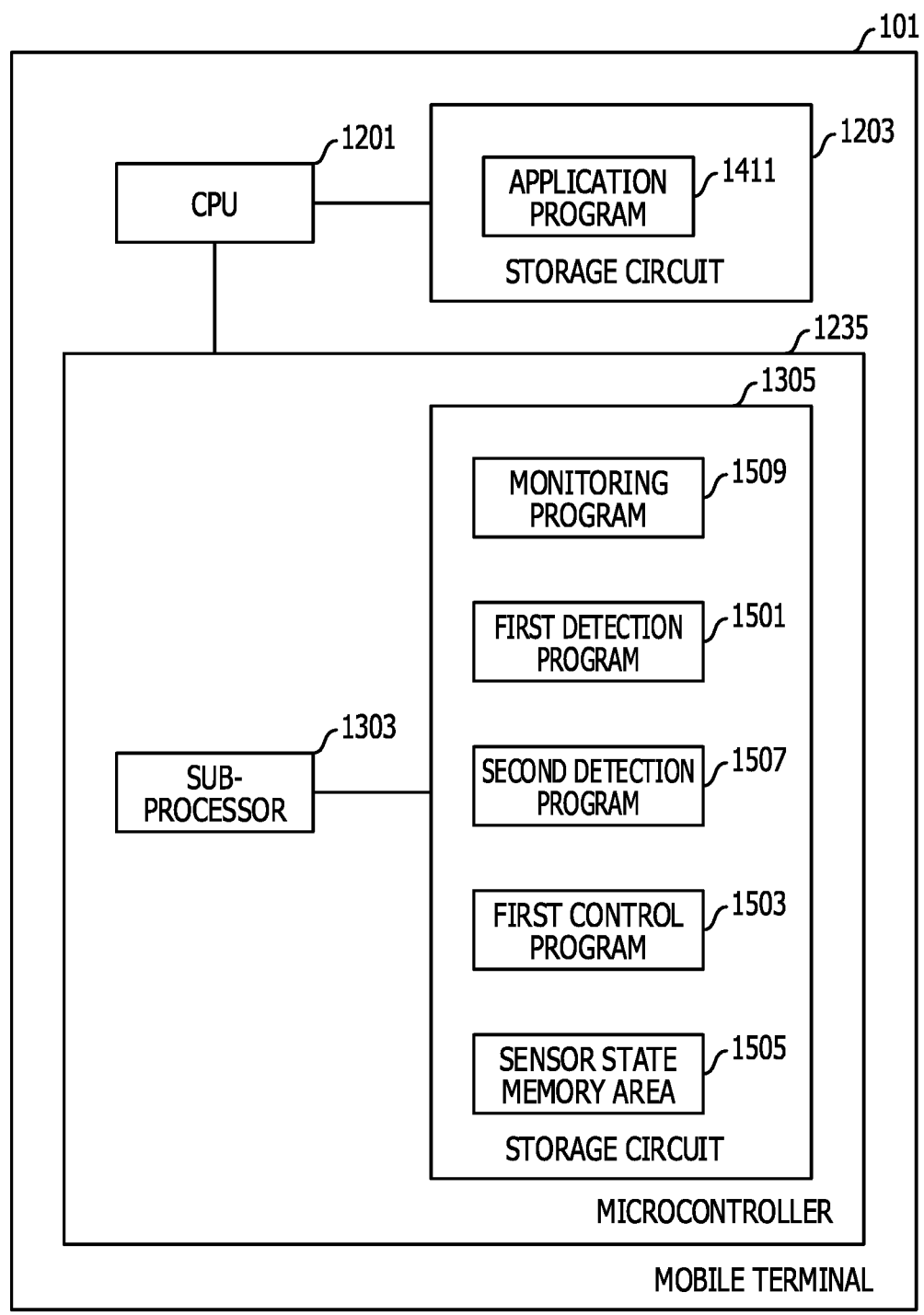
FIG. 15 illustrates an example of program arrangement in the first embodiment.

Subsequently, program arrangement will be described. FIG. 15 illustrates an example of the program arrangement in the first embodiment.

Figure 16:
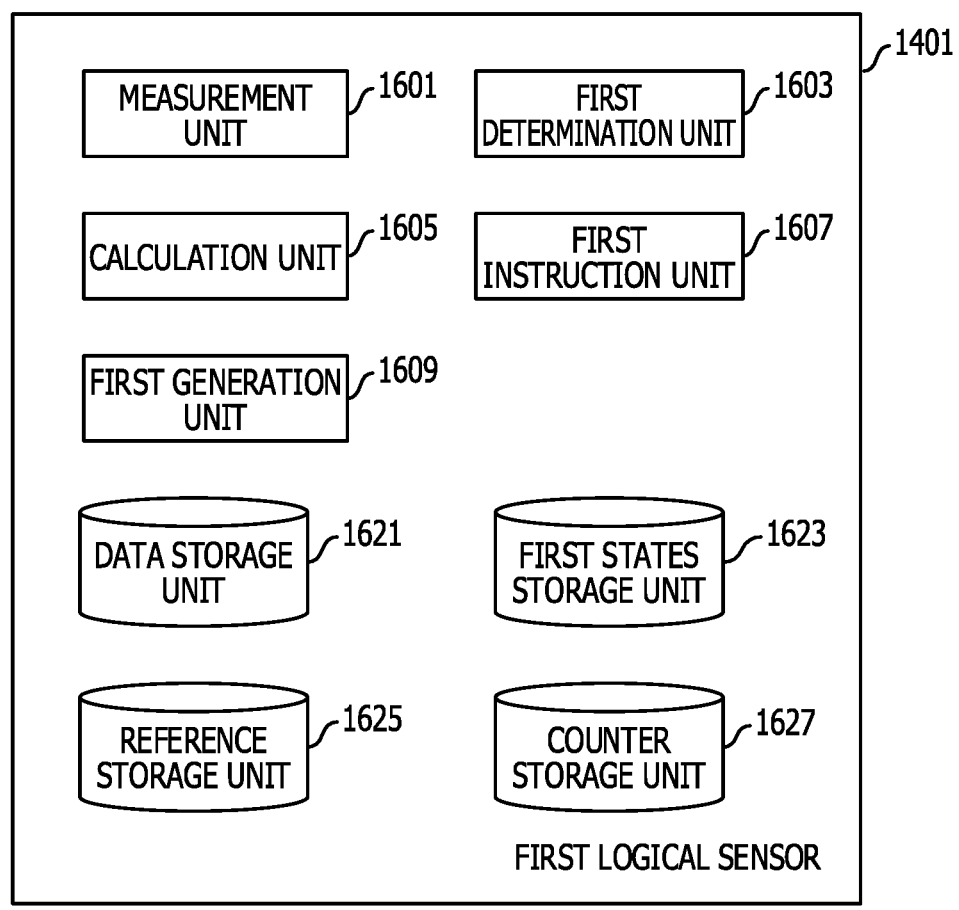
FIG. 16 illustrates an example of a module configuration of a first logical sensor.
Figure 17:
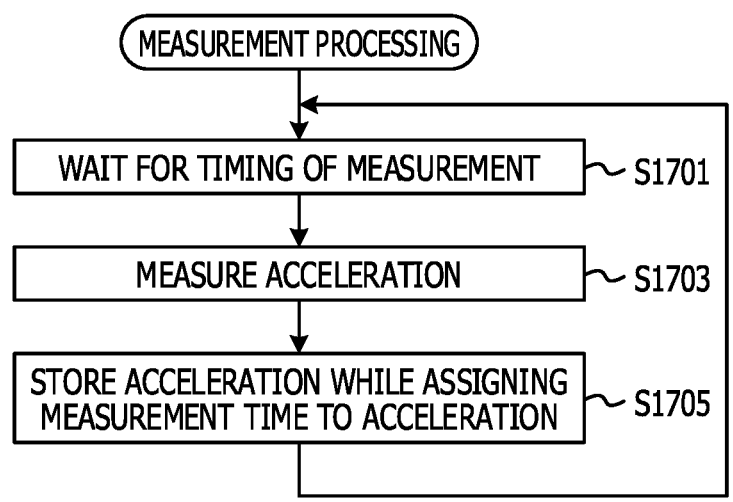
FIG. 17 illustrates an example of a measurement processing flow.
Figure 18:
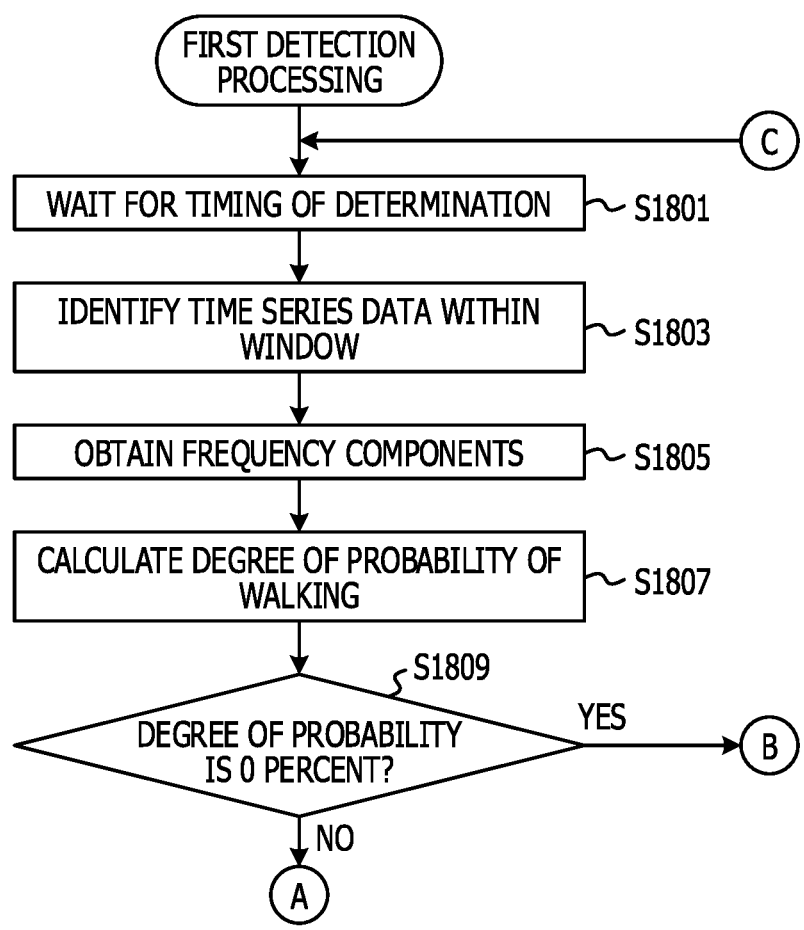
FIGS. 18, 19, and 20 each illustrates an example of a first detection processing flow.
Figure 19:
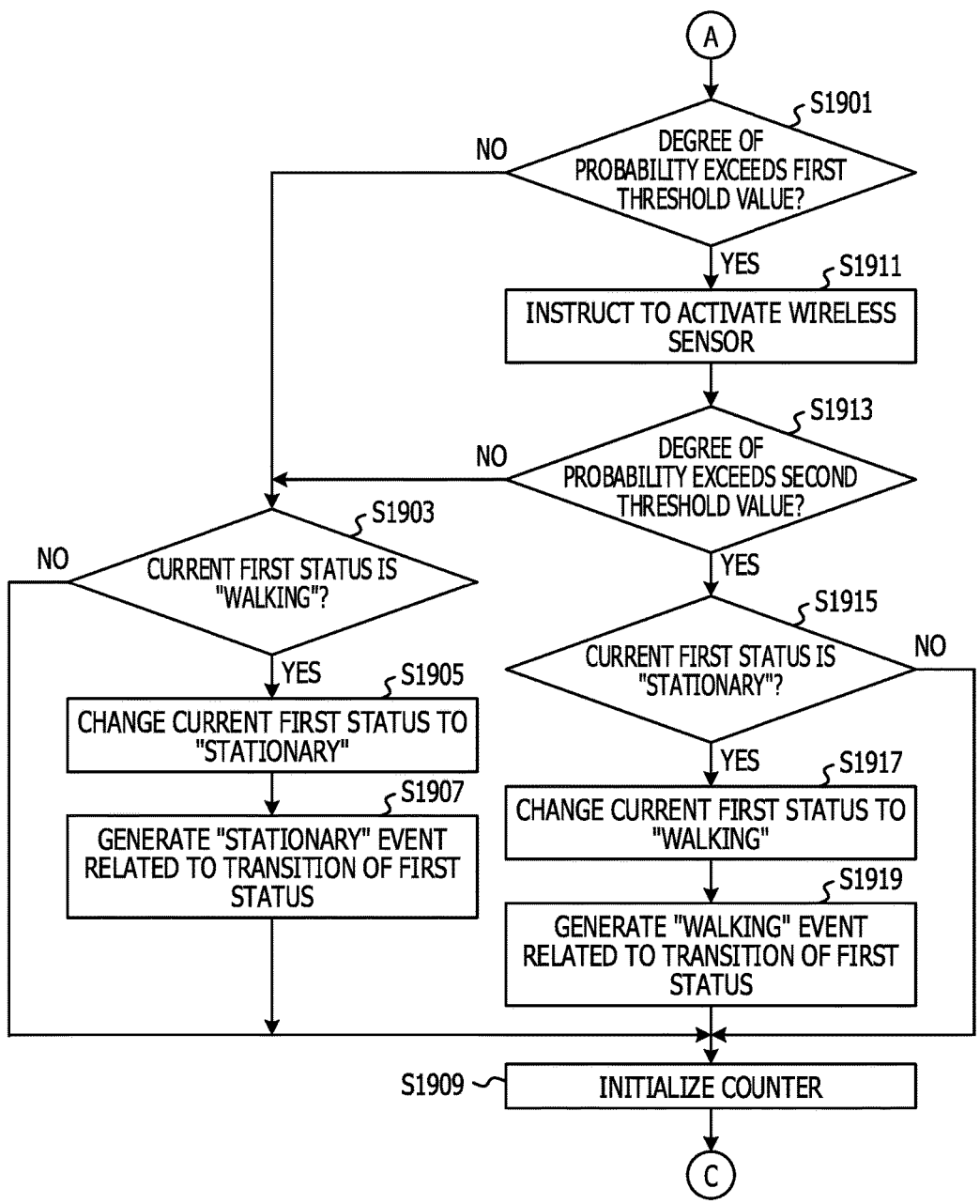
Figure 20:
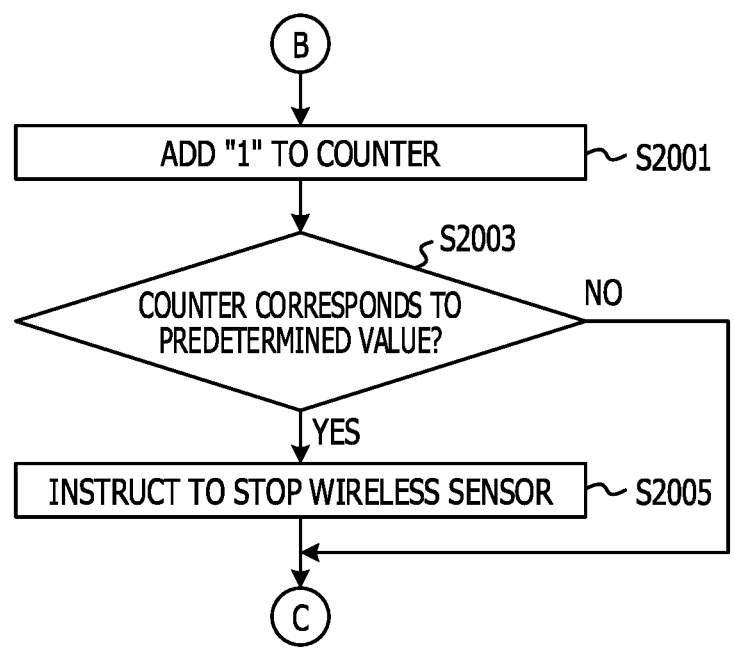

A first detection program 1501 for causing the sub-processor 1303 to perform measurement processing illustrated in FIG. 17 and the first detection processing illustrated in FIG. 18 to FIG. 20 is stored in the storage circuit 1305. The sub-processor 1303 performs the first detection program 1501, thereby realizing the first logical sensor 1401. Note that a data storage unit 1621, a first status storage unit 1623, a reference storage unit 1625, and a counter storage unit 1627, illustrated in FIG. 16, are provided in the storage circuit 1305.

Figure 21:
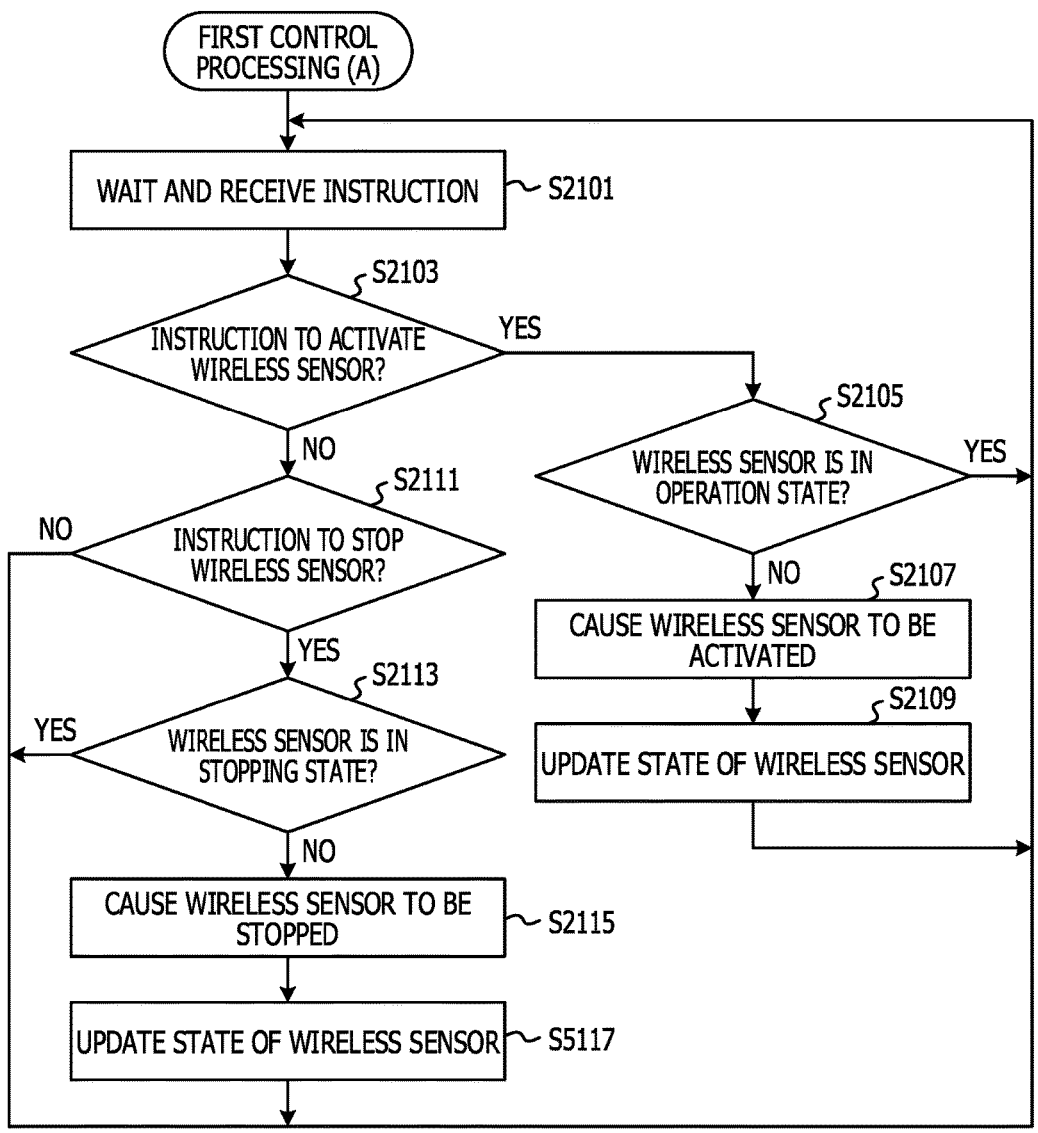
FIG. 21 illustrates a first control processing (A) flow.

A first control program 1503 for causing the sub-processor 1303 to perform first control processing (A) illustrated in FIG. 21 is stored in the storage circuit 1305. The sub-processor 1303 performs the first control program 1503, thereby realizing the first control unit 1403.

A sensor state storage area 1505 corresponding to the sensor state storage unit 1405 is provided in the storage circuit 1305.

Figure 22:
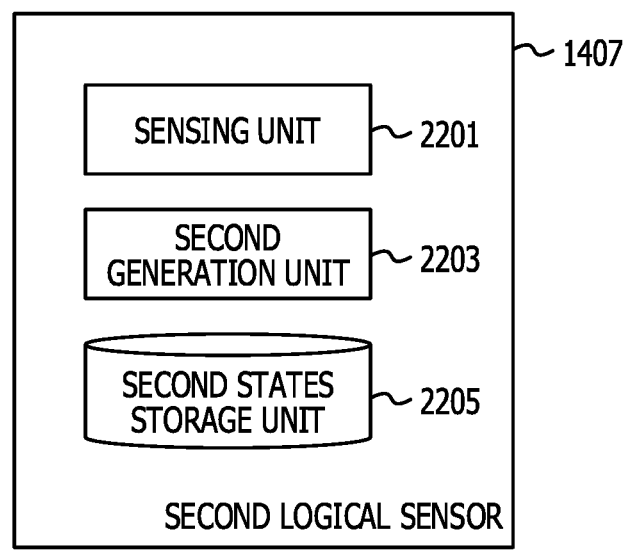
FIG. 22 illustrates an example of a module configuration of a second logical sensor.
Figure 23:
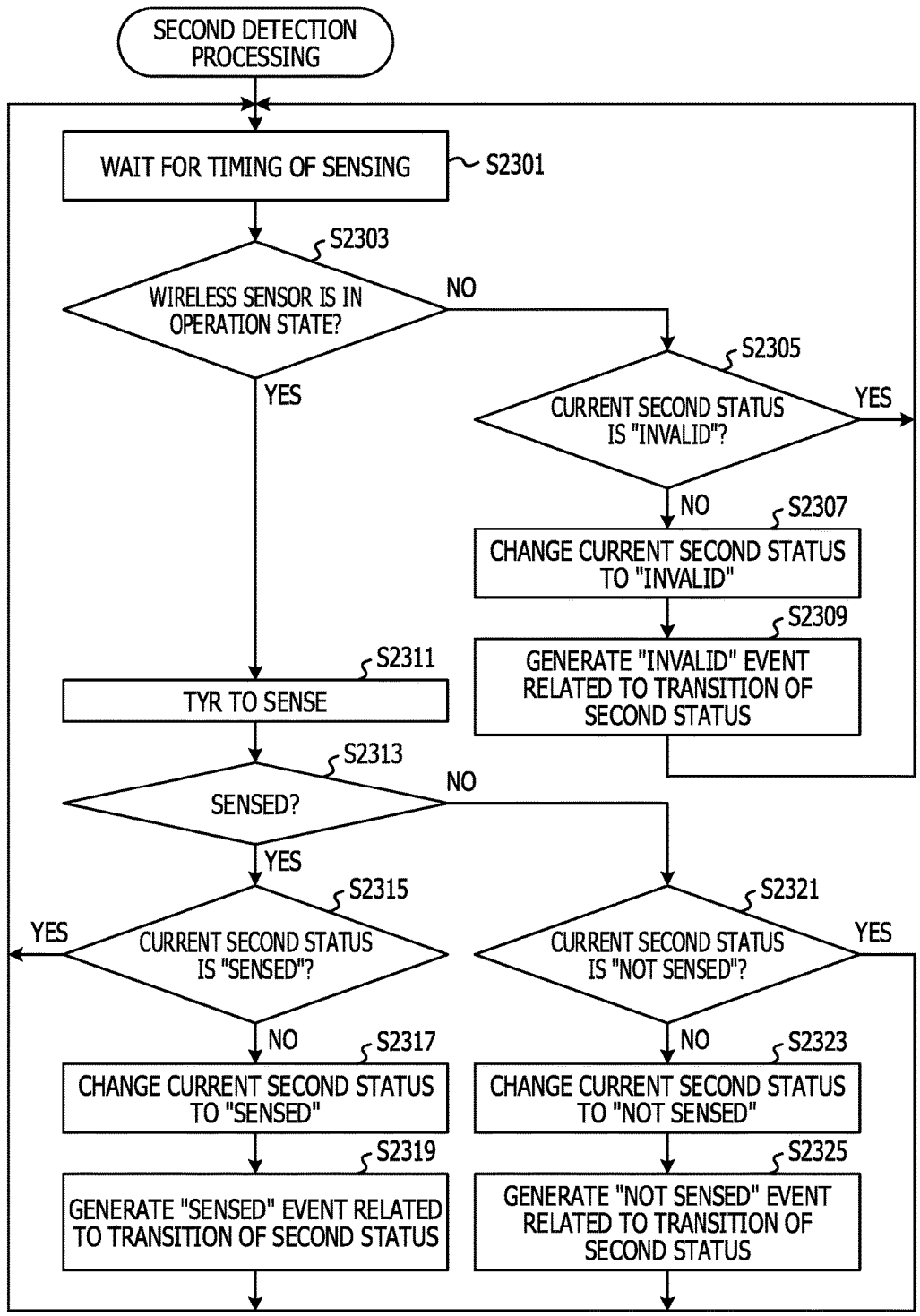
FIG. 23 illustrates an example of a second detection processing flow.

A second detection program 1507 for causing the sub-processor 1303 to perform the second detection processing illustrated in FIG. 23 is stored in the storage circuit 1305. The sub-processor 1303 performs the second detection program 1507, thereby realizing the second logical sensor 1407. Note than a second status storage unit 2205 illustrated in FIG. 22 is provided in the storage circuit 1305.

Figure 24:
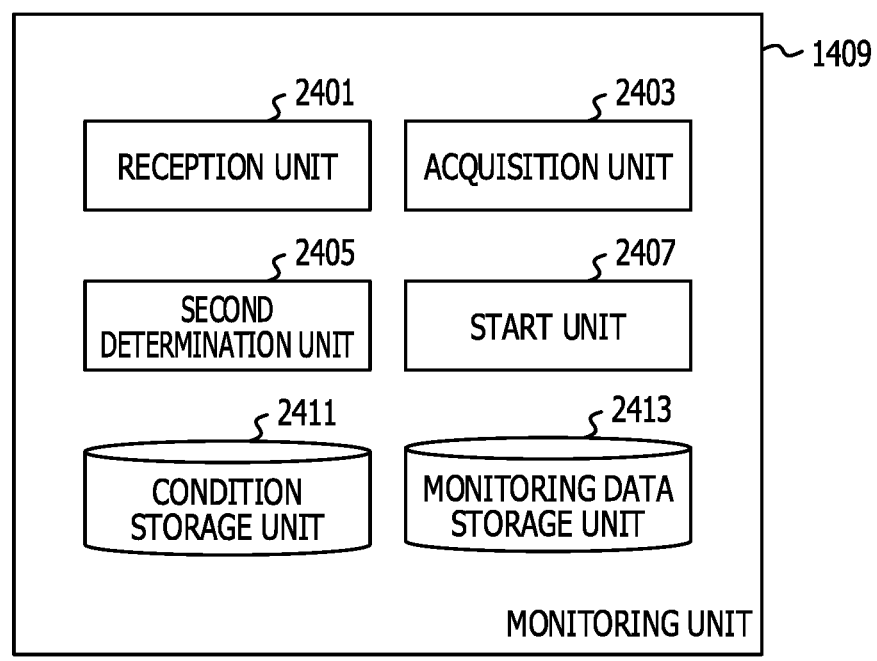
FIG. 24 illustrates an example of a module configuration of a monitoring unit.
Figure 25:
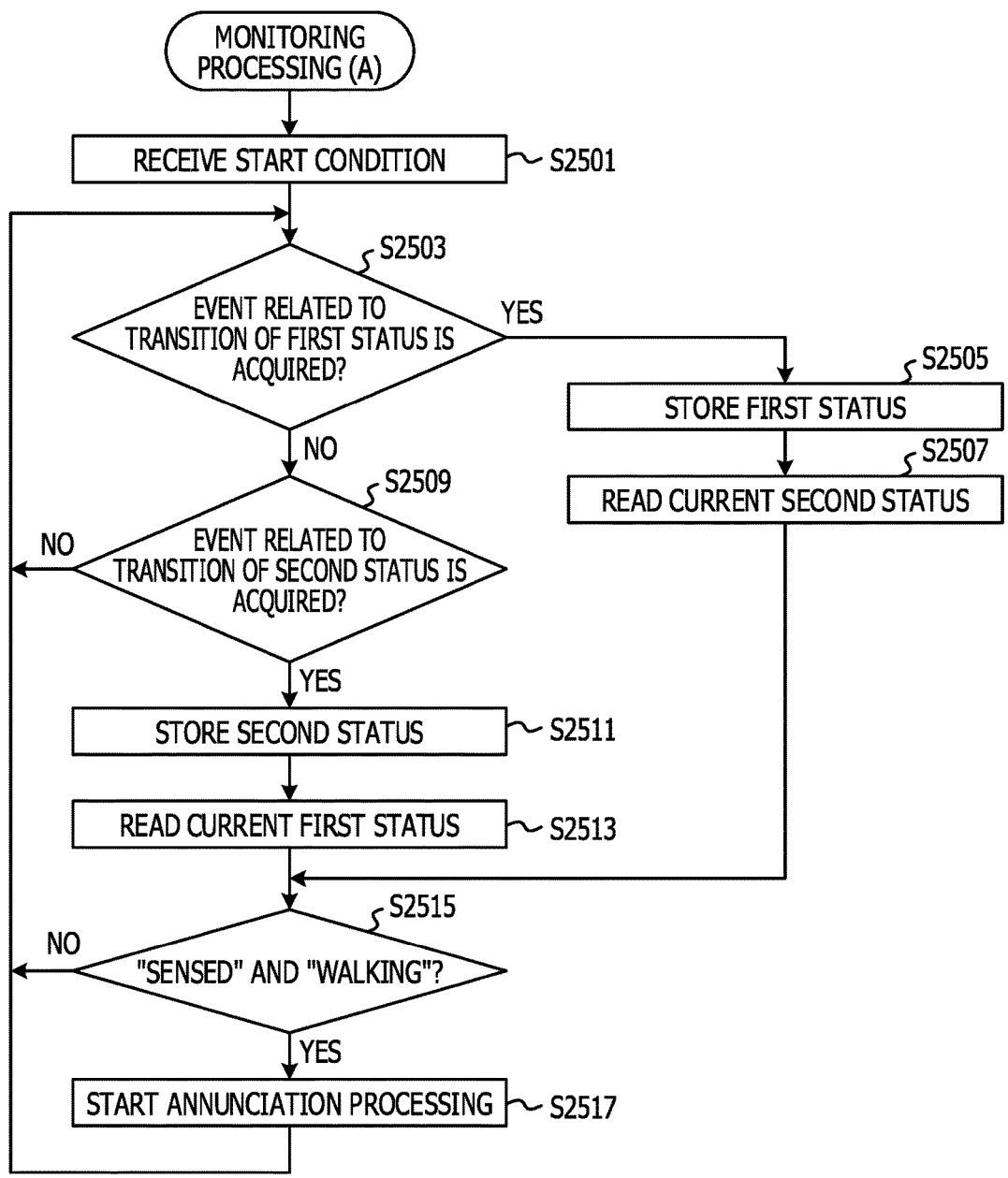
FIG. 25 illustrates a monitoring processing (A) flow.

A monitoring program 1509 for causing the sub-processor 1303 to perform monitoring processing (A) illustrated in FIG. 25 is stored in the storage circuit 1305. The sub-processor 1303 performs the monitoring program 1509, thereby realizing the monitoring unit 1409. Note that a condition storage unit 2411 and a monitoring data storage unit 2413, illustrated in FIG. 24, are provided in the storage circuit 1305.

The application program 1411 is stored in the storage circuit 1203. In addition, the CPU 1201 executes the application program 1411.

FIG. 16 illustrates an example of a module configuration of the first logical sensor 1401. The first logical sensor 1401 includes a measurement unit 1601, a first determination unit 1603, a calculation unit 1605, a first instruction unit 1607, a first generation unit 1609, the data storage unit 1621, the first status storage unit 1623, the reference storage unit 1625, and the counter storage unit 1627.

The measurement unit 1601 measures acceleration by using the acceleration sensor 1237. Based on the time series data of the acceleration, the first determination unit 1603 performs determination of a timing of activating the wireless sensor 1239 and determination of a walking state. The calculation unit 1605 calculates the degree of probability that the user is walking. The first instruction unit 1607 instructs the first control unit 1403 to activate and stop the wireless sensor 1239. The first generation unit 1609 generates an event related to a transition of the first status. The data storage unit 1621 stores therein the time series data of the acceleration. The first status storage unit 1623 stores therein the current first status. The first status is one of "stationary" and "walking". The reference storage unit 1625 stores therein a first threshold value serving as a reference in the determination of a timing of activating the wireless sensor 1239 and a second threshold value serving as a reference in the determination of the walking state. In the counter storage unit 1627, the value of a counter of the number of times the degree of probability that the user is walking is continuously determined as 0 percent is stored.

Next, the measurement processing and the first detection processing, based on the first logical sensor 1401, will be described. The measurement processing is performed in parallel to the first detection processing. FIG. 17 illustrates an example of a measurement processing flow. The measurement unit 1601 waits for a timing of measuring acceleration (S1701). In this example, the sensing unit 2201 measures the acceleration with a predetermined period.

If the relevant timing comes, the measurement unit 1601 measures the acceleration by using the acceleration sensor 1237 (S1703). The measurement unit 1601 stores, in the data storage unit 1621, the acceleration while assigning a measurement time to the acceleration (S1705). In addition, returning to S1701, the above-mentioned processing is repeated.

The first detection processing will be described. FIGS. 18, 19, and 20 each illustrate an example of a first detection processing flow. The first determination unit 1603 waits for a timing of determining the walking state (S1801). In this example, the first determination unit 1603 determines the walking state with a predetermined period.

If the relevant timing comes, the calculation unit 1605 identifies data located within a window, from among the time series data of the acceleration, stored in the data storage unit 1621 (S1803). The window corresponds to a time period to serve as a determination target.

The calculation unit 1605 performs Fourier transform on the time series data of the acceleration included in the window, thereby obtaining frequency components included in the time series data of the acceleration (S1805). Based on the percentage of frequency components (those of frequencies of 1 Hz to 3 Hz in this example) indicating periodicity associated with walking, the calculation unit 1605 calculates the degree of probability that the user is walking (S1807). In a case where the percentage of the frequency components indicating the periodicity associated with the walking is 0 percent, it is determined that the degree of probability that the user is walking is 0 percent. In addition, with an increase in the percentage of the frequency components indicating the periodicity associated with the walking, the determined degree of probability that the user is walking increases. Note that the degree of probability that the user is walking may be calculated by using another method.

The first determination unit 1603 determines whether or not the degree of probability that the user is walking is 0 percent (S1809). In a case where it is determined that the degree of probability that the user is walking is not 0 percent, the processing shifts, via a terminal A, to a processing operation in S1901 illustrated in FIG. 19.

The description shifts to FIG. 19. The first determination unit 1603 determines whether or not the degree of probability that the user is walking exceeds the first threshold value (45 percent in this example) (S1901). In a case of determining that the degree of probability that the user is walking does not exceed the first threshold value, the first determination unit 1603 determines whether or not the current first status stored in the first status storage unit 1623 is "walking" (S1903).

In a case where it is determined that the current first status stored in the first status storage unit 1623 is not "walking", in other words, in a case where the current first status is "stationary", the first status is not changed. In addition, the processing shifts to a processing operation in S1909. The processing operation in S1909 will be described later.

On the other hand, in a case of determining that the current first status stored in the first status storage unit 1623 is "walking", the first determination unit 1603 changes the current first status to "stationary" (S1905).

The first generation unit 1609 generates an event (hereinafter, called a "stationary" event) indicating that the first status makes a transition to "stationary" (S1907). The "stationary" event related to the transition of the first status is communicated to the monitoring unit 1409.

In S1909, the first determination unit 1603 initializes the counter. The counter stores therein the number of times the degree of probability that the user is walking is continuously determined as 0 percent. Specifically, the counter is set to "0". The counter is used in processing illustrated in FIG. 20. In addition, the processing returns, via a terminal C, to the processing operation in S1801 illustrated in FIG. 18, and the above-mentioned processing is repeated.

The description returns to the processing operation in S1901 illustrated in FIG. 19. In a case where it is determined that the degree of probability that the user is walking exceeds the first threshold value, the first instruction unit 1607 instructs the first control unit 1403 to activate the wireless sensor 1239 (S1911).

The first determination unit 1603 determines whether or not the degree of probability that the user is walking exceeds the second threshold value (85 percent in this example) (S1913). In a case where it is determined that the degree of probability that the user is walking does not exceed the second threshold value, the processing shifts to a processing operation in S1903.

On the other hand, in a case of determining that the degree of probability that the user is walking exceeds the second threshold value, the first determination unit 1603 determines whether or not the current first status stored in the first status storage unit 1623 is "stationary" (S1915).

In a case where it is determined that the current first status stored in the first status storage unit 1623 is not "stationary", in other words, in a case where the current first status is "walking", the first status is not changed. In addition, the processing shifts to the processing operation in S1909 without change.

On the other hand, in a case of determining that the current first status stored in the first status storage unit 1623 is "stationary", the first determination unit 1603 changes the current first status to "walking" (S1917).

The first generation unit 1609 generates an event (hereinafter, called a "walking" event) indicating that the first status makes a transition to "walking" (S1919). The "walking" event related to the transition of the first status is communicated to the monitoring unit 1409. In addition, the processing shifts to the processing operation in S1909. This is the end of description of FIG. 19.

The description returns to the processing operation in S1809 illustrated in FIG. 18. In a case where, in S1809, it is determined that the degree of probability that the user is walking is 0 percent, the processing shifts, via a terminal B, to a processing operation in S2001 illustrated in FIG. 20.

The description shifts to FIG. 20. The first determination unit 1603 adds "1" to the counter (S2001). The first determination unit 1603 determines whether or not the counter corresponds to a predetermined value ("2" in this example) (S2003). In a case where it is determined that the counter corresponds to the predetermined value, the first instruction unit 1607 instructs the first control unit 1403 to stop the wireless sensor 1239 (S2005). In other words, in a case where it is determined twice in a row that the degree of probability that the user is walking is 0 percent, the wireless sensor 1239 is stopped. In addition, the processing returns, via the terminal C, to the processing operation in S1801 illustrated in FIG. 18, and the above-mentioned processing is repeated.

On the other hand, in a case where it is determined that the counter does not correspond to the predetermined value, the processing returns, via the terminal C without change, to the processing operation in S1801 illustrated in FIG. 18, and the above-mentioned processing is repeated. Note that in a case the counter exceeds the predetermined value or in a case where the counter reaches an upper limit value of the count, the processing operation in S2001 may be omitted.

Next, first control processing based on the first control unit 1403 will be described. In the present embodiment, the first control processing (A) is performed. FIG. 21 illustrates a first control processing (A) flow. The first control unit 1403 waits and receives an instruction from the first logical sensor 1401 (S2101).

First, the first control unit 1403 determines whether or not being instructed to activate the wireless sensor 1239 (S2103). In a case of determining as being instructed to activate the wireless sensor 1239, the first control unit 1403 determines whether or not the wireless sensor 1239 is in an operation state (S2105). In this example, the first control unit 1403 reads, from the sensor state storage unit 1405, a state of the wireless sensor 1239. In this regard, however, the first control unit 1403 may inquire a state of the wireless sensor 1239.

In a case where it is determined that the wireless sensor 1239 is in the operation state, the processing returns to the processing operation in S2101 without change, and the above-mentioned processing is repeated.

On the other hand, in a case of determining that the wireless sensor 1239 is not in the operation state, in other words, in a case where the wireless sensor 1239 is in a stopping state, the first control unit 1403 causes the wireless sensor 1239 to be activated (S2107). The first control unit 1403 updates the state of the wireless sensor 1239, stored in the sensor state storage unit 1405 (S2109). In other words, changing from the stopping state to the operation state is performed. In addition, the processing returns to the processing operation in S2101, and the above-mentioned processing is repeated.

The description returns to the processing operation in S2103. In a case of determining, in S2103, as not being instructed to activate the wireless sensor 1239, the first control unit 1403 determines whether or not being instructed to stop the wireless sensor 1239 (S2111).

In a case of determining as being instructed to stop the wireless sensor 1239, the first control unit 1403 determines whether or not the wireless sensor 1239 is in the stopping state (S2113).

In a case where it is determined that the wireless sensor 1239 is in the stopping state, the processing returns to the processing operation in S2101 without change, and the above-mentioned processing is repeated.

On the other hand, in a case where it is determined that the wireless sensor 1239 is not in the stopping state, in other words, in a case where the wireless sensor 1239 is in the operation state, the first control unit 1403 causes the wireless sensor 1239 to be stopped (S2115). The first control unit 1403 updates the state of the wireless sensor 1239, stored in the sensor state storage unit 1405 (S2117). In other words, changing from the operation state to the stopping state is performed. In addition, the processing returns to the processing operation in S2101, and the above-mentioned processing is repeated.

In a case of determining, in S2111, as not being instructed to stop the wireless sensor 1239, the instruction is regarded as invalid, the processing returns to the processing operation in S2101, and the above-mentioned processing is repeated. Note that in a case where an instruction other than activation or stopping of the wireless sensor 1239 is not assumed, the processing operation in S2111 may be omitted in a No route in S2103, and the processing may shift to the processing operation in S2113. This is the end of description of the first control processing.

The description shifts to the second logical sensor 1407. FIG. 22 illustrates an example of a module configuration of the second logical sensor 1407. The second logical sensor 1407 includes a sensing unit 2201, a second generation unit 2203, and the second status storage unit 2205. By controlling the wireless sensor 1239 so as to receive a wireless signal (for example, a beacon) radiated from a neighborhood area, the sensing unit 2201 senses the wireless tag 103. The second generation unit 2203 generates an event related to a transition of the second status. The second status storage unit 2205 stores therein the current second status. The second status is one of "invalid", "sensed", and "not sensed".

The second detection processing based on the second logical sensor 1407 will be described. FIG. 23 illustrates an example of a second detection processing flow. The sensing unit 2201 waits for a timing of sensing the wireless tag 103 (S2301). In this example, the sensing unit 2201 tries to sense the wireless tag 103 with a predetermined period.

If the relevant timing comes, the second generation unit 2203 determines whether or not the wireless sensor 1239 is in the operation state (S2303). In this example, the second generation unit 2203 inquires a state of the wireless sensor 1239. In this regard, however, the second generation unit 2203 may read, from the sensor state storage unit 1405, the state of the wireless sensor 1239.

In a case of determining that the wireless sensor 1239 is not in the operation state, the second generation unit 2203 determines whether or not the current second status is "invalid" (S2305).

In a case where it is determined that the current second status is "invalid", the processing returns to the processing operation in S2301 without change, and the above-mentioned processing is repeated.

On the other hand, in a case of determining that the current second status is not "invalid", the second generation unit 2203 changes the current second status to "invalid" (S2307). The second generation unit 2203 generates an "invalid" event related to a transition of the second status (S2309). The "invalid" event related to the transition of the second status is communicated to the monitoring unit 1409. In addition, the processing returns to the processing operation in S2301, and the above-mentioned processing is repeated.

The description returns to the processing operation in S2303. In a case where, in S2303, it is determined that the wireless sensor 1239 is in the operation state, the sensing unit 2201 tries to sense the wireless tag 103 (S2311). Specifically, by using the wireless sensor 1239, the sensing unit 2201 performs an operation for searching for the wireless tag 103 in the vicinity thereof.

The second generation unit 2203 determines whether or not the wireless tag 103 is sensed (S2313). In a case of determining that the wireless tag 103 is sensed, the second generation unit 2203 determines whether or not the current second status is "sensed" (S2315).

In a case where it is determined that the current second status is "sensed", the processing returns to the processing operation in S2301 without change, and the above-mentioned processing is repeated.

On the other hand, in a case of determining that the current second status is not "sensed", the second generation unit 2203 changes the current second status to "sensed" (S2317). The second generation unit 2203 generates a "sensed" event related to the transition of the second status (S2319). The "sensed" event related to the transition of the second status may include the ID of the sensed wireless tag 103. The "sensed" event related to the transition of the second status is communicated to the monitoring unit 1409. In addition, the processing returns to the processing operation in S2301, and the above-mentioned processing is repeated.

The description returns to the processing operation in S2313. In a case of determining, in S2313, that the wireless tag 103 is not sensed, the second generation unit 2203 determines whether or not the current second status is "not sensed" (S2321).

In a case where it is determined that the current second status is "not sensed", the processing returns to the processing operation in S2301 without change, and the above-mentioned processing is repeated.

On the other hand, in a case of determining that the current second status is not "not sensed", the second generation unit 2203 changes the current second status to "not sensed" (S2323). The second generation unit 2203 generates a "not sensed" event related to a transition of the second status (S2325). The "not sensed" event related to the transition of the second status is communicated to the monitoring unit 1409. In addition, the processing returns to the processing operation in S2301, and the above-mentioned processing is repeated. This is the end of description of the second detection processing.

The description shifts to the monitoring unit 1409. FIG. 24 illustrates an example of a module configuration of the monitoring unit 1409. The monitoring unit 1409 includes a reception unit 2401, an acquisition unit 2403, a second determination unit 2405, a start unit 2407, the condition storage unit 2411, and the monitoring data storage unit 2413.

The reception unit 2401 receives a start condition from the application program 1411. The start condition received from the application program 1411 corresponds to the monitoring condition in the monitoring unit 1409. Hereinafter, it is called the "start condition" without change. The acquisition unit 2403 acquires an event related to the transition of the first status and an event related to the transition of the second status. The second determination unit 2405 performs condition determination. The start unit 2407 starts predetermined processing (in this example, the annunciation processing based on the application program 1411). The condition storage unit 2411 stores therein the start condition. The monitoring data storage unit 2413 stores therein the first status and the second status, used for determination of the monitoring condition.

Next, monitoring processing based on the monitoring unit 1409 will be described. In the present embodiment, the monitoring processing (A) is performed. FIG. 25 illustrates a monitoring processing (A) flow. The reception unit 2401 receives the start condition from the application program 1411 (S2501). The reception unit 2401 stores the received start condition in the condition storage unit 2411. The content of the start condition in this example is that the first status is "walking" and the second status is "sensed".

The acquisition unit 2403 determines whether or not an event related to the transition of the first status is acquired from the first logical sensor 1401 (S2503).

In a case of determining that the event related to the transition of the first status is acquired from the first logical sensor 1401, the acquisition unit 2403 stores, in the monitoring data storage unit 2413, the current first status identified by the relevant event (S2505). In a case where a wireless tag ID is included in the event determined, in S2503, to be acquired, the acquisition unit 2403 may store the relevant wireless tag ID in the monitoring data storage unit 2413.

The second determination unit 2405 reads the current second status from the monitoring data storage unit 2413 (S2507). In addition, the processing shifts to a processing operation in S2515.

The description returns to the processing operation in S2503. In a case of determining, in S2503, that the event related to the transition of the first status is not acquired, the acquisition unit 2403 determines whether or not an event related to the transition of the second status is acquired from the second logical sensor 1407 (S2509).

In a case of determining that the event related to the transition of the second status is acquired, the acquisition unit 2403 stores, in the monitoring data storage unit 2413, the current second status identified by the relevant event (S2511).

The second determination unit 2405 reads the current first status from the monitoring data storage unit 2413 (S2513). In addition, the processing shifts to the processing operation in S2515.

In S2515, the second determination unit 2405 determines whether or not the start condition is satisfied. In this example, it is determined whether or not the first status is "walking" and the second status is "sensed".

In a case where it is determined that the start condition is not satisfied, the processing returns to the processing operation in S2503, and the above-mentioned processing is repeated. In addition, in a case where, in S2509, it is determined that an event related to the transition of the second status is not acquired, the event is regarded as invalid, the processing returns to the processing operation in S2503, and the above-mentioned processing is repeated.

On the other hand, in a case where, in S2515, it is determined that the start condition is satisfied, the start unit 2407 starts the annunciation processing based on the application program 1411 (S2517). A method for starting the predetermined processing based on the application program 1411 is arbitrary. The start unit 2407 may send, for example, a command to the application program 1411. The start unit 2407 may use a queue. In addition, the processing returns to the processing operation in S2503, and the above-mentioned processing is repeated.

According to the present embodiment, failures in determination in which states are combined are reduced in the mobile terminal 101 in which the wireless sensor 1239 is caused to subsequently operate.

Second Embodiment

In the present embodiment, an example of starting the annunciation processing after switching the CPU 1201 from a power saving mode to a normal mode will be described.

Figure 26:
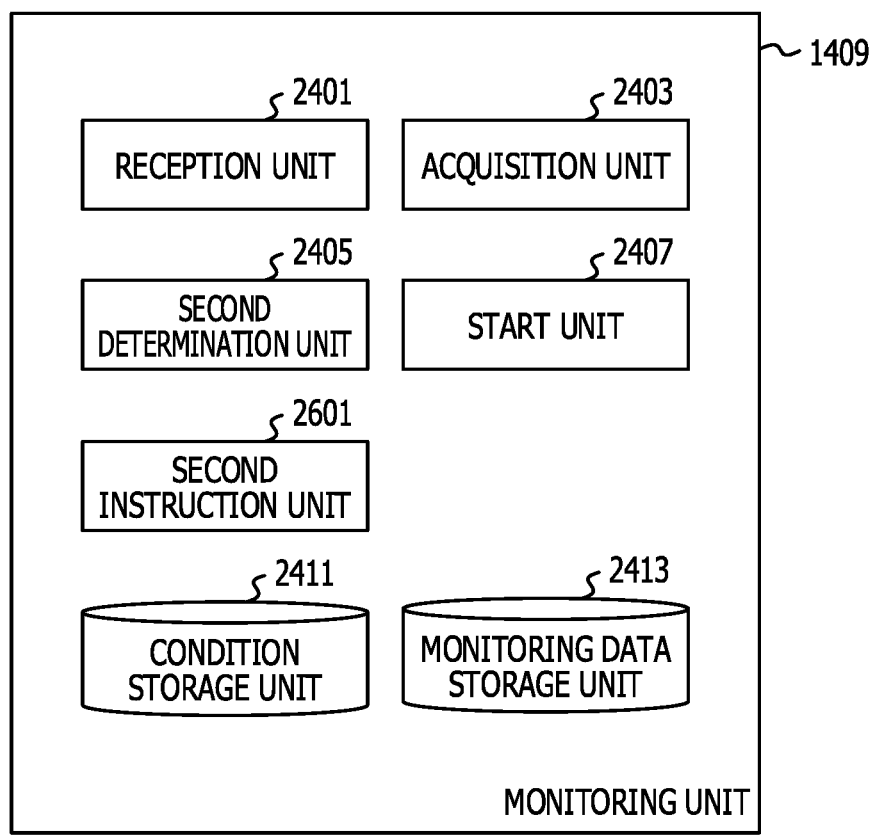
FIG. 26 illustrates an example of a module configuration of the monitoring unit in a second embodiment.

FIG. 26 illustrates an example of a module configuration of the monitoring unit 1409 in the second embodiment. The monitoring unit 1409 in the second embodiment includes a second instruction unit 2601 in addition to the modules illustrated in FIG. 24. The second instruction unit 2601 instructs the CPU 1201 to switch to a mode. Note that, in the present embodiment, it is assumed that sometimes the CPU 1201 operates in the power saving mode. Processing for switching the CPU 1201 to the power saving mode is arbitrary and may use a method of the related art.

Figure 27:
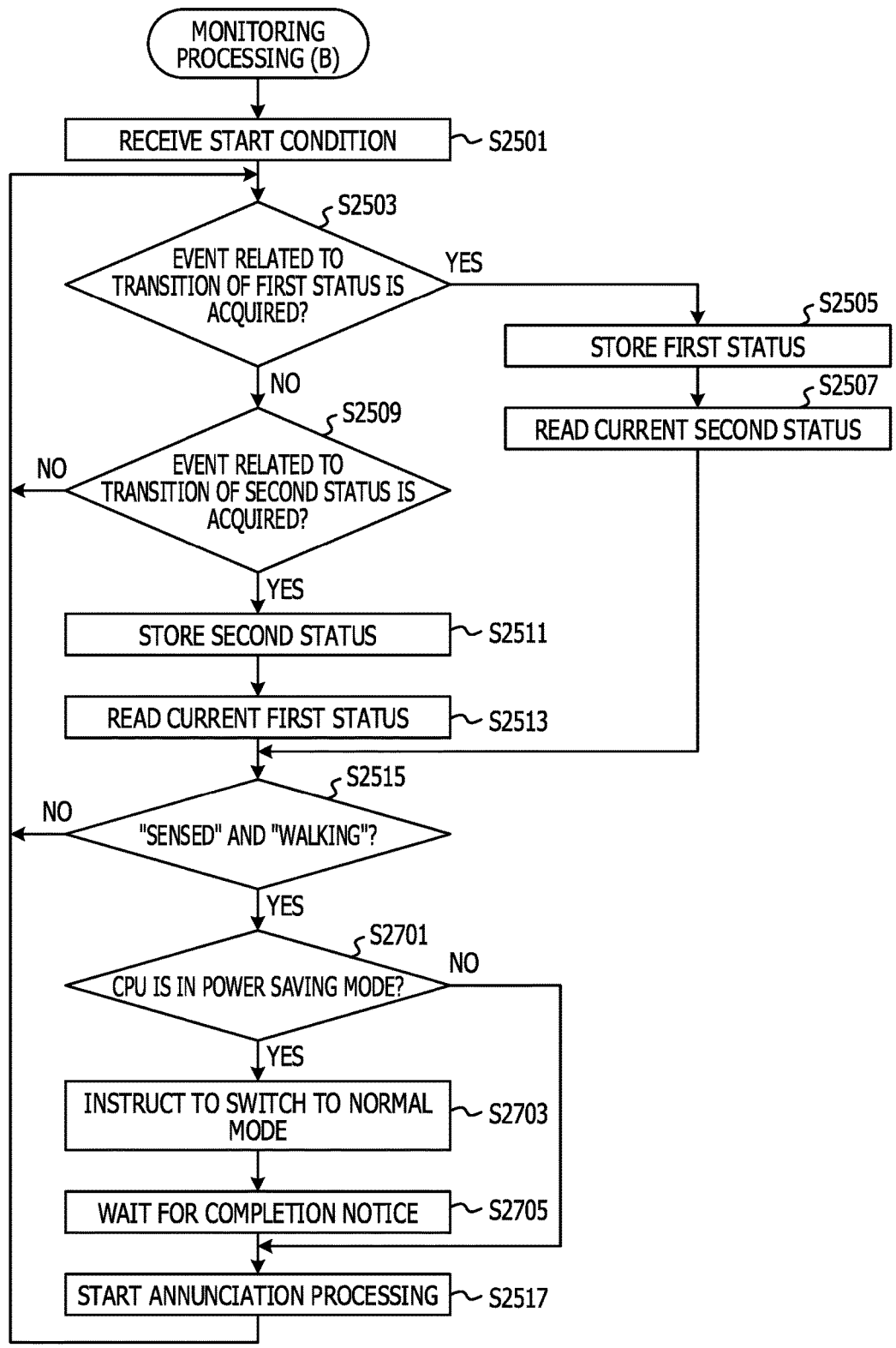
FIG. 27 illustrates a monitoring processing (B) flow.

In the present embodiment, in place of the monitoring processing (A), monitoring processing (B) is performed. FIG. 27 illustrates a monitoring processing (B) flow. Processing operations in S2501 to S2515 are the same as those in the case of the monitoring processing (A).

In a case where, in S2515, it is determined that the start condition is satisfied, the second instruction unit 2601 determines whether or not the CPU 1201 operates in the power saving mode (S2701). In this example, the second instruction unit 2601 inquires a current mode of the CPU 1201.

In a case where it is determined that the CPU 1201 is not in a state of operating in the power saving mode, in other words, the CPU 1201 operates in the normal mode, the start unit 2407 starts the annunciation processing based on the application program 1411 without change (S2517).

On the other hand, in a case of determining that the CPU 1201 operates in the power saving mode, the second instruction unit 2601 instructs the CPU 1201 to switch to the normal mode (S2703). In addition, the second instruction unit 2601 waits for a completion notice from the CPU 1201 (S2705).

Upon receiving the completion notice from the CPU 1201, the start unit 2407 starts the annunciation processing based on the application program 1411 (S2517).

According to the present embodiment, the CPU 1201 serving as a main processor is caused to wait in the power saving mode until the start condition is satisfied. Accordingly, power consumption is suppressed.

Third Embodiment

In the present embodiment, an example of starting the annunciation processing after starting the stopped CPU 1201 will be described.

Figure 28:
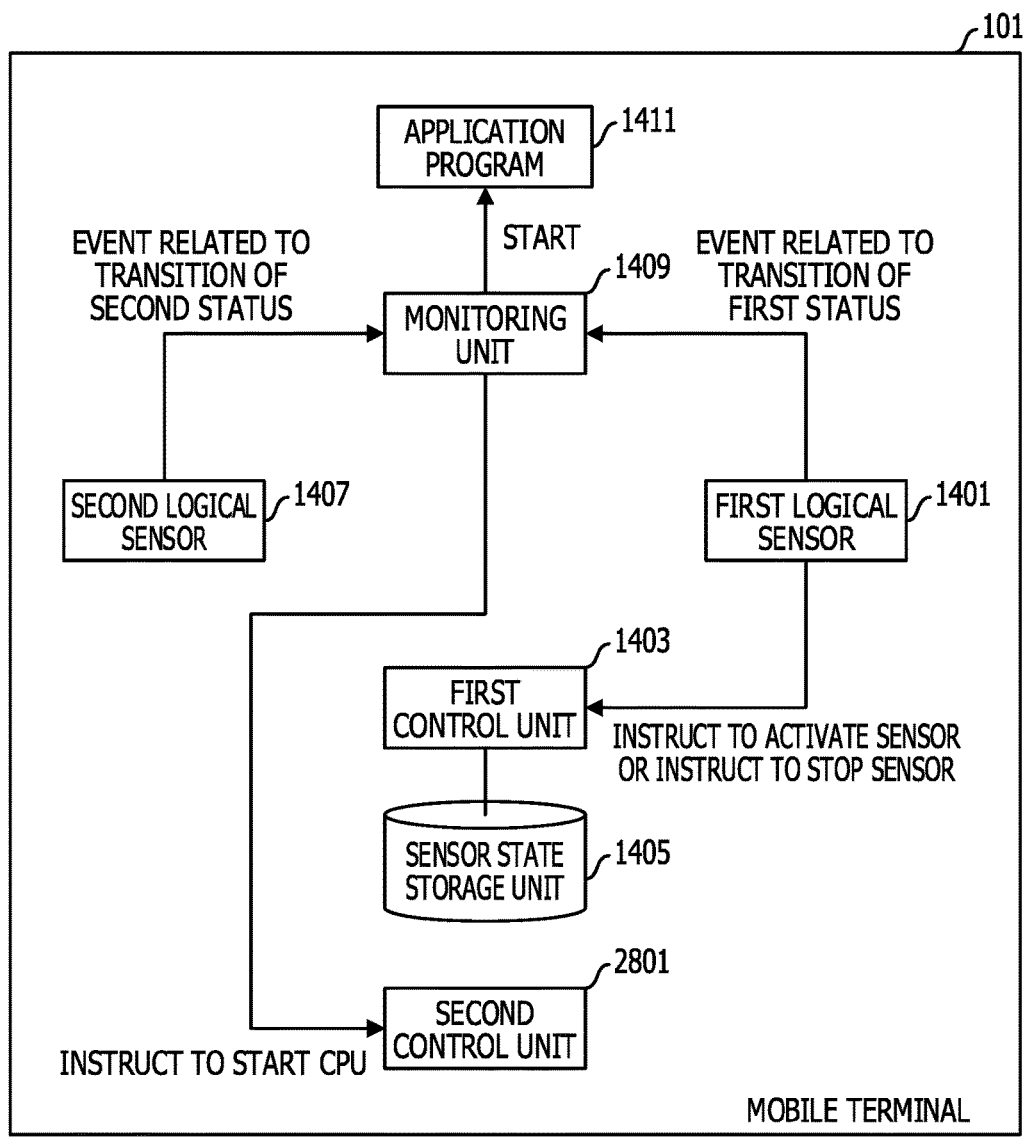
FIG. 28 illustrates an example of a module configuration of the mobile terminal in a third embodiment.

FIG. 28 illustrates an example of a module configuration of the mobile terminal 101 in the third embodiment. The mobile terminal 101 in the third embodiment includes a second control unit 2801 in addition to the modules illustrated in FIG. 14. The second control unit 2801 causes the CPU 1201 to be started.

Figure 29:
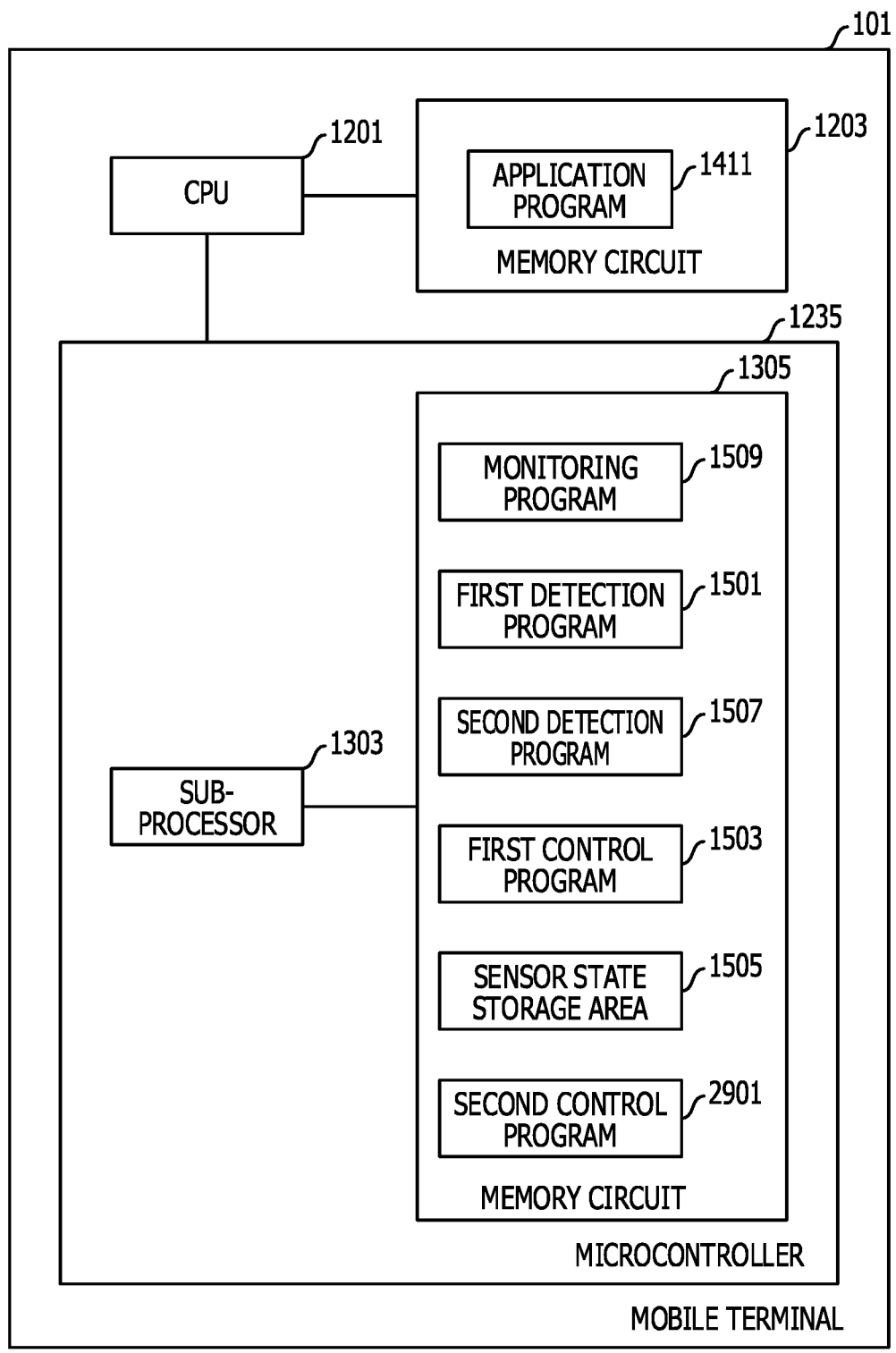
FIG. 29 illustrates an example of program arrangement in the third embodiment.

FIG. 29 illustrates an example of program arrangement in the third embodiment. The example of the program arrangement illustrated in the third embodiment, a second control program 2901 is arranged in the storage circuit 1305 in addition to the programs illustrated in FIG. 15.

Figure 31:
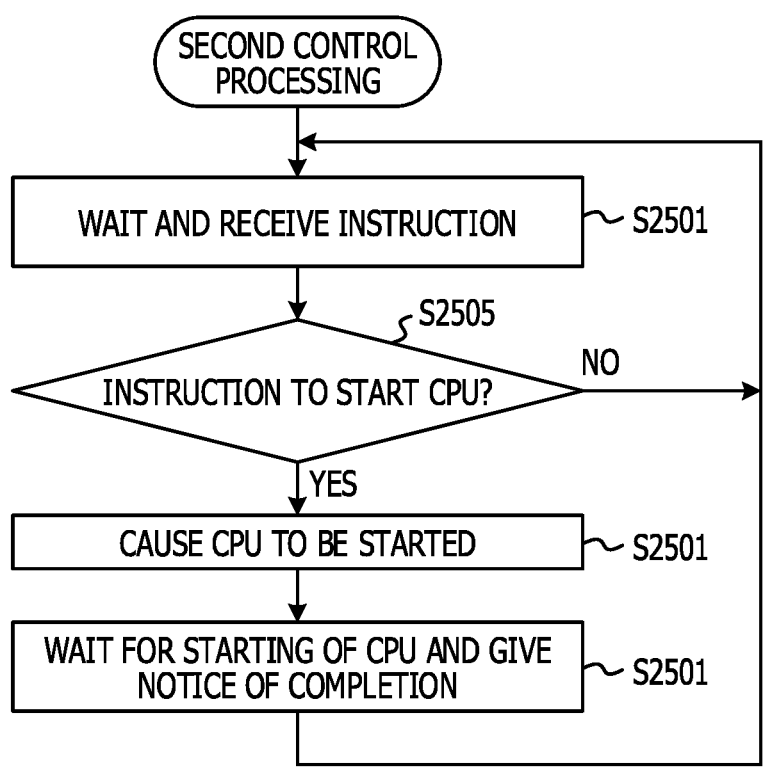
FIG. 31 illustrates an example of a second control processing flow.

The second control program 2901 for causing the sub-processor 1303 to perform second control processing illustrated in FIG. 31 is stored in the storage circuit 1305. The sub-processor 1303 performs the second control program 2901, thereby realizing the second control unit 2801.

Figure 30:
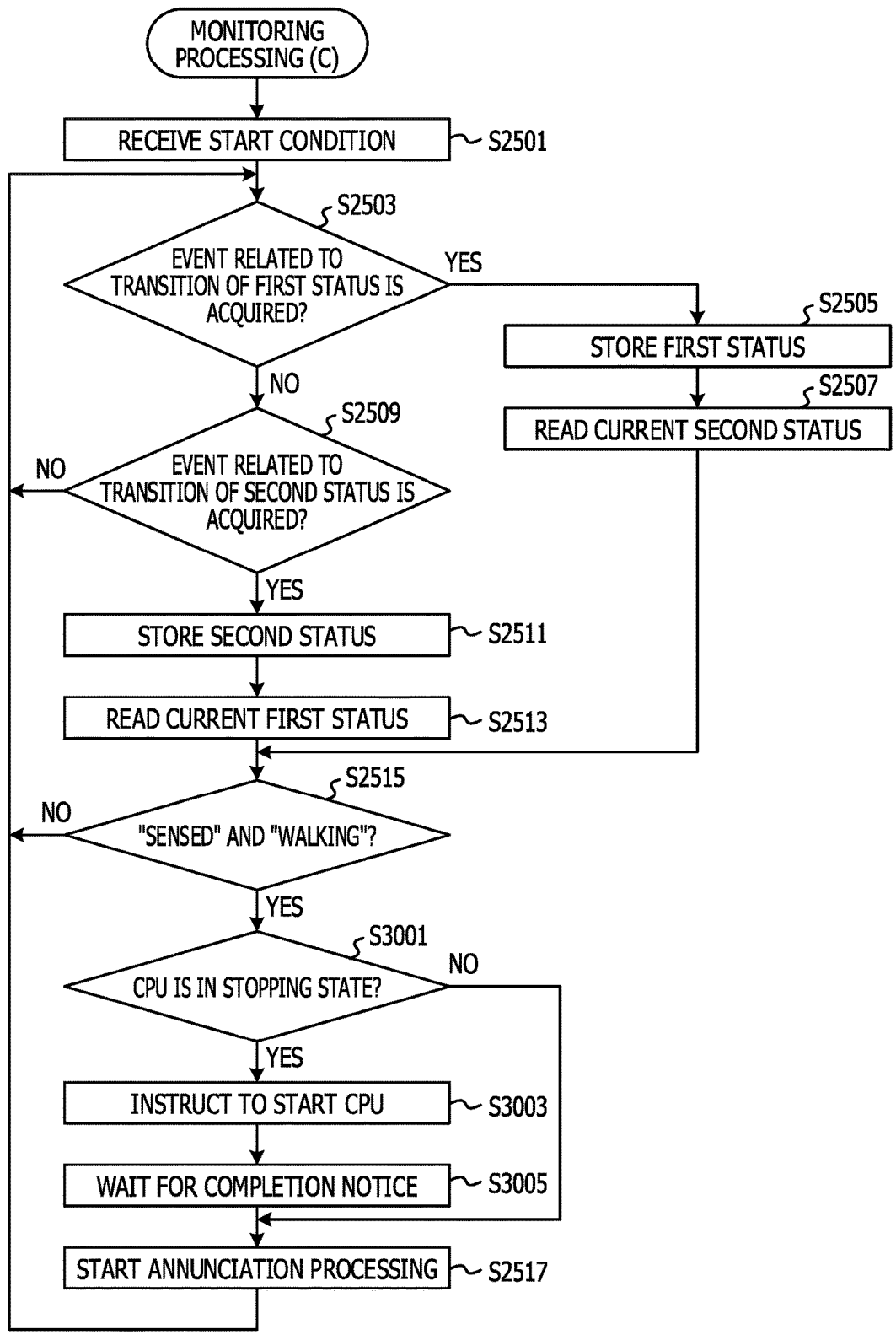
FIG. 30 illustrates a monitoring processing (C) flow.

In the present embodiment, in place of the monitoring processing (A), monitoring processing (C) is performed. FIG. 30 illustrates a monitoring processing (C) flow. Processing operations in S2501 to S2515 are the same as those in the case of the monitoring processing (A).

In a case where, in S2515, it is determined that the start condition is satisfied, the second instruction unit 2601 determines whether or not the CPU 1201 is in a stopping state (S3001).

In a case where it is determined that the CPU 1201 is not in the stopping state, in other words, in a case where the CPU 1201 is in an operation state, the start unit 2407 starts the annunciation processing based on the application program 1411 without change (S2517).

On the other hand, in a case of determining that the CPU 1201 is in the stopping state, the second instruction unit 2601 instructs the second control unit 2801 to start the CPU 1201 (S3003). In addition, the second instruction unit 2601 waits for a completion notice from the second control unit 2801 (S3005).

Upon receiving the completion notice from the second control unit 2801, the start unit 2407 starts the annunciation processing based on the application program 1411 (S2517).

Subsequently, the second control processing based on the second control unit 2801 will be described. FIG. 31 illustrates an example of a second control processing flow. The second control unit 2801 waits and receives an instruction from the monitoring unit 1409 (S3101). The second control unit 2801 determines whether or not the received instruction is an instruction to start the CPU (S3103). In a case where it is determined that the received instruction is not an instruction to start the CPU, the instruction is regarded as invalid, and the processing returns to the processing operation in S3101. On the other hand, in a case of determining that the received instruction is an instruction to start the CPU, the second control unit 2801 causes the CPU 1201 to be started (S3105). The second control unit 2801 waits for the starting of the CPU 1201 and notifies the monitoring unit 1409 of completion (S3107). In addition, the processing returns to the processing operation in S3101.

In the processing operation in S3105, the second control unit 2801 may start power supply to the CPU 1201 by using a power controller.

Figure 32:
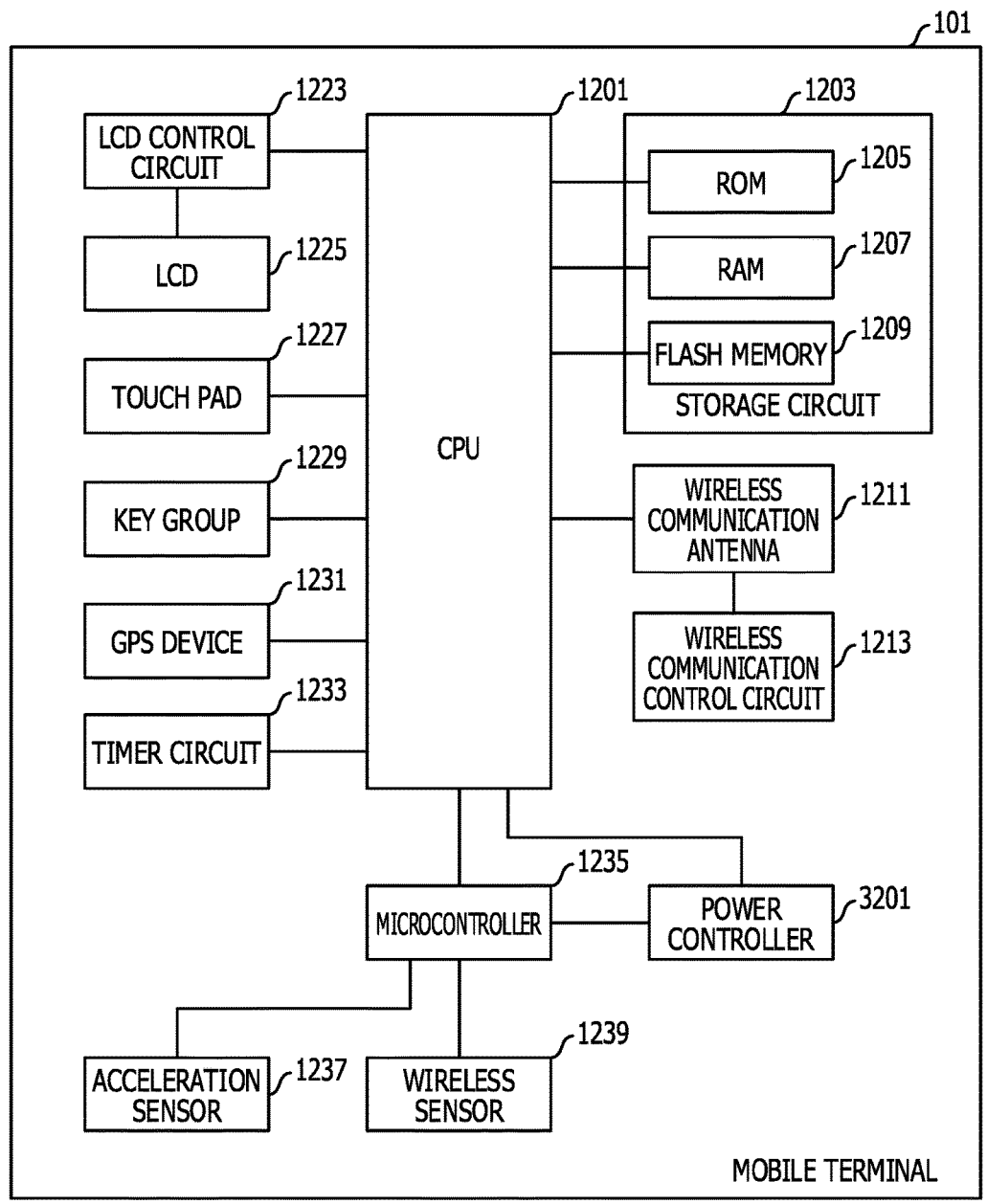
FIGS. 32, 33, 34, and 35 each illustrates an example of a hardware configuration of the mobile terminal in the third embodiment.

A hardware configuration of the mobile terminal 101 equipped with the power controller will be described. FIGS. 32, 33, 34, and 35 each illustrate an example of a hardware configuration of the mobile terminal 101 in the third embodiment. FIG. 32 illustrates an example of the hardware configuration of the mobile terminal 101 in the third embodiment. In this example, a power controller 3201 for controlling power supply to the CPU 1201 is provided. In addition, the microcontroller 1235 coupled to the power controller 3201 controls the power controller 3201.

Figure 33:
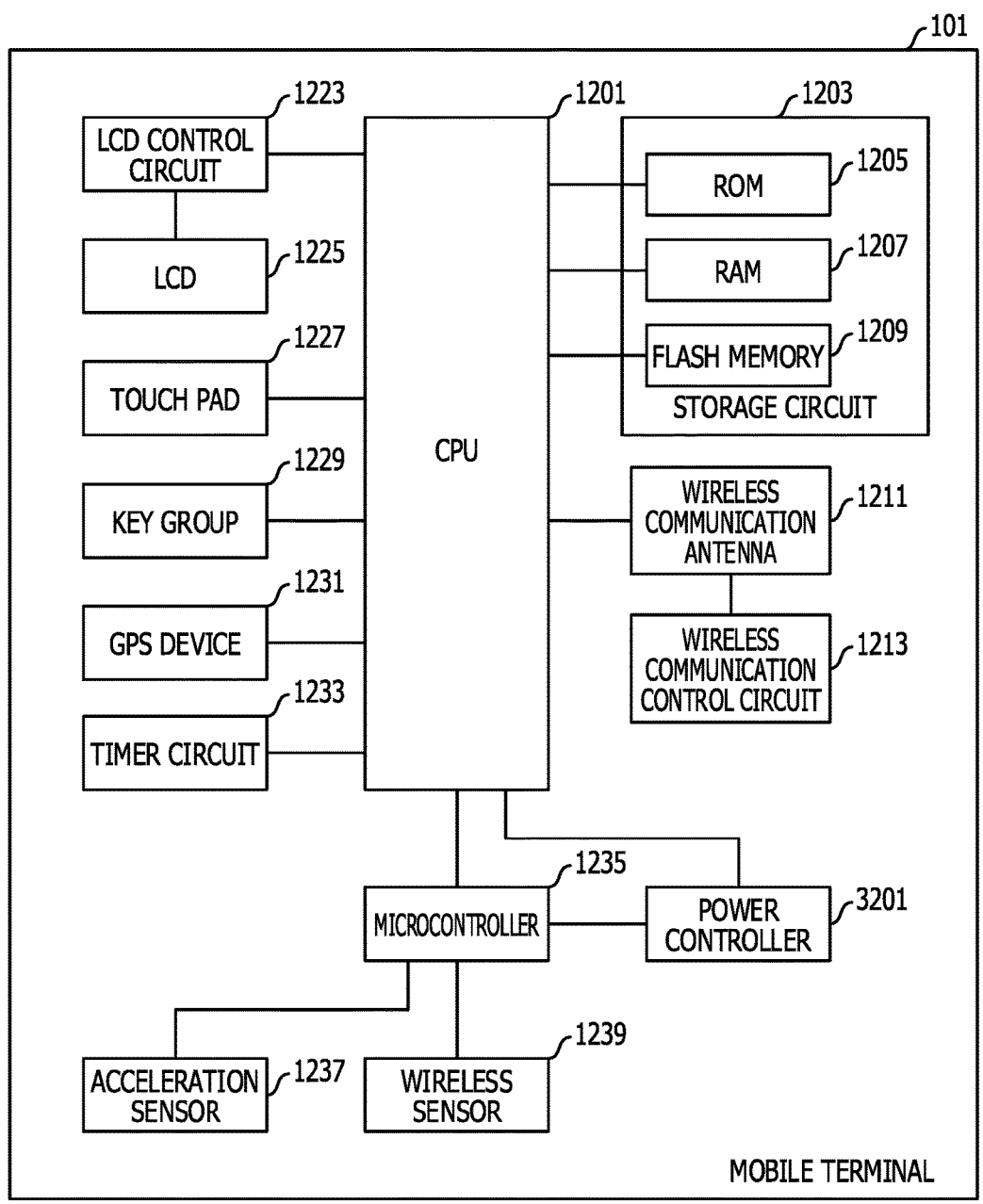

In addition, the power controller 3201 may further control power supply to the wireless sensor 1239. FIG. 33 illustrates an example of the hardware configuration of the mobile terminal 101 in that case. In this example, the power controller 3201 for controlling power supply to the CPU 1201 and the wireless sensor 1239 is provided.

In S2107 illustrated in FIG. 21, the second control unit 2801 controls the power controller 3201, thereby starting power supply to the wireless sensor 1239. In addition, in S2115 illustrated in FIG. 21, the second control unit 2801 controls the power controller 3201, thereby stopping power supply to the wireless sensor 1239.

Figure 34:
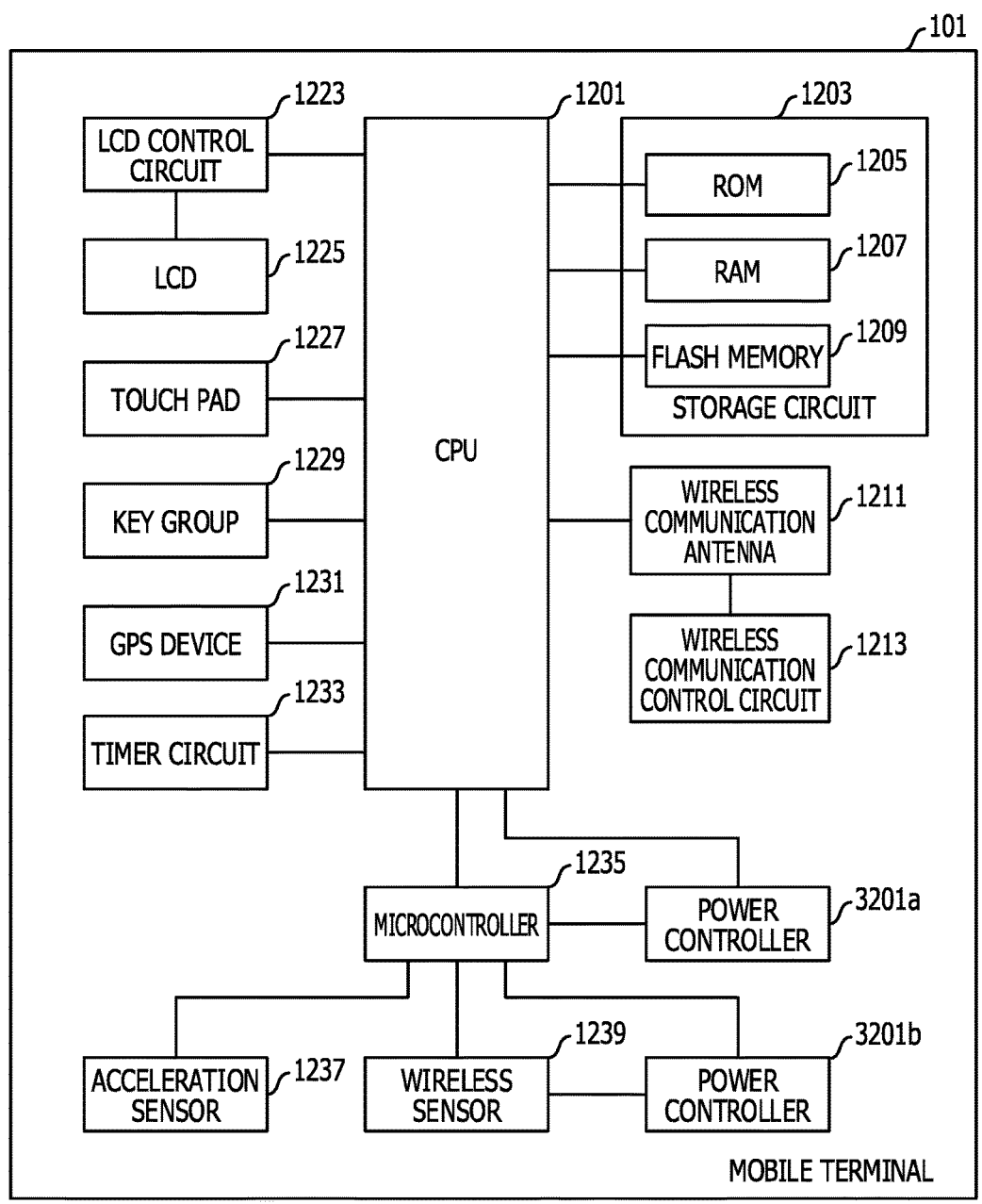

The two power controllers 3201 may be provided. FIG. 34 illustrates an example of the hardware configuration of the mobile terminal 101 in that case. In this example, a power controller 3201a for controlling power supply to the CPU 1201 and a power controller 3201b for controlling power supply to the wireless sensor 1239 are provided.

In S3105 illustrated in FIG. 31, the second control unit 2801 controls the power controller 3201a, thereby starting power supply to the CPU 1201. In S2107 illustrated in FIG. 21, the second control unit 2801 controls the power controller 3201b, thereby starting power supply to the wireless sensor 1239. In addition, in S2115 illustrated in FIG. 21, the second control unit 2801 controls the power controller 3201b, thereby stopping power supply to the wireless sensor 1239.

Figure 35:
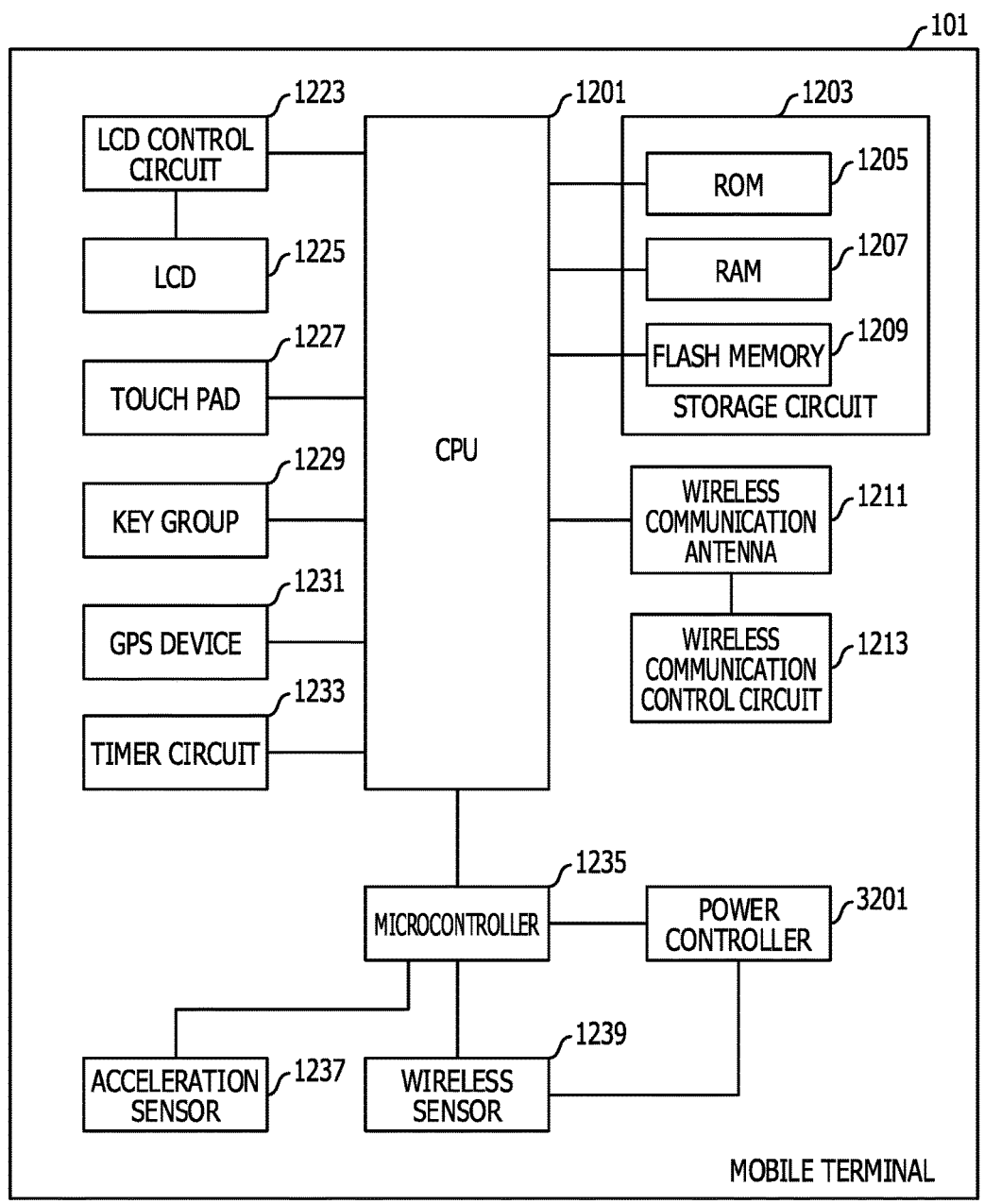

In addition, the power controller 3201a in the example of the configuration hardware illustrated in FIG. 34 may be omitted. FIG. 35 illustrates an example of the hardware configuration of the mobile terminal 101 in that case. In this example, the power controller 3201 for controlling power supply to the wireless sensor 1239 is provided.

In S2107 illustrated in FIG. 21, the second control unit 2801 controls the power controller 3201, thereby starting power supply to the wireless sensor 1239. In S2115 illustrated in FIG. 21, the second control unit 2801 controls the power controller 3201, thereby stopping power supply to the wireless sensor 1239.

According to the present embodiment, the CPU 1201 serving as a main processor does not have to be caused to operate until the start condition is satisfied. Accordingly, power consumption is suppressed.

In addition, until a condition is satisfied, electric power does not have to be supplied to a processor.

Fourth Embodiment

While, in each of the above-mentioned embodiments, an example of a configuration in which sensors are coupled to the one microcontroller 1235 is described, the microcontroller 1235 may be separately provided for each of sensors.

Figure 36:
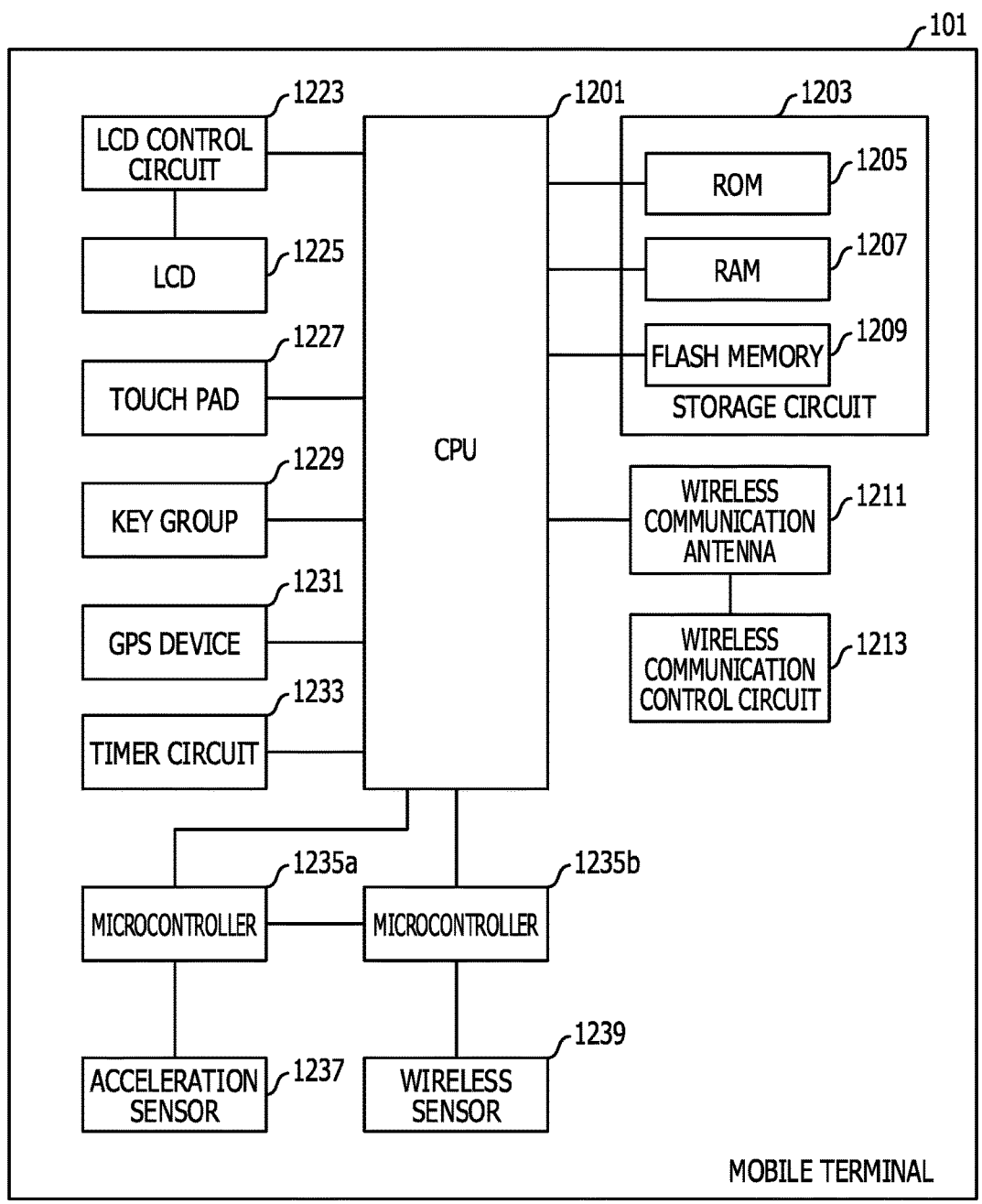
FIG. 36 illustrates an example of a hardware configuration of the mobile terminal in a fourth embodiment.

FIG. 36 illustrates an example of a hardware configuration of the mobile terminal 101 in the fourth embodiment. In this example, a microcontroller 1235a coupled to the acceleration sensor 1237 is provided. The microcontroller 1235a is further coupled to the CPU 1201.

In addition, a microcontroller 1235b coupled to the wireless sensor 1239 is provided. The microcontroller 1235b is further coupled to the CPU 1201.

In this example, the microcontroller 1235a and the microcontroller 1235b are coupled to each other. In other words, the input-output interface circuit 1301 in the microcontroller 1235a and the input-output interface circuit 1301 in the microcontroller 1235b are coupled to each other.

Figure 37:
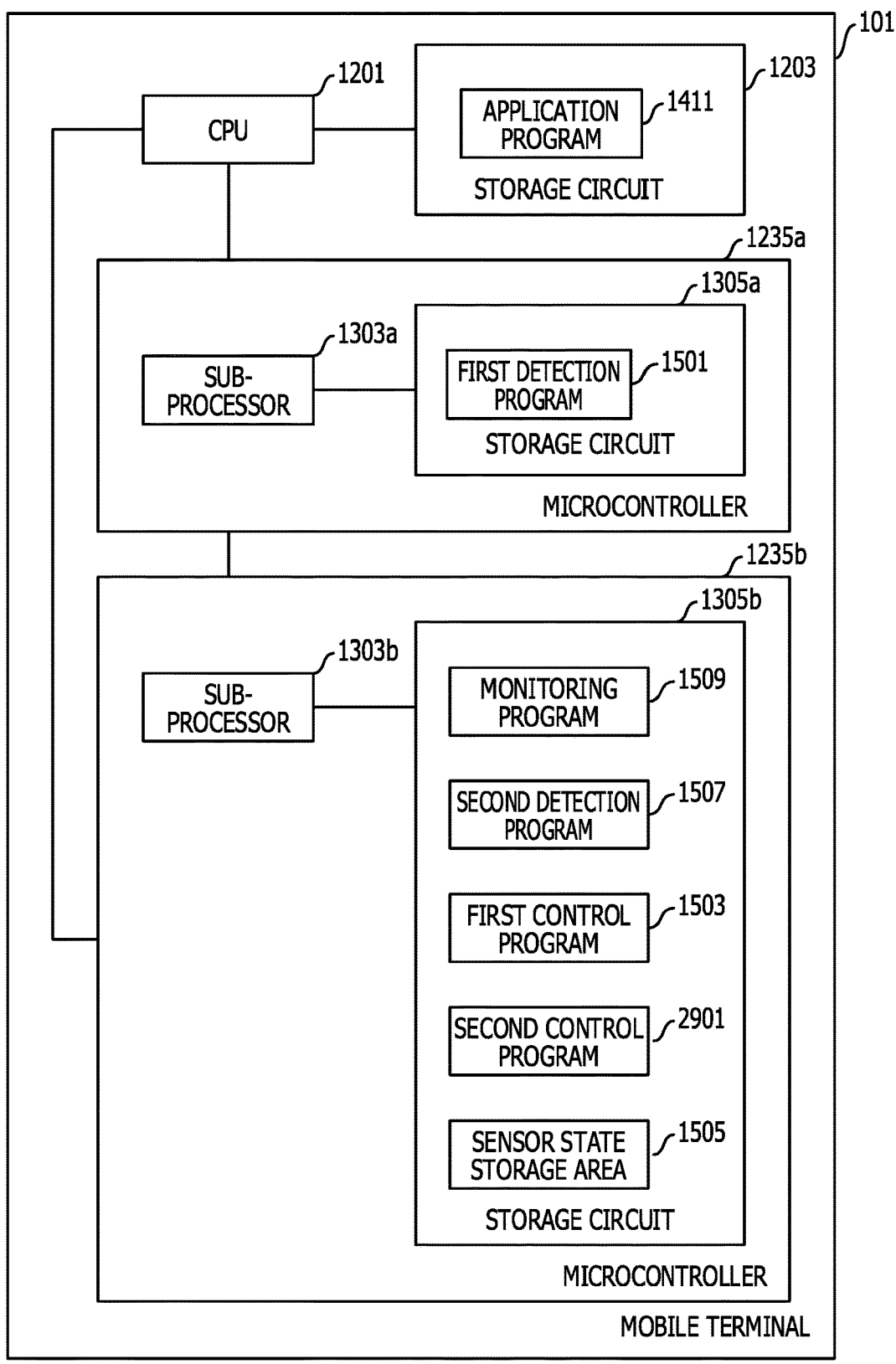
FIG. 37 illustrates an example of program arrangement in the fourth embodiment.

FIG. 37 illustrates an example of program arrangement in the fourth embodiment. The first detection program 1501 for causing a sub-processor 1303a in the microcontroller 1235a to perform the measurement processing and the first detection processing is stored in a storage circuit 1305a in the microcontroller 1235a. The sub-processor 1303a in the microcontroller 1235a performs the first detection program 1501, thereby realizing the first logical sensor 1401. Note that the data storage unit 1621, the first status storage unit 1623, the reference storage unit 1625, and the counter storage unit 1627, illustrated in FIG. 16, are provided in the storage circuit 1305a.

The first control program 1503 for causing a sub-processor 1303b in the microcontroller 1235b to perform the first control processing (A) is stored in a storage circuit 1305b in the microcontroller 1235b. The sub-processor 1303b performs the first control program 1503, thereby realizing the first control unit 1403.

The sensor state storage area 1505 corresponding to the sensor state storage unit 1405 is provided in the storage circuit 1305b in the microcontroller 1235b.

The second detection program 1507 for causing the sub-processor 1303b in the microcontroller 1235b to perform the second detection processing is stored in the storage circuit 1305b in the microcontroller 1235b. The sub-processor 1303b performs the second detection program 1507, thereby realizing the second logical sensor 1407. Note that the second status storage unit 2205 illustrated in FIG. 22 is provided in the storage circuit 1305b.

The monitoring program 1509 for causing the sub-processor 1303b in the microcontroller 1235b to perform the monitoring processing is stored in the storage circuit 1305b in the microcontroller 1235b. The sub-processor 1303b performs the monitoring program 1509, thereby realizing the monitoring unit 1409. Note that the condition storage unit 2411 and the monitoring data storage unit 2413, illustrated in FIG. 24, are provided in the storage circuit 1305b.

The second control program 2901 for causing the sub-processor 1303b in the microcontroller 1235b to perform the second control processing is stored in the storage circuit 1305b in the microcontroller 1235b. The sub-processor 1303b performs the second control program 2901, thereby realizing the second control unit 2801.

The application program 1411 is stored in the storage circuit 1203. In addition, the CPU 1201 executes the application program 1411.

Figure 38:
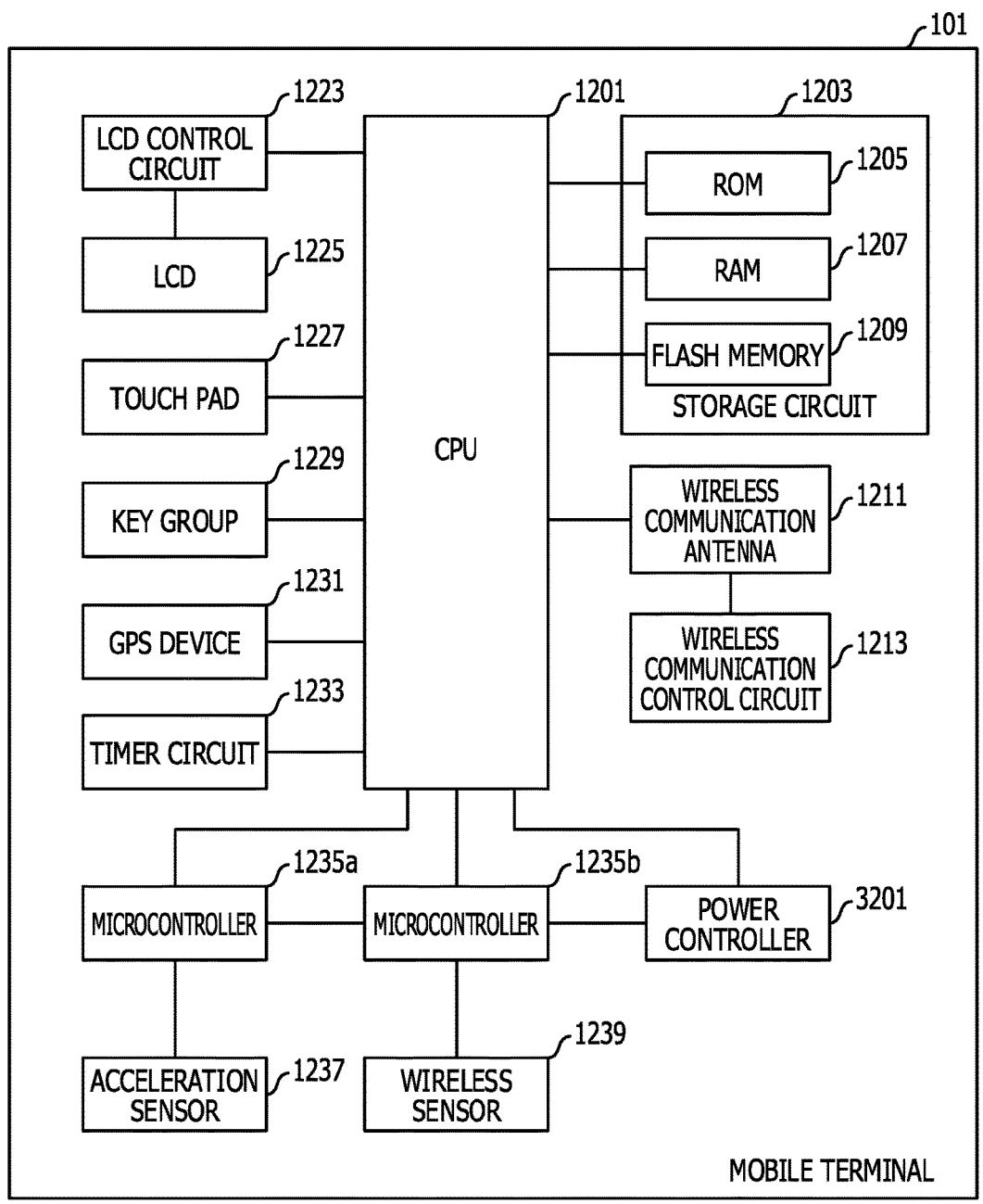
FIGS. 38, 39, 40, 41, and 42 each illustrates an example of a hardware configuration of the mobile terminal in the fourth embodiment.

In addition, as described in the third embodiment, power supply may be controlled by using the power controller 3201. FIGS. 38, 39, 40, 41, and 42 each illustrate an example of a hardware configuration of the mobile terminal in the fourth embodiment. FIG. 38 illustrates an example of the hardware configuration of the mobile terminal 101 in that case. In this example, the power controller 3201 for controlling power supply to the CPU 1201 is provided.

Specifically, in S3105 illustrated in FIG. 31, the second control unit 2801 controls the power controller 3201, thereby starting power supply to the CPU 1201.

Figure 39:
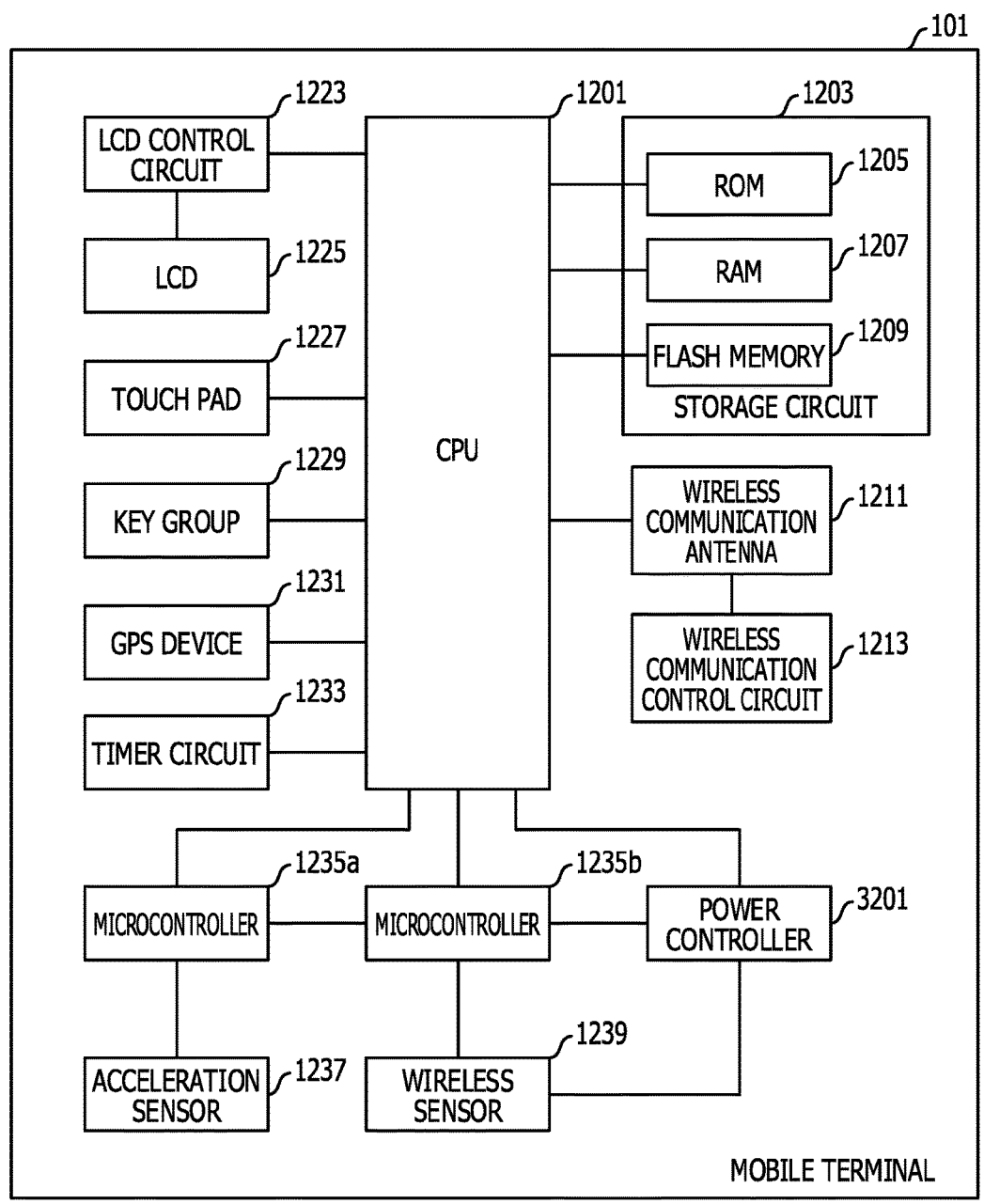

The power controller 3201 may further control power supply to the wireless sensor 1239. FIG. 39 illustrates an example of the hardware configuration of the mobile terminal 101 in that case. In this example, the power controller 3201 for controlling power supply to the CPU 1201 and the wireless sensor 1239 is provided.

In S3105 illustrated in FIG. 31, the second control unit 2801 controls the power controller 3201, thereby starting power supply to the CPU 1201. In addition to this, in S2107 illustrated in FIG. 21, the second control unit 2801 controls the power controller 3201, thereby starting power supply to the wireless sensor 1239. In S2115 illustrated in FIG. 21, the second control unit 2801 controls the power controller 3201, thereby stopping power supply to the wireless sensor 1239.

Figure 40:
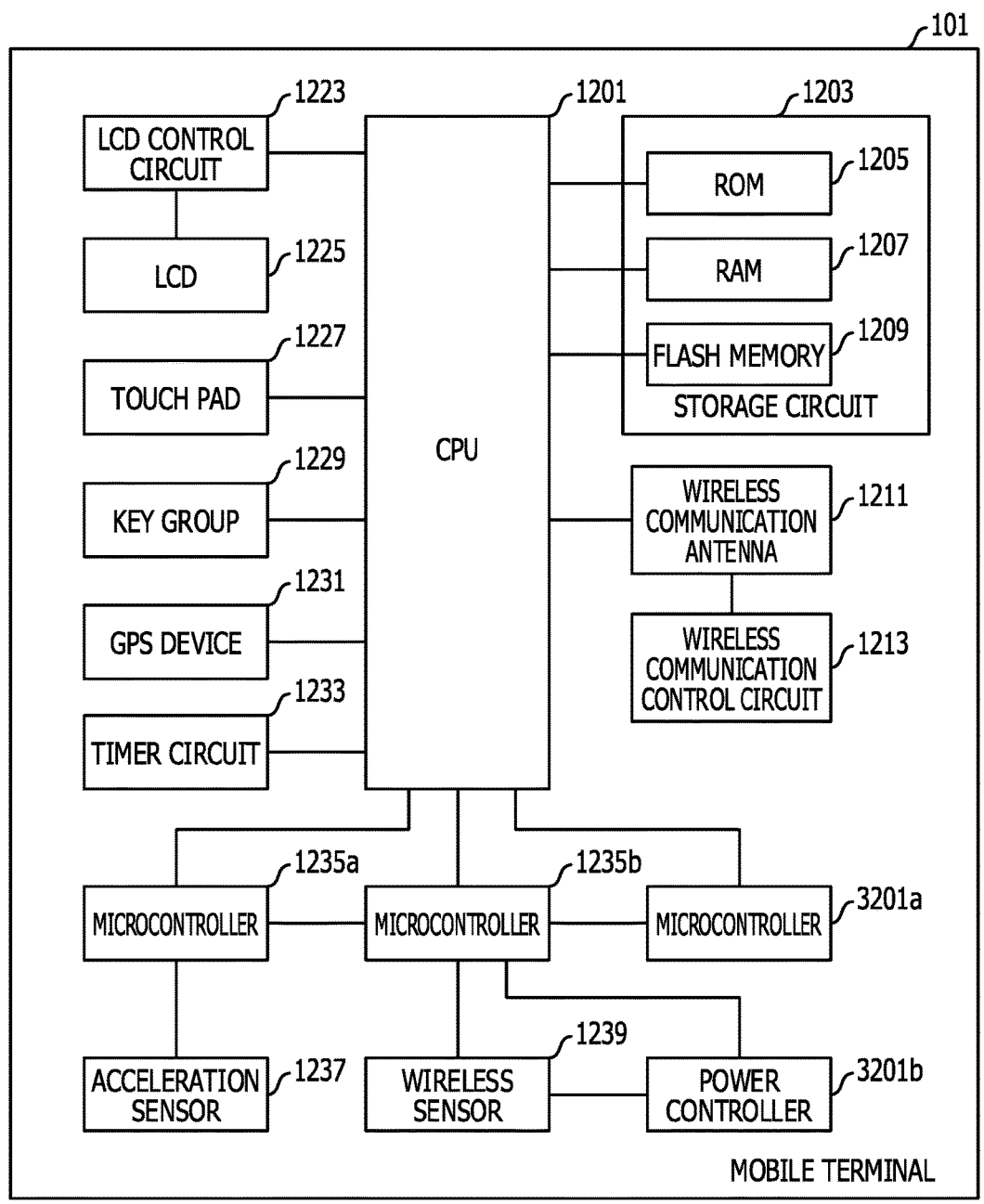

The two power controllers 3201 may be provided. FIG. 40 illustrates an example of the hardware configuration of the mobile terminal 101 in that case. In this example, the power controller 3201a for controlling power supply to the CPU 1201 and the power controller 3201b for controlling power supply to the wireless sensor 1239 are provided.

In S3105 illustrated in FIG. 31, the second control unit 2801 controls the power controller 3201a, thereby starting power supply to the CPU 1201. In addition to this, in S2107 illustrated in FIG. 21, the second control unit 2801 controls the power controller 3201b, thereby starting power supply to the wireless sensor 1239. In addition, in S2115 illustrated in FIG. 21, the second control unit 2801 controls the power controller 3201b, thereby stopping power supply to the wireless sensor 1239.

Figure 41:
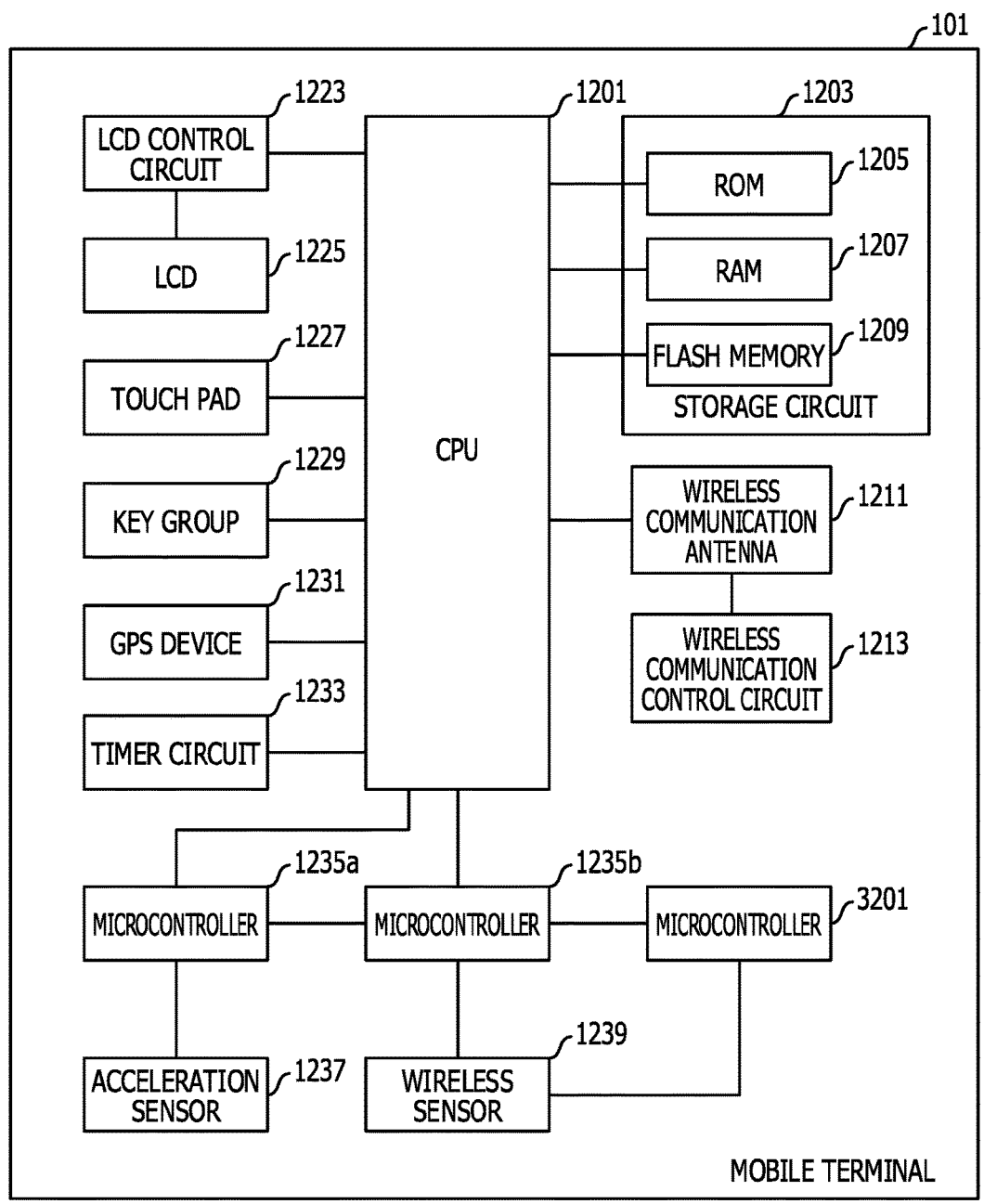

In addition, the power controller 3201a in the example of the configuration hardware illustrated in FIG. 40 may be omitted. FIG. 41 illustrates an example of the hardware configuration of the mobile terminal 101 in that case. In this example, the power controller 3201 for controlling power supply to the wireless sensor 1239 is provided.

In S2107 illustrated in FIG. 21, the second control unit 2801 controls the power controller 3201, thereby starting power supply to the wireless sensor 1239. In addition, in S2115 illustrated in FIG. 21, the second control unit 2801 controls the power controller 3201, thereby stopping power supply to the wireless sensor 1239.

Figure 42:
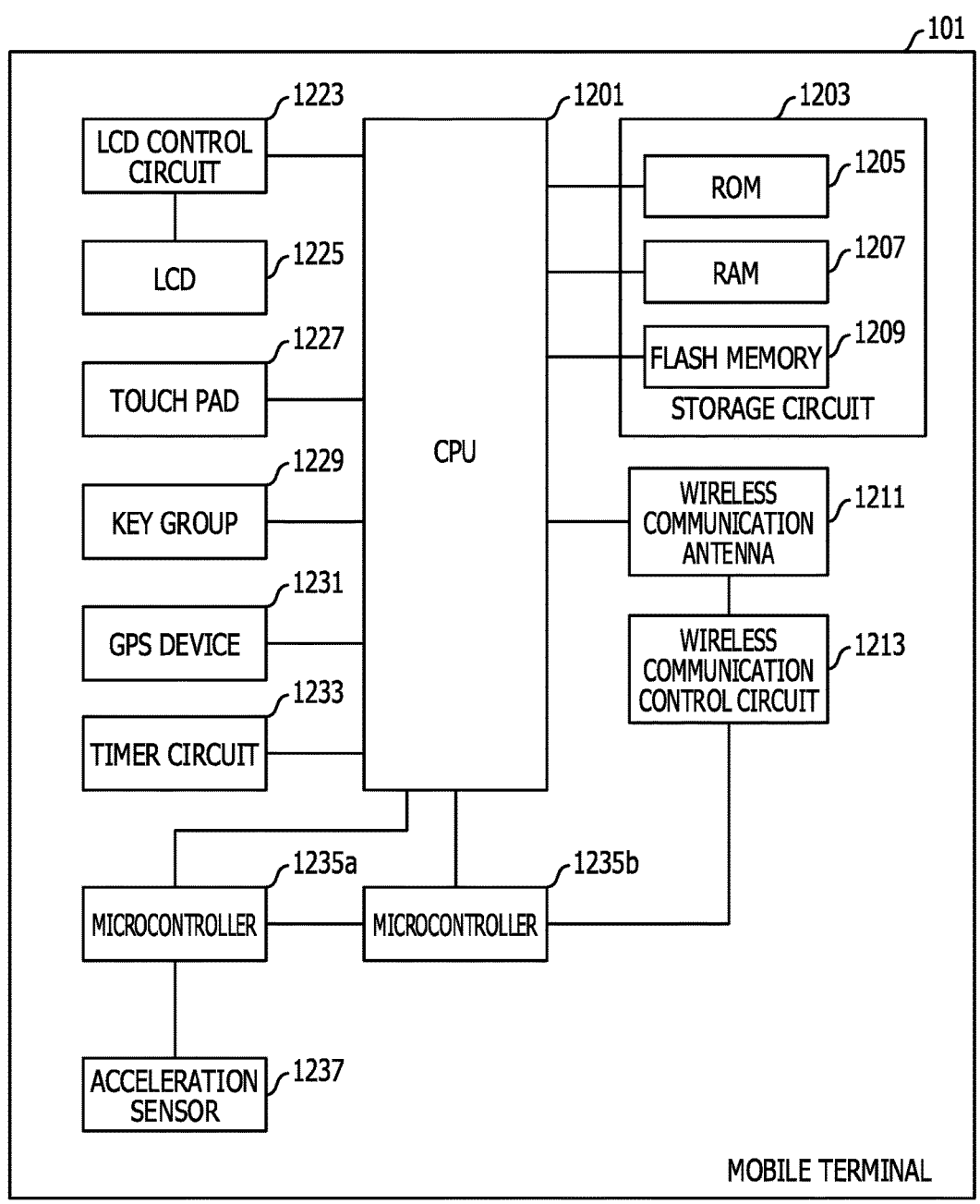

In addition, the wireless sensor 1239 may be coupled to the CPU 1201, and the second detection program 1507 and the monitoring program 1509 may be executed by the CPU 1201. FIG. 42 illustrates an example of the hardware configuration of the mobile terminal 101 in that case. The wireless sensor 1239 is coupled to the CPU 1201 and the microcontroller 1235b.

Figure 43:
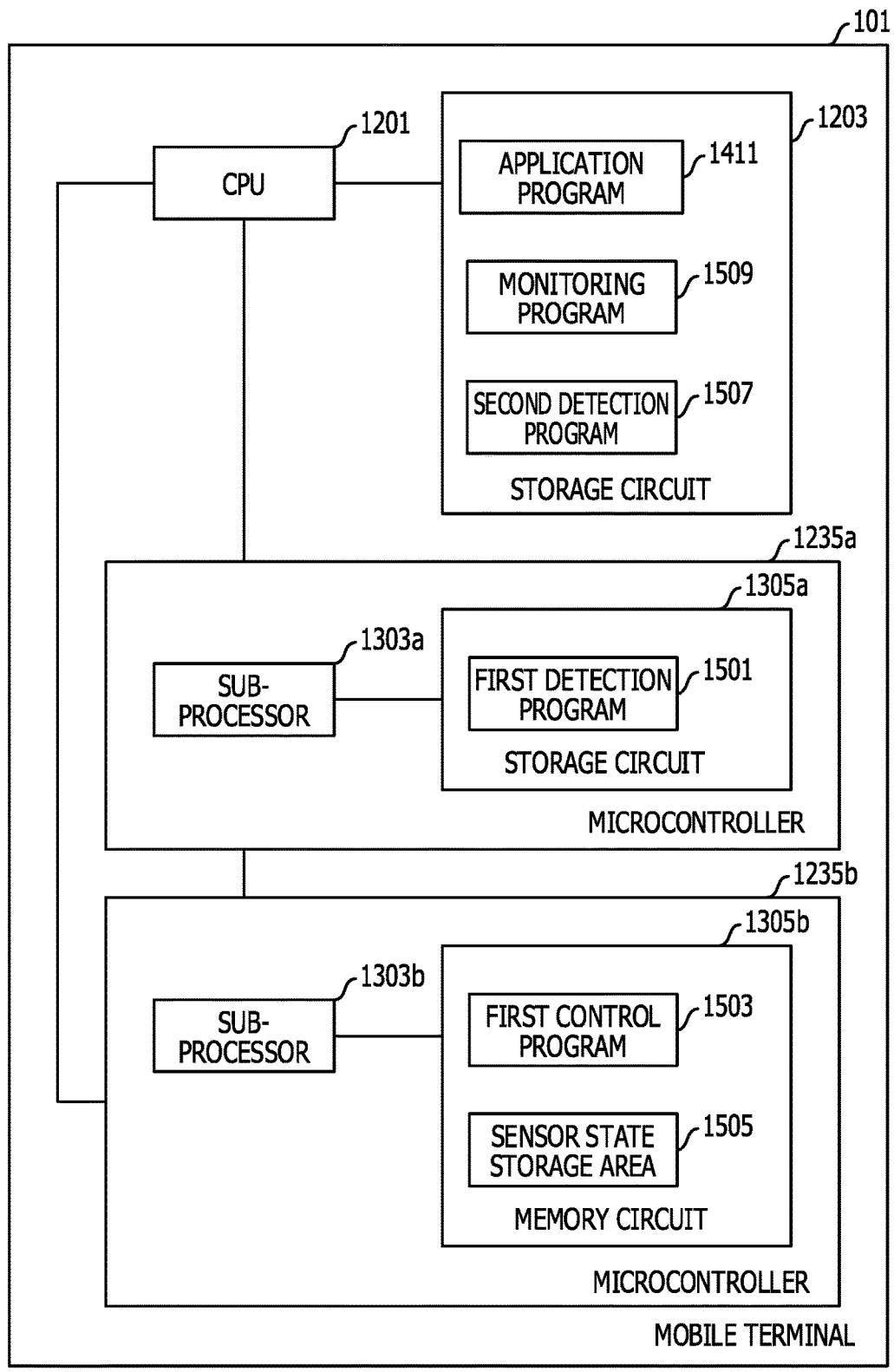
FIG. 43 illustrates an example of program arrangement in the fourth embodiment.

FIG. 43 illustrates an example of program arrangement in a case where the second detection program 1507 and the monitoring program 1509 are executed by the CPU 1201. The first detection program 1501 for causing the sub-processor 1303a in the microcontroller 1235a to perform the measurement processing and the first detection processing is stored in the storage circuit 1305a in the microcontroller 1235a. The sub-processor 1303a in the microcontroller 1235a performs the first detection program 1501, thereby realizing the first logical sensor 1401. Note that the data storage unit 1621, the first status storage unit 1623, the reference storage unit 1625, and the counter storage unit 1627, illustrated in FIG. 16, are provided in the storage circuit 1305a.

The first control program 1503 for causing the sub-processor 1303b in the microcontroller 1235b to perform the first control processing (A) is stored in the storage circuit 1305b in the microcontroller 1235b. The sub-processor 1303b performs the first control program 1503, thereby realizing the first control unit 1403.

The sensor state storage area 1505 corresponding to the sensor state storage unit 1405 is provided in the storage circuit 1305b in the microcontroller 1235b.

The second detection program 1507 for causing the CPU 1201 to perform the second detection processing is stored in the storage circuit 1203. The CPU 1201 performs the second detection program 1507, thereby realizing the second logical sensor 1407. Note that the second status storage unit 2205 illustrated in FIG. 22 is provided in the storage circuit 1203.

The monitoring program 1509 for causing the CPU 1201 to perform the monitoring processing is stored in the storage circuit 1203. The CPU 1201 performs the monitoring program 1509, thereby realizing the monitoring unit 1409. Note that the condition storage unit 2411 and the monitoring data storage unit 2413, illustrated in FIG. 24, are provided in the storage circuit 1203.

The application program 1411 is stored in the storage circuit 1203. In addition, the CPU 1201 executes the application program 1411.

Figure 44:
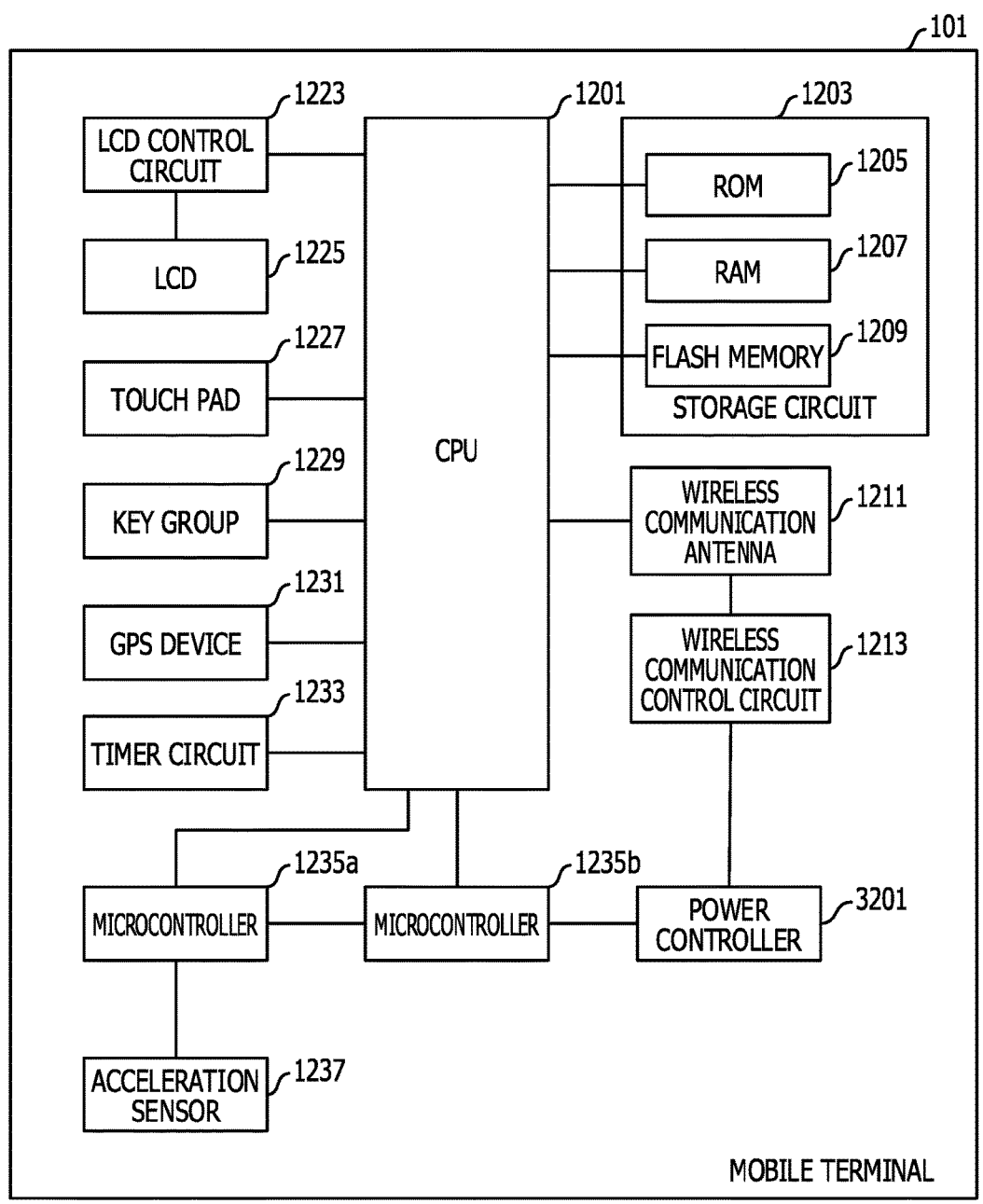
FIG. 44 illustrates an example of a hardware configuration of the mobile terminal in the fourth embodiment.

In addition, the power controller 3201 for controlling power supply to the wireless sensor 1239 may be provided. FIG. 44 illustrates an example of the hardware configuration of the mobile terminal 101 in that case. In this example, the microcontroller 1235b controls the power controller 3201.

In S2107 illustrated in FIG. 21, the second control unit 2801 controls the power controller 3201, thereby starting power supply to the wireless sensor 1239. In S2115 illustrated in FIG. 21, the second control unit 2801 controls the power controller 3201, thereby stopping power supply to the wireless sensor 1239.

According to the present embodiment, various configurations each enable power supply to the CPU 1201 serving as a main processor to be omitted until the start condition is satisfied.

Fifth Embodiment

While, in each of the above-mentioned embodiments, an example of monitoring a situation of the user by using the monitoring condition in which the two conditions are combined is described, the situation of the user may be monitored based on a monitoring condition in which three or more conditions are combined.

In a case where the user who is walking is at risk of getting a heat stroke, an application in the present embodiment announces that the wireless tag 103 exists at a short distance. It is assumed that the wireless tag 103 is installed in, for example, a resting place. In addition, in addition to the functions in each of the above-mentioned examples, the mobile terminal 101 in which the application operates has a function of determining, by using a heat stroke sensor, the risk that the user who holds the mobile terminal 101 gets a heat stroke. Note that the monitoring condition is a combination, based on a logical AND, of the two conditions (the condition that the user is walking and the condition that the wireless tag 103 exists at a short distance) in each of the above-mentioned examples and a condition that the user is at risk of getting a heat stroke.

It is assumed that, during a normal period, the acceleration sensor 1237 operates and neither the wireless sensor 1239 nor the heat stroke sensor operates. In addition, at a stage in which the user starts walking, the wireless sensor 1239 and the heat stroke sensor initiate operations. By doing so, power consumption in the wireless sensor 1239 and the heat stroke sensor is suppressed.

A third example described below conforms to the usage mode illustrated in FIG. 8. In other words, it is assumed that a sensing range illustrated by dashed lines is relatively narrow.

In the third example, at a timing at which the wireless sensor 1239 is instructed to be activated, the heat stroke sensor is instructed to be activated. Specifically, as illustrated in FIG. 9, at the time $T_3$ at which the degree of probability that the user is walking exceeds the threshold value, 45 percent, the wireless sensor 1239 and the heat stroke sensor are instructed to be activated.

In addition, as illustrated in FIG. 10, at the time $T_6$, the wireless sensor 1239 is switched to the operation state. A preparation period in the wireless sensor 1239 is relatively short.

Figure 45:
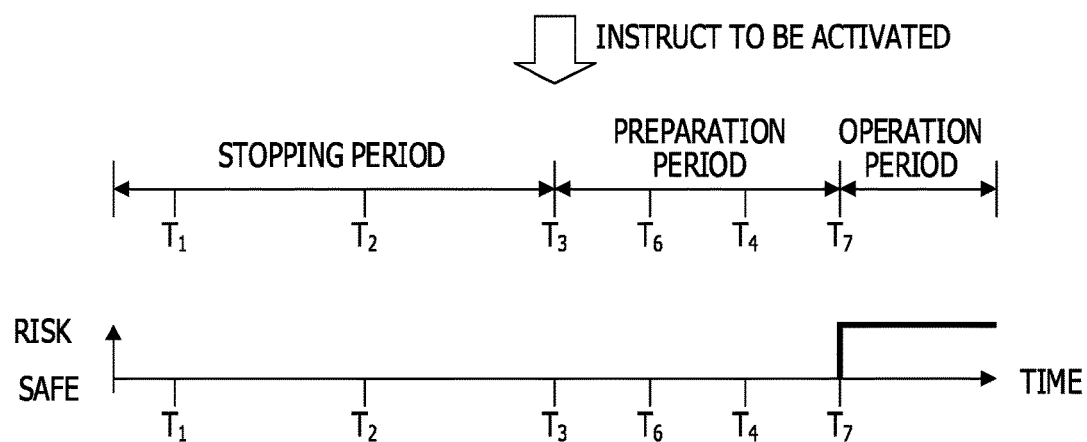
FIG. 45 illustrates an example of a transition of a third status in a third example.

On the other hand, it is assumed that a preparation period in the heat stroke sensor is longer than the preparation period in the wireless sensor 1239. FIG. 45 illustrates an example of a transition of a status (hereinafter, called a third status) related to a risk of the heat stroke in the third example. In this example, at a time $T_7$, the heat stroke sensor is switched to an operation state. In addition, the third status is "risk" from the beginning.

Figure 46:
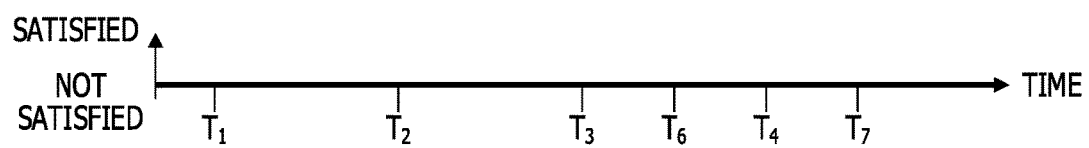
FIG. 46 illustrates an example of a monitoring result in the third example.

FIG. 46 illustrates an example of a monitoring result in the third example. As illustrated in FIG. 9, at the time $T_4$ at which the first status is put into "walking", the second status is "sensed", as illustrated in FIG. 10. However, since, as illustrated in FIG. 45, the third status is "invalid", the monitoring condition is not satisfied. If the time $T_7$ comes after that, the third status is put into "risk". However, since the second status serving as one of the three statuses returns to "not sensed", the monitoring condition is not satisfied after all.

On the condition of a mode in which the heat stroke sensor continuously operates, the third status is supposed to be put into "risk" at the time $T_4$, and the monitoring condition is supposed to be satisfied. In other words, a miss in monitoring of the situation of the user is caused in the third example.

If, in this way, a state in which the third status is "invalid" becomes prolonged, even in a case where the sensing range is relatively wide like the first example, a delay in monitoring of the situation of the user is easily caused.

In the present embodiment, the heat stroke sensor is activated in advance of the activation of the wireless sensor 1239. In a case where the degree of probability that the user is walking exceeds, for example, 25 percent, the heat stroke sensor is activated, and in a case where the degree of probability that the user is walking exceeds 45 percent, the wireless sensor 1239 is activated. Usually, a threshold value is set so as to decrease with an increase in the preparation period of a sensor.

Figure 47:
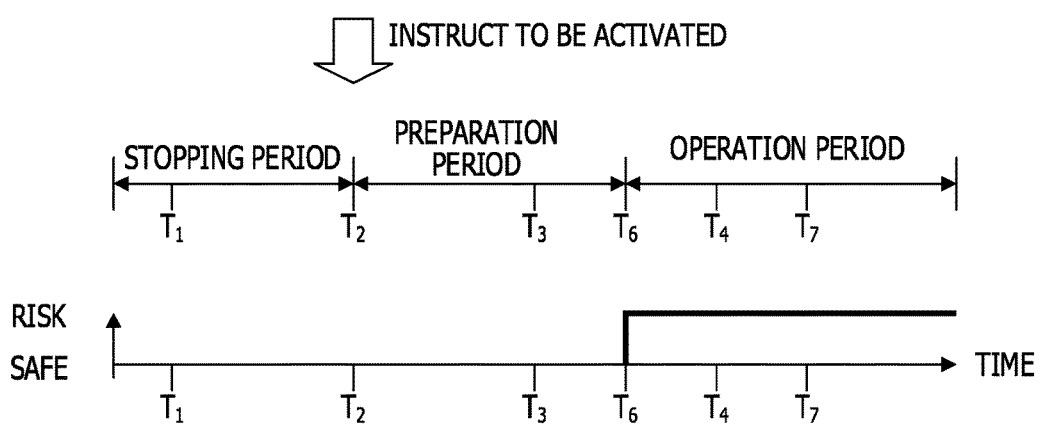
FIG. 47 illustrates an example of a transition of the third status in a fifth embodiment.

By doing so, as illustrated in FIG. 47, at the time $T_2$ at which the degree of probability that the user is walking is calculated as 30 percent, the heat stroke sensor is instructed to be activated. In addition, at the time $T_4$, the heat stroke sensor is switched to the operation state, and the third status is put into "risk". FIG. 47 illustrates an example of a transition of the third status.

Figure 48:
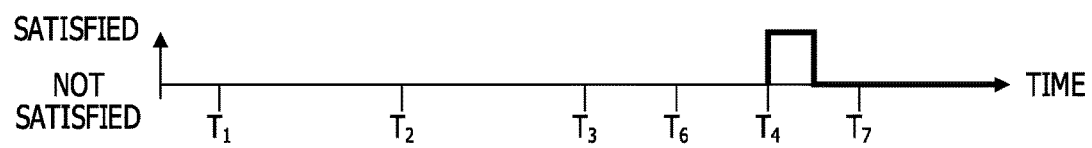
FIG. 48 illustrates a monitoring result in the fifth embodiment.

As a result, as illustrated in FIG. 48, at the time $T_4$, the monitoring condition is satisfied. In other words, no miss in the third example is caused. In addition, in one aspect, a waste of power consumption in the wireless sensor 1239 is unlikely to be easily caused. This is the end of description of an outline of the present embodiment. FIG. 48 illustrates an example of a monitoring result.

Figure 49:
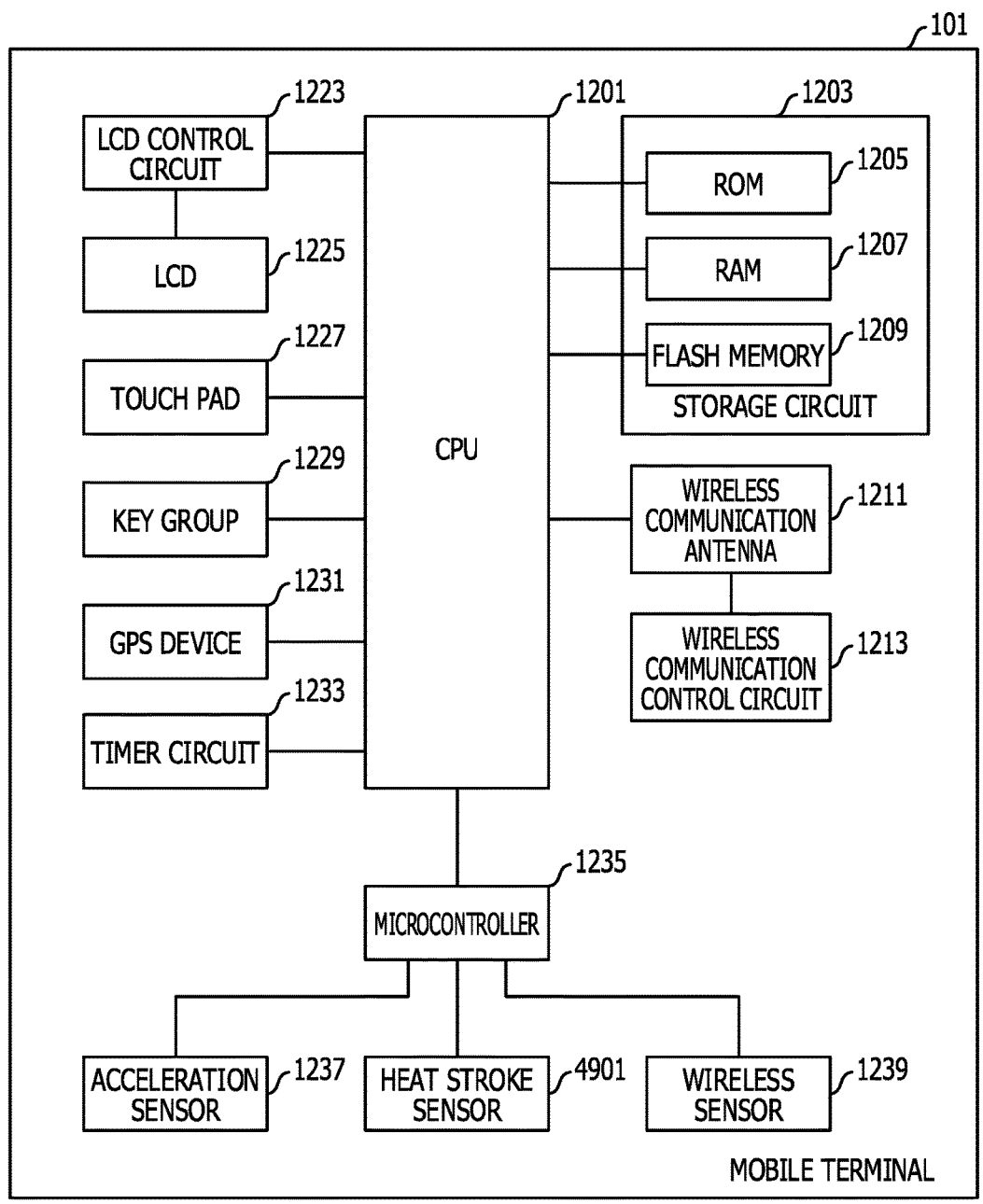
FIG. 49 illustrates an example of a hardware configuration of the mobile terminal in the fifth embodiment.

FIG. 49 illustrates an example of a hardware configuration of the mobile terminal 101 in the fifth embodiment. In this example, in addition to the acceleration sensor 1237 and the wireless sensor 1239, a heat stroke sensor 4901 is coupled to the microcontroller 1235. The heat stroke sensor 4901 incorporates, for example, a temperature sensor, a humidity sensor, and a radiation heat sensor. In addition, the heat stroke sensor 4901 measures temperature, humidity, and radiation heat. In this regard, however, one or two of the temperature sensor, the humidity sensor, and the radiation heat sensor may be used.

Figure 50:
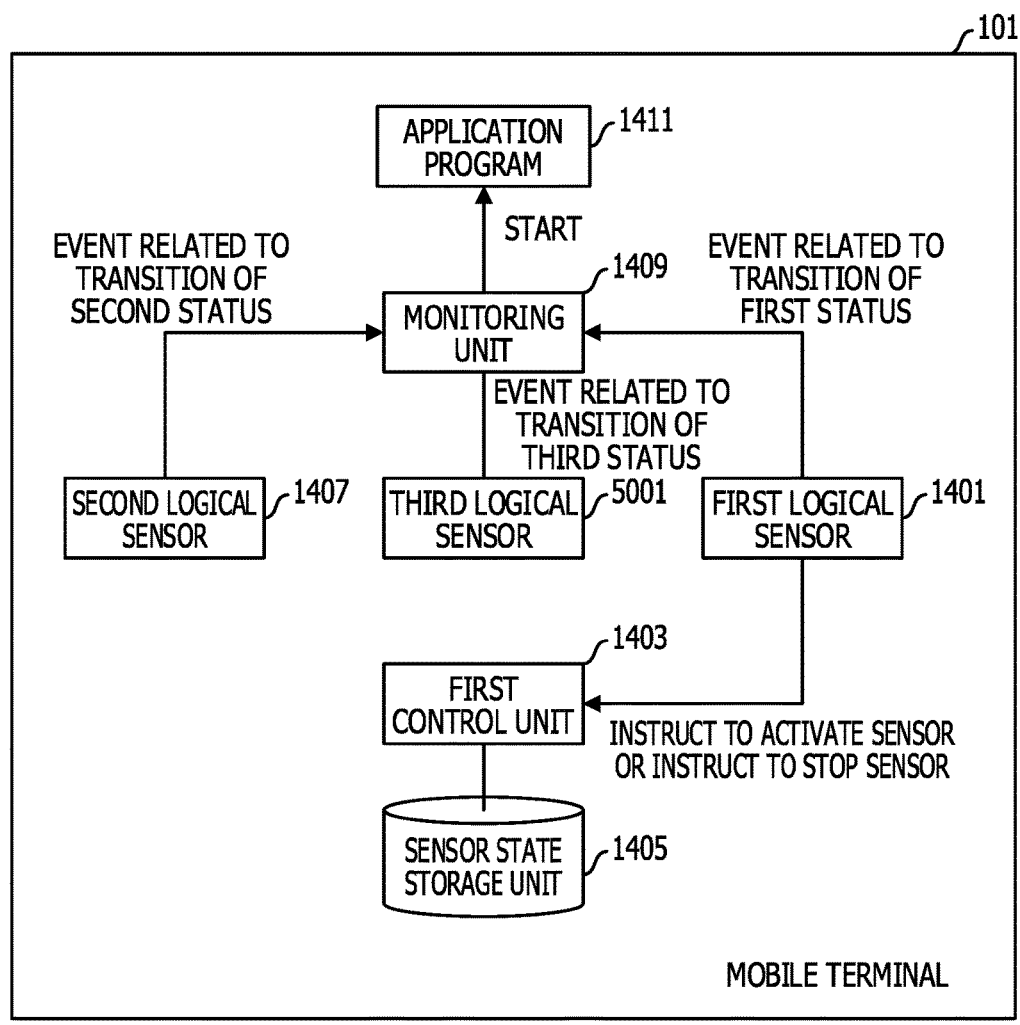
FIG. 50 illustrates an example of a module configuration of the mobile terminal in the fifth embodiment.

FIG. 50 illustrates an example of a module configuration of the mobile terminal 101 in the fifth embodiment. The mobile terminal 101 in this example includes a third logical sensor 5001 in addition to the modules illustrated in FIG. 14. The third logical sensor 5001 performs third detection processing for detecting the third status. An event related to a transition of the third status is delivered to the monitoring unit 1409.

Figure 51:
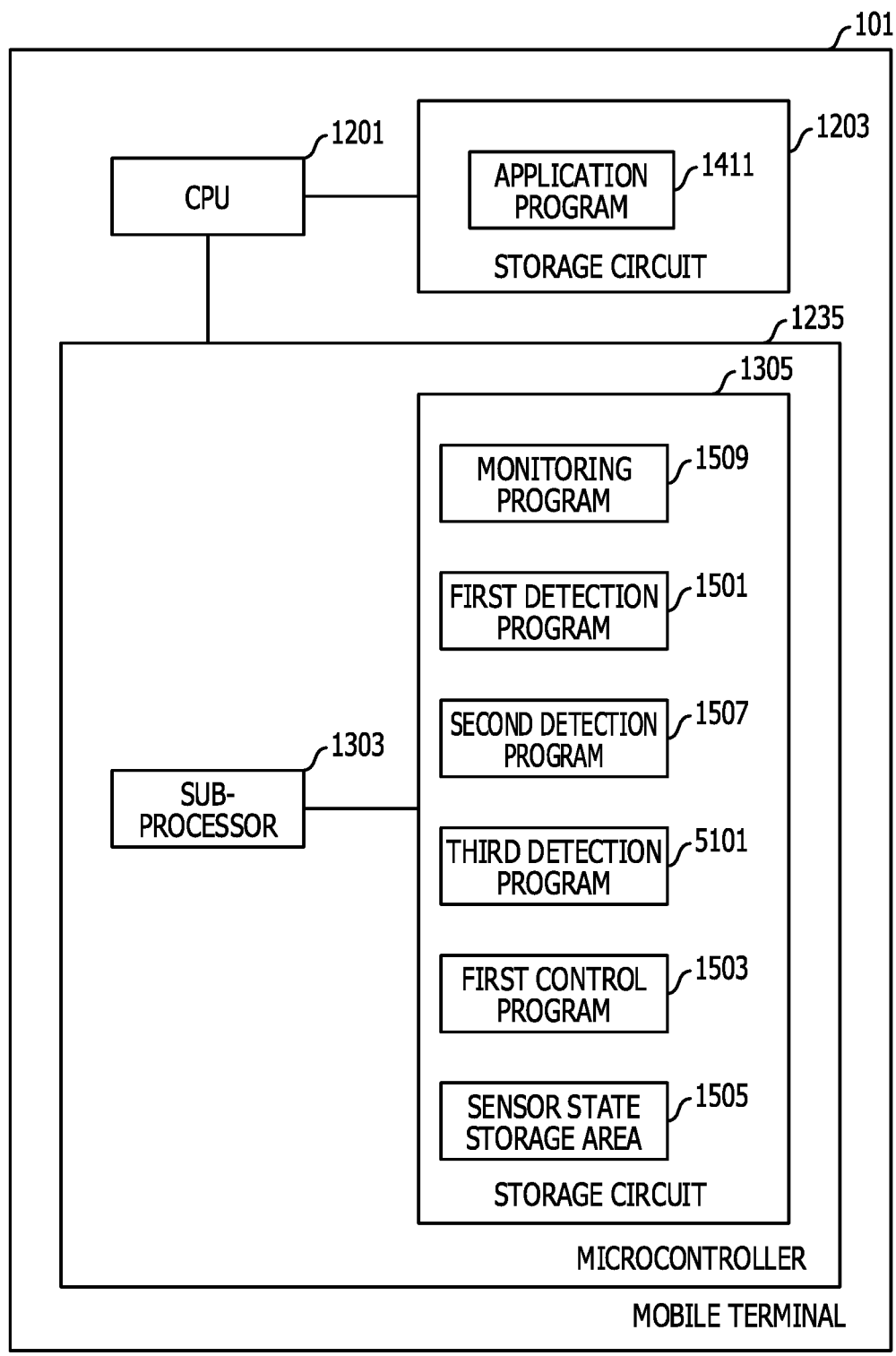
FIG. 51 illustrates an example of program arrangement in the fifth embodiment.

FIG. 51 illustrates an example of program arrangement in the fifth embodiment. In this example, in addition to the programs illustrated in FIG. 15, a third detection program 5101 is arranged in the storage circuit 1305.

Figure 54:
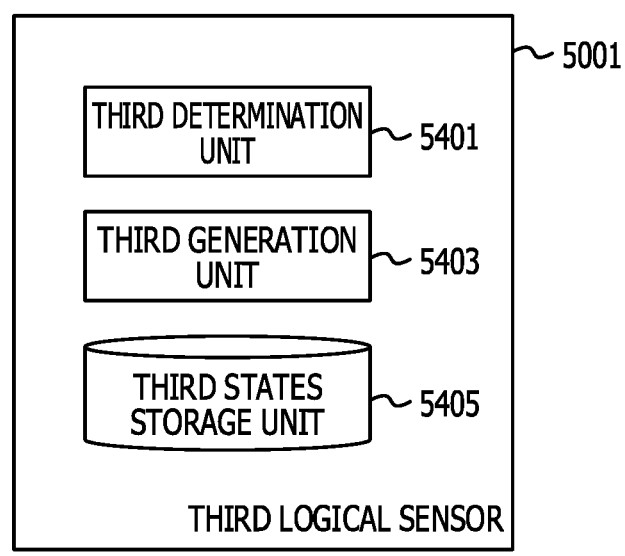
FIG. 54 illustrates an example of a module configuration of a third logical sensor.
Figure 55:
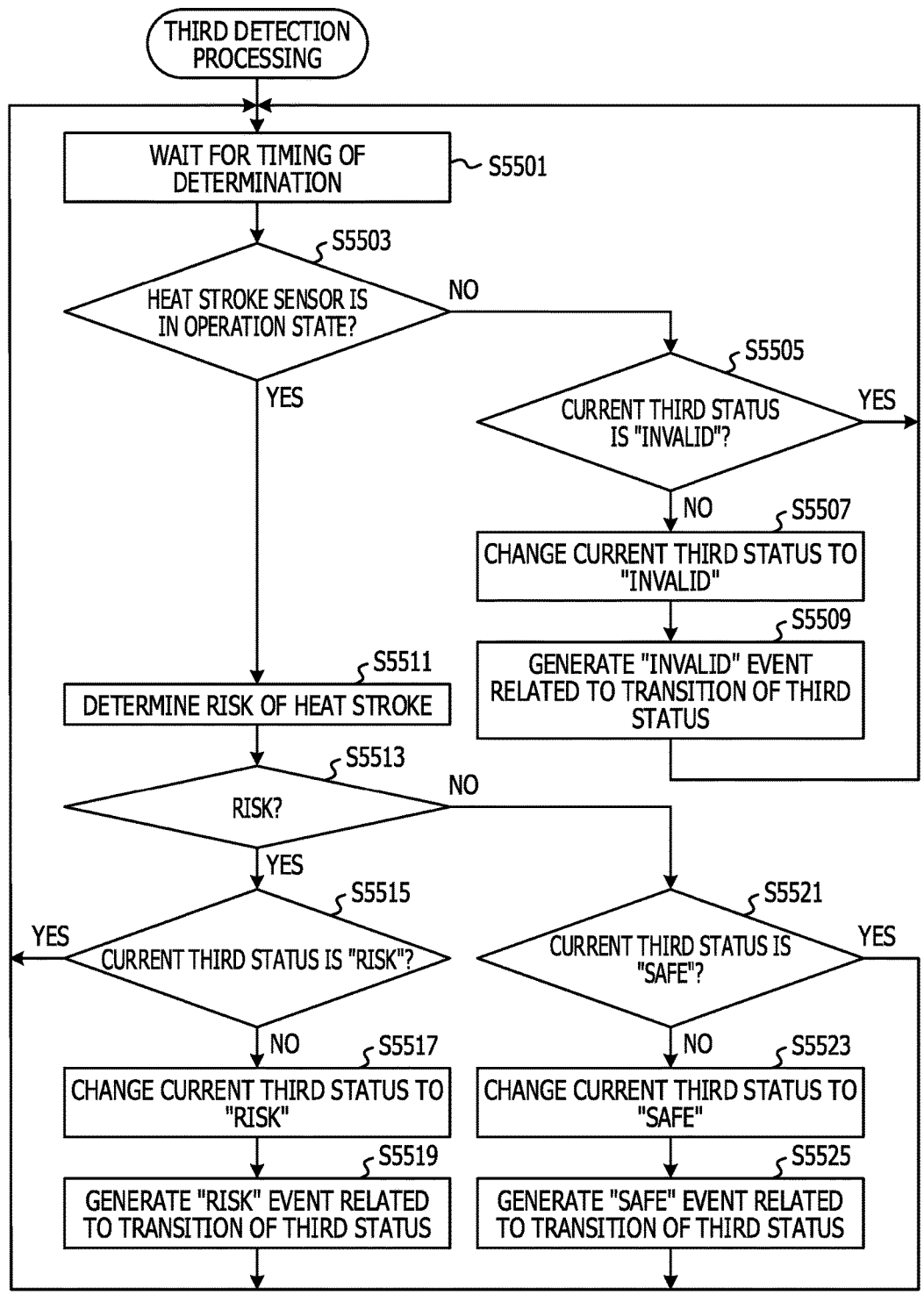
FIG. 55 illustrates an example of a third detection processing flow.

The third detection program 5101 for causing the sub-processor 1303 to perform the third detection processing illustrated in FIG. 55 is stored in the storage circuit 1305. The sub-processor 1303 executes the third detection program 5101, thereby realizing the third logical sensor 5001. Note that a third status storage unit 5405 illustrated in FIG. 54 is provided in the storage circuit 1305.

Figure 52:
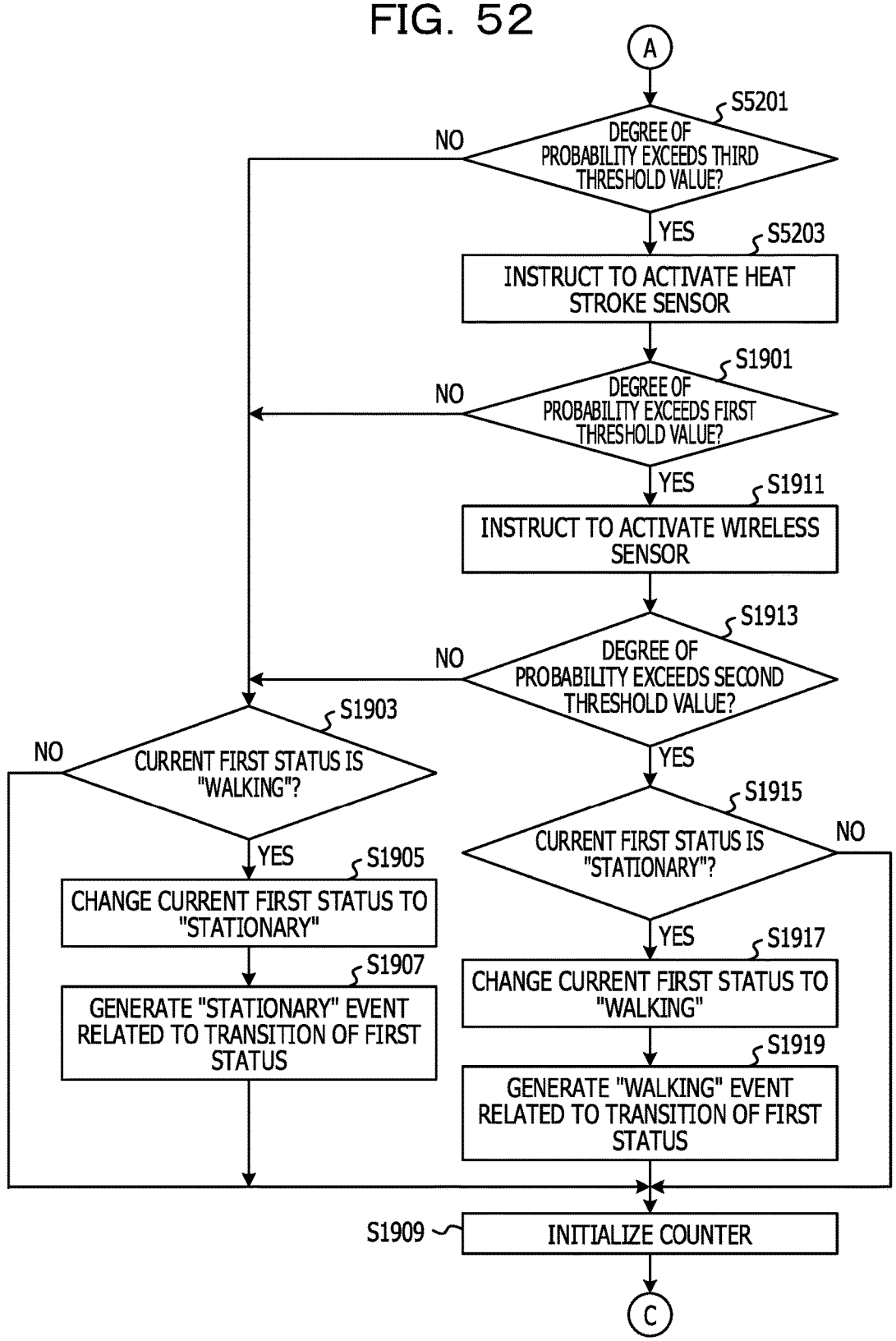
FIGS. 52 and 53 each illustrates an example of the first detection processing flow in the fifth embodiment.
Figure 53:
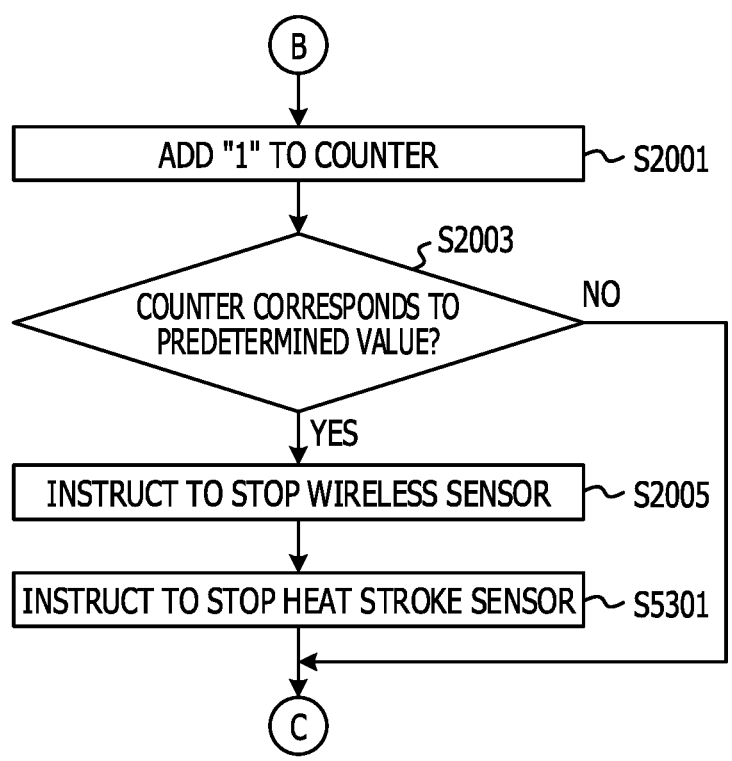

FIGS. 52 and 53 each illustrate an example of the first detection processing flow. In the present embodiment, in place of the first detection processing illustrated in FIG. 19, the first detection processing illustrated in FIG. 52 is performed. The first determination unit 1603 determines whether or not the degree of probability that the user is walking exceeds a third threshold value (25 percent in this example) (S5201). In a case there it is determined that the degree of probability that the user is walking does not exceed the third threshold value, the processing shifts to the processing operation in S1903. The processing operations in S1903 to S1909 are the same as those in the case of FIG. 19.

In a case where it is determined that the degree of probability that the user is walking exceeds the third threshold value, the first instruction unit 1607 instructs the first control unit 1403 to activate the heat stroke sensor 4901 (S5203). In addition, the processing shifts to the processing operation in S1901. The processing operation in S1901 is the same as that in the case of FIG. 19. The processing operations in S1911 to S1919 are the same as those in the case of FIG. 19.

In addition, in the present embodiment, in place of the first detection processing illustrated in FIG. 20, the first detection processing illustrated in FIG. 53 is performed. The processing operations in S2001 to S2005 are the same as those in the case of FIG. 20.

Subsequent to the processing operation in S2005, the first instruction unit 1607 instructs the first control unit 1403 to stop the heat stroke sensor 4901 (S5301). In this example, in a case where it is determined twice in a row that the degree of probability that the user is walking is 0 percent, the heat stroke sensor 4901 is stopped along with the wireless sensor 1239. In addition, the processing returns, via the terminal C, to the processing operation in S1801 illustrated in FIG. 18, and the above-mentioned processing is repeated. In this regard, however, a condition for stopping the wireless sensor 1239 and, a condition for stopping the heat stroke sensor 4901 may be different.

Next, the third logical sensor 5001 will be described. FIG. 54 illustrates an example of a module configuration of the third logical sensor 5001. The third logical sensor 5001 includes a third determination unit 5401, a third generation unit 5403, and the third status storage unit 5405.

Based on the temperature, the humidity, and the radiation heat, measured by the heat stroke sensor 4901, the third determination unit 5401 determines a risk of the heat stroke. The third determination unit 5401 calculates, for example, a parameter serving as a rough estimate corresponding to the heat stroke, and in a case where the relevant parameter exceeds a predetermined threshold value, the third determination unit 5401 determines that there is a risk of the heat stroke. The third generation unit 5403 generates an event related to a transition of the third status. The third status storage unit 5405 stores therein the current third status. The third status is one of "invalid", "safe", and "risk".

The third detection processing based on the third logical sensor 5001 will be described. FIG. 55 illustrates an example of a third detection processing flow. The third determination unit 5401 waits for a timing of determining a risk of the heat stroke (S5501). In this example, the third determination unit 5401 determines a risk of the heat stroke with a predetermined period.

If the relevant timing comes, the third generation unit 5403 determines whether or not the heat stroke sensor 4901 is in the operation state (S5503). In this example, the third generation unit 5403 inquires a state of the heat stroke sensor 4901. In this regard, however, the third generation unit 5403 may read a state of the heat stroke sensor 4901 from the sensor state storage unit 1405.

In a case of determining that the heat stroke sensor 4901 is not in the operation state, the third generation unit 5403 determines whether or not the current third status is "invalid" (S5505).

In a case where it is determined that the current third status is "invalid", the processing returns to the processing operation in S5501 without change, and the above-mentioned processing is repeated.

On the other hand, in a case of determining that the current third status is not "invalid", the third generation unit 5403 changes the current third status to "invalid" (S5507). The third generation unit 5403 generates an "invalid" event related to a transition of the third status (S5509). The "invalid" event related to the transition of the third status is communicated to the monitoring unit 1409. In addition, the processing returns to the processing operation in S5501, and the above-mentioned processing is repeated.

The description returns to the processing operation in S5503. In a case where, in S5503, it is determined that the heat stroke sensor 4901 is in the operation state, the third determination unit 5401 determines a risk of the heat stroke, based on a measurement result based on the heat stroke sensor 4901 (S5511).

Depending on whether or not a determination result indicates "risk", the third generation unit 5403 causes the processing to branch (S5513). In a case where the determination result indicates "risk", the third generation unit 5403 determines whether or not the current third status is "risk" (S5515).

In a case where it is determined that the current third status is "risk", the processing returns to the processing operation in S5501 without change, and the above-mentioned processing is repeated.

On the other hand, in a case of determining that the current third status is not "risk", the third generation unit 5403 changes the current third status to "risk" (S5517). The third generation unit 5403 generate a "risk" event related to the transition of the third status (S5519). The "risk" event related to the transition of the third status is communicated to the monitoring unit 1409. In addition, the processing returns to the processing operation in S5501, and the above-mentioned processing is repeated.

The description returns to the processing operation in S5513. In a case where, in S5513, the determination result does not indicate "risk", the third generation unit 5403 determines whether or not the current third status is "safe" (S5521).

In a case where it is determined that the current third status is "safe", the processing returns to the processing operation in S5501 without change, and the above-mentioned processing is repeated.

On the other hand, in a case of determining that the current third status is not "safe", the third generation unit 5403 changes the current third status to "safe" (S5523). The third generation unit 5403 generate a "safe" event related to the transition of the third status (S5525). The "safe" event related to the transition of the third status is communicated to the monitoring unit 1409. In addition, the processing returns to the processing operation in S5501, and the above-mentioned processing is repeated. This is the end of description of the third detection processing.

Figure 56:
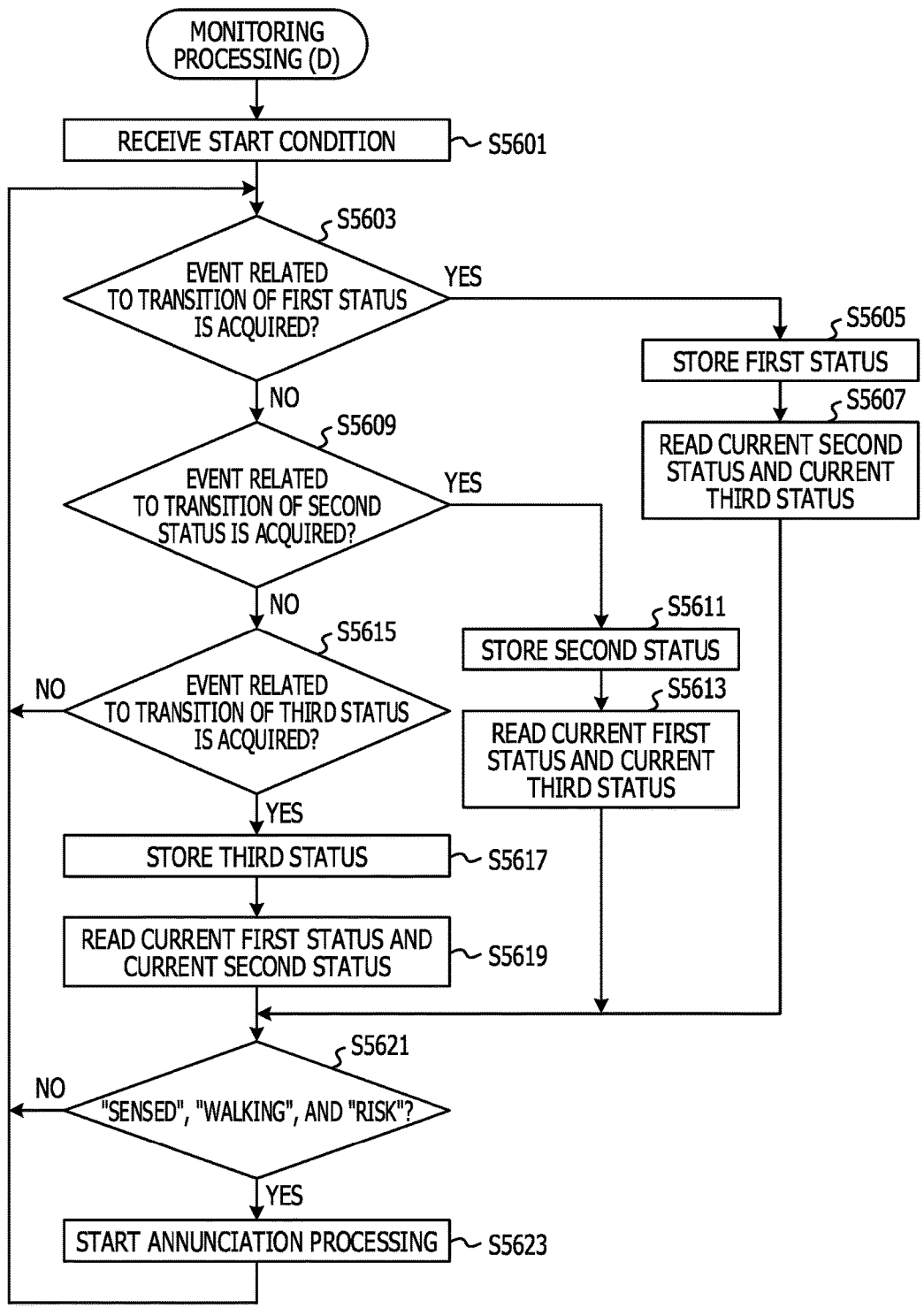
FIG. 56 illustrates a monitoring processing (D) flow.

Furthermore, in the present embodiment, in place of the monitoring processing (A), monitoring processing (D) is performed. FIG. 56 illustrates a monitoring processing (D) flow. The reception unit 2401 receives a start condition from the application program 1411 (S5601). The reception unit 2401 stores the received start condition in the condition storage unit 2411. The content of the start condition in this example is that the first status is "walking", the second status is "sensed", and the third status is "risk".

The acquisition unit 2403 determines whether or not an event related to the transition of the first status is acquired from the first logical sensor 1401 (S5603).

In a case of determining that the event related to the transition of the first status is acquired from the first logical sensor 1401, the acquisition unit 2403 stores, in the monitoring data storage unit 2413, the current first status identified by the relevant event (S5605).

The second determination unit 2405 reads the current second status and the current third status from the monitoring data storage unit 2413 (S5607). In addition, the processing shifts to a processing operation in S5621. The processing operation in S5621 will be described later.

The description returns to the processing operation in S5603. In a case of determining that the event related to the transition of the first status is not acquired from the first logical sensor 1401, the acquisition unit 2403 determines whether or not an event related to the transition of the second status is acquired from the second logical sensor 1407 (S5609).

In a case of determining that the event related to the transition of the second status is acquired, the acquisition unit 2403 stores, in the monitoring data storage unit 2413, the current second status identified by the relevant event (S5611).

The second determination unit 2405 reads the current first status and the current third status from the monitoring data storage unit 2413 (S5613). In addition, the processing shifts to the processing operation in S5621.

The description returns to the processing operation in S5609. In a case of determining that the event related to the transition of the second status is not acquired, the acquisition unit 2403 determines whether or not an event related to the transition of the third status is acquired from the third logical sensor 5001 (S5615).

In a case of determining that the event related to the transition of the third status is acquired, the acquisition unit 2403 stores, in the monitoring data storage unit 2413, the current third status identified by the relevant event (S5617).

The second determination unit 2405 reads the current first status and the current second status from the monitoring data storage unit 2413 (S5619). In addition, the processing shifts to the processing operation in S5621.

In S5621, the second determination unit 2405 determines whether or not the start condition is satisfied. In this example, it is determined whether or not the first status is "walking", the second status is "sensed", and the third status is "risk" (S5621).

In a case where it is determined that the start condition is not satisfied, the processing returns to the processing operation in S5603, and the above-mentioned processing is repeated. In addition, in a case where, in S5615, it is determined that an event related to the transition of the third status is not acquired, the event is regarded as invalid, the processing returns to the processing operation in S5603, and the above-mentioned processing is repeated.

On the other hand, in a case where it is determined that the start condition is satisfied, the start unit 2407 starts the annunciation processing based on the application program 1411 (S5623). In addition, the processing returns to the processing operation in S5603, and the above-mentioned processing is repeated.

Figure 57:
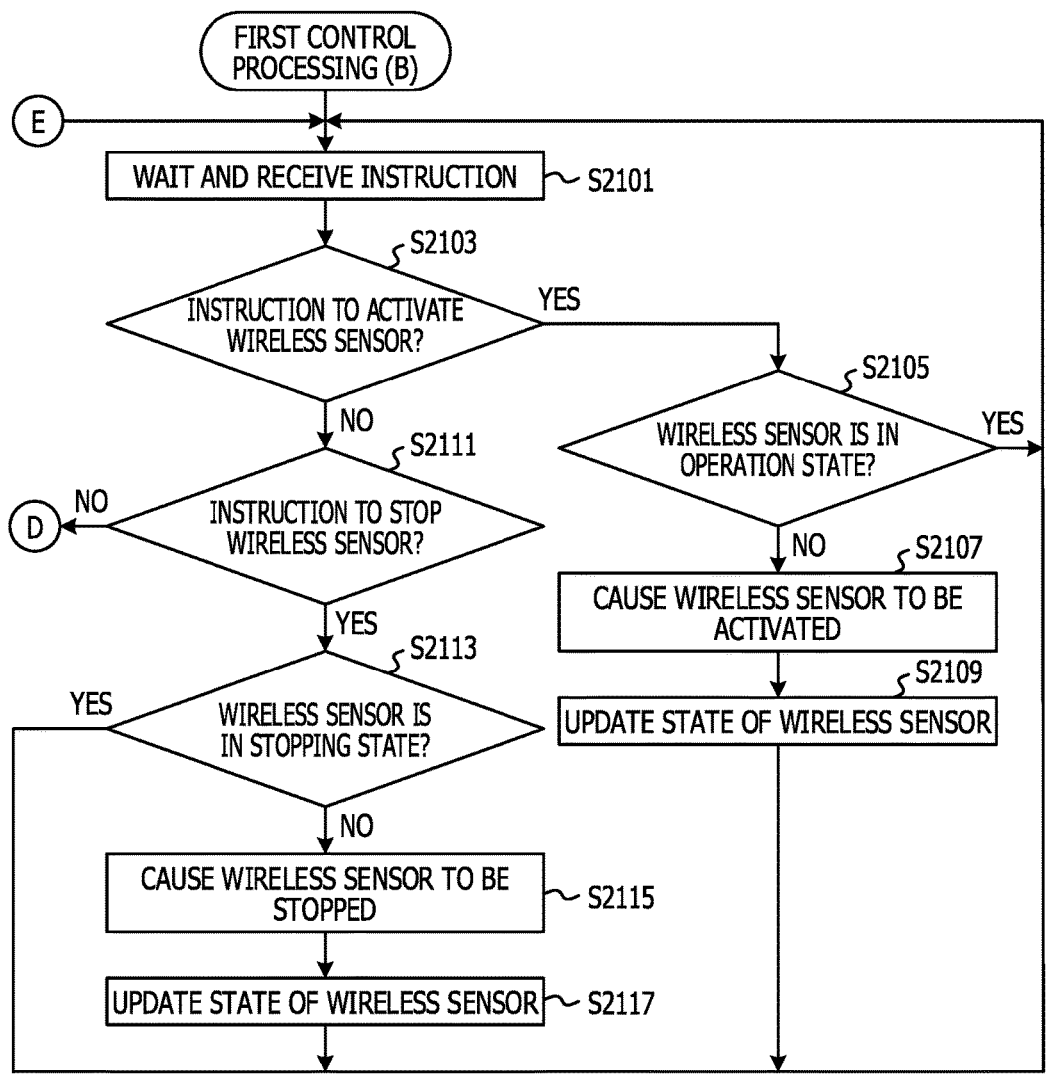
FIGS. 57 and 58 illustrate a first control processing (B) flow.
Figure 58:
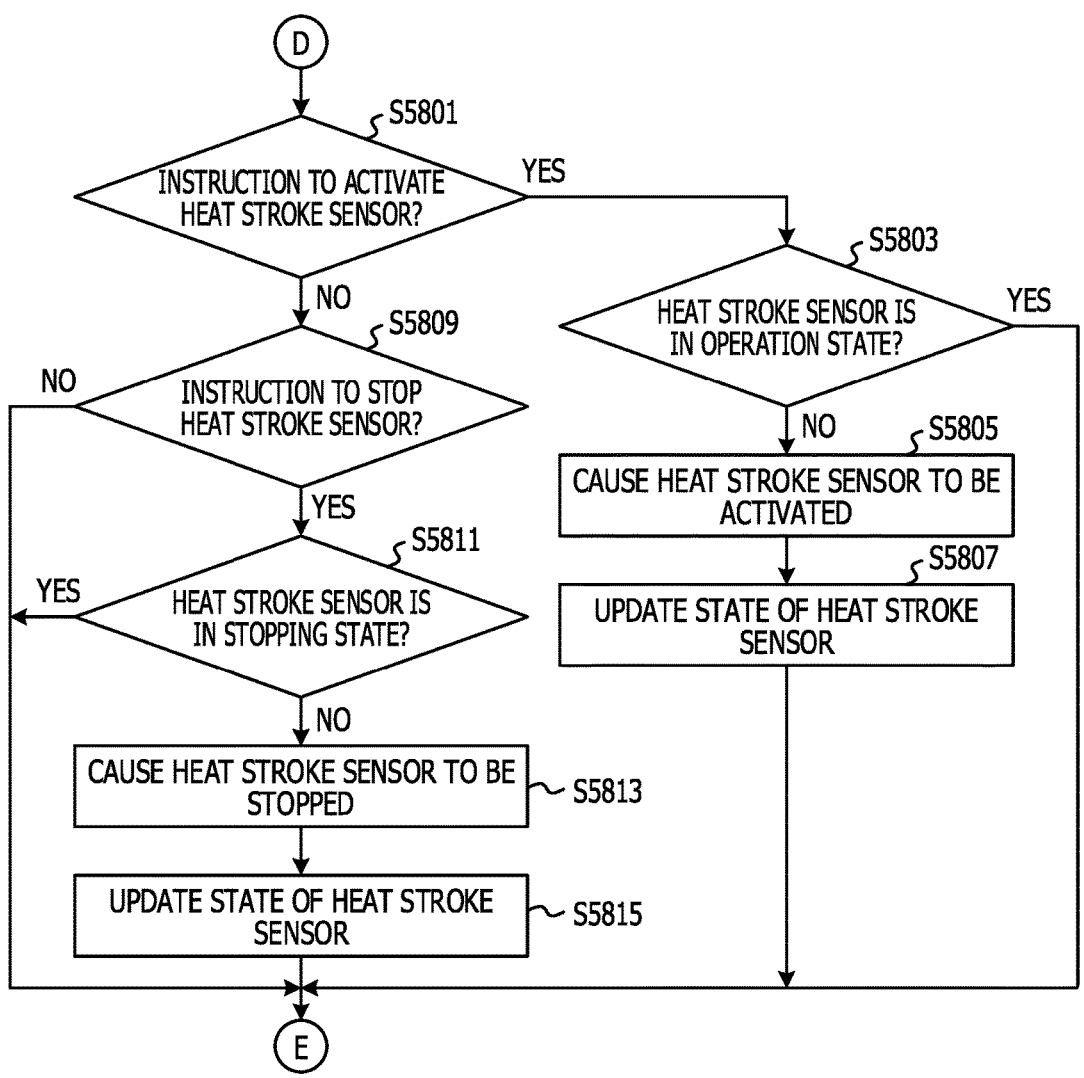

Furthermore, in the present embodiment, in place of the first control processing (A), first control processing (B) is performed. FIGS. 57 and 58 illustrate a first control processing (B) flow. The processing operations in S2101 to S2111 illustrated in FIG. 57 are the same as those in the case of FIG. 21. In a case of passing through a No route in the processing operation in S2111, the processing shifts, via a terminal D, to a processing operation in S5801 illustrated in FIG. 58.

The description shifts to FIG. 58. The first control unit 1403 determines whether or not being instructed to activate the heat stroke sensor 4901 (S5801).

In a case of determining as being instructed to activate the heat stroke sensor 4901, the first control unit 1403 determines whether or not the heat stroke sensor 4901 is in the operation state (S5803). In this example, the first control unit 1403 reads, from the sensor state storage unit 1405, a state of the heat stroke sensor 4901. In this regard, however, the first control unit 1403 may inquire a state of the heat stroke sensor 4901.

In a case where it is determined that the heat stroke sensor 4901 is in the operation state, the processing returns, via a terminal E without change, to the processing operation in S2101 illustrated in FIG. 57, and the above-mentioned processing is repeated.

On the other hand, in a case where it is determined that the heat stroke sensor 4901 is not in the operation state, in other words, in a case where the heat stroke sensor 4901 is in the stopping state, the first control unit 1403 causes the heat stroke sensor 4901 to be activated (S5805). The first control unit 1403 updates the state of heat stroke sensor 4901, stored in the sensor state storage unit 1405 (S5807). In other words, changing from the stopping state to the operation state is performed. In addition, the processing returns, via the terminal E, to the processing operation in S2101 illustrated in FIG. 57, and the above-mentioned processing is repeated.

The description returns to the processing operation in S5801. In a case of determining as not being instructed to activate the heat stroke sensor 4901, the first control unit 1403 determines whether or not being instructed to stop the heat stroke sensor 4901 (S5809). In a case where the first control unit 1403 determines as not being instructed to stop the heat stroke sensor 4901, the processing returns, via the terminal E, to the processing operation in S2101 illustrated in FIG. 57, and the above-mentioned processing is repeated.

In a case of determining as being instructed to stop the heat stroke sensor 4901, the first control unit 1403 determines whether or not the heat stroke sensor 4901 is in the stopping state (S5811).

In a case where it is determined that the heat stroke sensor 4901 is in the stopping state, the processing returns, via the terminal E without change, to the processing operation in S2101 illustrated in FIG. 57, and the above-mentioned processing is repeated.

On the other hand, in a case where it is determined that the heat stroke sensor 4901 is not in the stopping state, in other words, in a case where the heat stroke sensor 4901 is in the operation state, the first control unit 1403 causes the heat stroke sensor 4901 to be stopped (S5813). The first control unit 1403 updates the state of the heat stroke sensor 4901, stored in the sensor state storage unit 1405 (S5815). In other words, changing from the operation state to the stopping state is performed. In addition, the processing returns, via the terminal E, to the processing operation in S2101 illustrated in FIG. 57, and the above-mentioned processing is repeated.

According to the present embodiment, in accordance with the preparation characteristics of the wireless sensor 1239 and the heat stroke sensor 4901, failures in determination in which states are combined are reduced.

While, as above, embodiments of the present technology are described, the present technology is not limited to these. In some cases, the above-mentioned functional block configuration does not coincide with, for example, the program module configuration.

In addition, the configuration of each of the storage areas described above is an example and may adopt a configuration other than the corresponding above-mentioned configuration. Furthermore, in each of the processing flows, if no change in the corresponding processing result occurs, the order of processing operations may be changed, and processing operations may be caused to be performed in parallel.

The summary of the above-mentioned embodiments is as follows.

A state monitoring method of one embodiment includes processing for (A) calculating, based on a measurement result of a first sensor, the degree of probability of being a first state, (B) causing an operation of a second sensor to be initiated in a case where the degree of probability exceeds a first threshold value, (C) detecting, based on a measurement result of the second sensor, a second state, (D) detecting the first state in a case where the degree of probability exceeds a second threshold value greater than the first threshold value, and (E) determining a condition related to a combination of the first state and the second state.

By doing so, failures in determination in which states are combined are reduced in a multiple sensor device in which the second sensor is caused to subsequently operate.

Furthermore, in a case where it is determined that the above-mentioned condition is satisfied, a second processor to perform a program may be switched from a power saving mode to a normal mode. In addition, the second processor switched to the normal mode may be caused to execute the program.

By doing so, the second processor may be caused to wait in the power saving mode until the above-mentioned condition is satisfied.

Furthermore, in a case where it is determined that the above-mentioned condition is satisfied, the second processor to perform the program may be started. In addition, the started second processor may be caused to perform the program.

By doing so, the second processor does not have to be caused to operate until the above-mentioned condition is satisfied.

Furthermore, in a case where it is determined that the above-mentioned condition is satisfied, power supply to the second processor may be started.

By doing so, the second processor does not have to be supplied with electric power until the above-mentioned condition is satisfied.

Furthermore, in a case where the degree of probability exceeds a third threshold value less than the first threshold value, an operation of a third sensor may be caused to be initiated. In addition, based on a measurement result of the third sensor, a third state may be detected. The above-mentioned condition may be combined with the third state.

By doing so, in accordance with preparation characteristics of the second sensor and the third sensor, failures in determination in which states are combined are reduced.

Note that it is possible to create a program for causing a processor to perform the above-mentioned processing and the relevant program may be stored in a computer-readable storage medium or storage device such as, for example, a flexible disk, a CD-ROM, a magneto-optical disk, a semiconductor memory, or a hard disk. Note that usually an intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a first sensor device;
a second sensor device having a first preparation period for measuring; and
a first processor coupled to the first sensor device and the second sensor device and configured to:
calculate, in accordance with a measurement of the first sensor device, a probability that the apparatus is in a first state,
initiate an operation of the second sensor device when the probability exceeds a first value determined based on the first preparation period,
execute, in accordance with a measurement of the second sensor device, a first detection that detects the apparatus is in a second state,
calculate, in accordance with another measurement of the first sensor device, another probability that the apparatus is in the first state,
execute a second detection that the apparatus is in the first state when the other probability exceeds a second value which is greater than the first value, and
output, in accordance with the first detection and the second detection, a notification that indicates the apparatus is in both the first state and the second state.

2. The apparatus according to claim 1, further comprising:
a second processor coupled to the first processor, wherein
the first processor is configured to:
send the notification to the second processor, and
the second processor is configured to:
receive the notification, and
perform a computer program after the second processor receives the notification.

3. The apparatus according to claim 2, wherein
the second processor is configured to switch an operation mode of the second processor from a first mode to a second mode after the second processor receives the notification, and
the first power consumed by the second processor in the first mode is less than a second power consumed by the second processor in the second mode.

4. The apparatus according to claim 3, further comprising:
a power control devices, wherein
the power control device starts a power supply to the second processor in response to the first detection and the second detection.

5. The apparatus according to claim 1, further comprising:
a third sensor device coupled to the first processor, the third sensor device having a second preparation period greater than the first preparation period, wherein
the first processor is further configured to:
initiate an operation of the third sensor device when the probability exceeds a third value determined based on the second preparation period, the third value being less than the first value, and
detect that the apparatus is in a third state based on a measurement of the third sensor device, wherein the notification is generated based on the first state, the second state, and the third state.

6. A method using an apparatus including a first sensor device, a second sensor device and a first processor, the second sensor device having a first preparation period for measuring, the method comprising:
calculating, by the first processor, in accordance with a measurement of the first sensor device, a probability that the apparatus is in a first state;
initiating, by the first processor, an operation of the second sensor device when the probability exceeds a first value determined based on the first preparation period;
executing, by the first processor, in accordance with a measurement of the second sensor device, a first detection that detects the apparatus is in a second state;
calculating, by the first processor, in accordance with another measurement of the first sensor device, another probability that the apparatus is in the first state,
executing, by the first processor, a second detection that the apparatus is in the first state when the other probability exceeds a second value greater than the first value; and
in accordance with the first detection and the second detection, outputting a notification indicating that the apparatus is in both the first state and the second state.

7. The method according to claim 6, further comprising:
sending, by the first processor, the notification to a second processor included in the apparatus;
receiving, by the second processor, the notification; and
performing, by the second processor, a computer program after the second processor receives the notification.

8. The method according to claim 7, further comprising:
switching, by the second processor, an operation mode of the second processor from a first mode to a second mode after the second process receives the notification, wherein
the first power consumed by the second processor in the first mode is less than a second power consumed by the second processor in the second mode.

9. The method according to claim 8, further comprising:
starting a power supply to the second processor in response to the first detection and the second detection.

10. The method according to claim 6, further comprising:
initiating, by the first processor, an operation of a third sensor device having a second preparation period greater than the first preparation period and being included in the apparatus when the probability exceeds a third value determined based on the second preparation period, the third value being less than the first value; and
detecting, by the first processor, that the apparatus is in a third state based on a measurement of the third sensor device,
wherein the notification is generated based on the first state, the second state, and the third state.

* * * * *